US012782569B2

(12) United States Patent
Warke et al.

(10) Patent No.: US 12,782,569 B2
(45) Date of Patent: Nov. 3, 2026

(54) COMBINING DATA FROM DIFFERENT SAMPLE REGIONS IN AN IMAGING SYSTEM FIELD OF VIEW

(71) Applicant: SiLC Technologies, Inc., Monrovia, CA (US)

(72) Inventors: Nirmal Chindhu Warke, Saratoga, CA (US); Mehdi Asghari, La Canada Flintridge, CA (US); Majid Boloorian, San Diego, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 1086 days.

(21) Appl. No.: 17/945,072

(22) Filed: Sep. 14, 2022

(65) Prior Publication Data

US 2024/0085559 A1 Mar. 14, 2024

(51) Int. Cl.

| | |
|---|---|
| ***G01S 17/00*** | (2020.01) |
| ***G01S 17/58*** | (2006.01) |
| ***G01S 17/89*** | (2020.01) |

(52) U.S. Cl.

CPC .............. *G01S 17/58* (2013.01); *G01S 17/89* (2013.01)

(58) Field of Classification Search

USPC ........................................................ 356/4.01

See application file for complete search history.

(56) References Cited

U.S. PATENT DOCUMENTS

| | | | |
|---|---|---|---|
| 4,168,906 | A | 9/1979 | Schwiesow |
| 4,262,993 | A | 4/1981 | Burns et al. |

(Continued)

FOREIGN PATENT DOCUMENTS

| | | | |
|---|---|---|---|
| CN | 1668939 | A | 9/2005 |
| CN | 101356450 | A | 1/2009 |

(Continued)

OTHER PUBLICATIONS

Aalto, Timo et al., "VTT's Micron-Scale Silicon Rib+Strip Waveguide Platform", pp. 1-8, May 13, 2016, Conference Proceedings of SPIE Photonics Europe Conference, Proc. SPIE 9891, Silicon Photonics and Photonic Integrated Circuits V, 98911G, doi: 10.1117/12.2234588.

(Continued)

*Primary Examiner* — James R Hulka
(74) *Attorney, Agent, or Firm* — Gavrilovich, Dodd & Lindsey LLP

(57) ABSTRACT

The imaging system includes one or more cores. Each of the cores outputs a system output signal that illuminates multiple sample regions in a field of view. A subject one of the cores includes a light combiner that generates a composite signal beating at a beat frequency. Electronics use a value of the beat frequency to calculate multiple different possible LIDAR data solutions for a subject one of the sample regions illuminated by the system output signal output from the subject core. Each of the possible LIDAR data solutions includes a comparative component that indicates a value of a radial velocity between the LIDAR system and an object in the subject sample region. The electronics identify a correct one of the LIDAR data solutions by comparing the LIDAR data solutions to data calculated for one or more reference sample regions selected from among the sample regions. The one or more reference sample regions are different from the subject sample region.

26 Claims, 18 Drawing Sheets

(56) References Cited

U.S. PATENT DOCUMENTS

| | | | |
|---|---|---|---|
| 4,472,020 | A | 9/1984 | Evanchuk |
| 4,523,803 | A | 6/1985 | Arao et al. |
| 4,786,132 | A | 11/1988 | Gordon |
| 4,845,703 | A | 7/1989 | Suzuki |
| 4,914,665 | A | 4/1990 | Sorin |
| 4,955,028 | A | 9/1990 | Alfeness et al. |
| 4,987,832 | A | 1/1991 | Klink et al. |
| 4,995,720 | A | 2/1991 | Amzajerdian |
| 5,041,832 | A | 8/1991 | Gulczynski |
| 5,194,906 | A | 3/1993 | Kimura et al. |
| 5,289,252 | A | 2/1994 | Nourrcier |
| 5,305,412 | A | 4/1994 | Paoli |
| 5,323,223 | A | 6/1994 | Hayes |
| 5,396,328 | A | 3/1995 | Jestel et al. |
| 5,500,910 | A | 3/1996 | Boudreau et al. |
| 5,847,816 | A | 12/1998 | Zediker et al. |
| 5,889,490 | A | 3/1999 | Wachter et al. |
| 5,953,468 | A | 9/1999 | Finnila et al. |
| 5,977,538 | A | 11/1999 | Unger et al. |
| 5,995,810 | A | 11/1999 | Karasawa |
| 6,035,083 | A | 3/2000 | Brennan, III et al. |
| 6,040,898 | A | 3/2000 | Mrosik et al. |
| 6,108,472 | A | 8/2000 | Rickman et al. |
| 6,400,500 | B1 | 6/2002 | Tidmarsh et al. |
| 6,480,513 | B1 | 11/2002 | Kapany et al. |
| 6,516,120 | B2 * | 2/2003 | Roberts .............. G02B 6/12016 385/32 |
| 6,556,759 | B2 | 4/2003 | Roberts et al. |
| 6,567,573 | B1 | 5/2003 | Domash et al. |
| 6,608,669 | B2 * | 8/2003 | Holton .................. H04L 27/206 356/28.5 |
| 6,687,010 | B1 | 2/2004 | Horii et al. |
| 6,921,490 | B1 | 7/2005 | Qian et al. |
| 6,959,133 | B2 | 10/2005 | Vancoill et al. |
| 6,970,621 | B1 | 11/2005 | Fried |
| 6,977,502 | B1 | 12/2005 | Hertz |
| 7,345,744 | B2 | 3/2008 | Halmos et al. |
| 7,375,877 | B1 | 5/2008 | Di Teodoro et al. |
| 7,535,390 | B2 | 5/2009 | Hsu |
| 7,907,333 | B2 | 3/2011 | Coyle |
| 8,165,433 | B2 | 4/2012 | Jenkins et al. |
| 8,213,751 | B1 | 7/2012 | Ho et al. |
| 8,311,374 | B2 | 11/2012 | Hochberg et al. |
| 8,326,100 | B2 | 12/2012 | Chen et al. |
| 8,410,566 | B2 | 4/2013 | Qian et al. |
| 8,541,744 | B1 | 9/2013 | Liu |
| 8,558,993 | B2 | 10/2013 | Newbury et al. |
| 8,885,678 | B1 | 11/2014 | Kupershmidt |
| 9,157,790 | B2 | 10/2015 | Shpunt et al. |
| 9,176,282 | B2 | 11/2015 | Pottier et al. |
| 9,217,831 | B1 | 12/2015 | Asghari |
| 9,235,097 | B2 | 1/2016 | Meade et al. |
| 9,310,471 | B2 | 4/2016 | Sayyah et al. |
| 9,310,487 | B2 | 4/2016 | Sakimura et al. |
| 9,519,052 | B2 | 12/2016 | Gusev |
| 9,575,341 | B2 | 2/2017 | Heck et al. |
| 9,606,234 | B2 | 3/2017 | Major, Jr. et al. |
| 9,625,580 | B2 | 4/2017 | Kotelnikov et al. |
| 9,735,885 | B1 | 8/2017 | Sayyah et al. |
| 9,740,079 | B1 | 8/2017 | Davids et al. |
| 9,748,726 | B1 | 8/2017 | Morton et al. |
| 9,753,351 | B2 | 9/2017 | Eldada |
| 9,778,363 | B2 | 10/2017 | Kadambi et al. |
| 9,798,166 | B1 | 10/2017 | Sharma et al. |
| 9,823,118 | B2 | 11/2017 | Doylend et al. |
| 9,841,495 | B2 | 12/2017 | Campbell et al. |
| 9,851,443 | B2 | 12/2017 | Chen |
| 9,857,468 | B1 | 1/2018 | Eichenholz et al. |
| 9,893,737 | B1 | 2/2018 | Keramat et al. |
| 10,003,168 | B1 | 6/2018 | Villeneuve |
| 10,007,060 | B1 | 6/2018 | Qian et al. |
| 10,094,916 | B1 | 10/2018 | Droz et al. |
| 10,137,903 | B2 | 11/2018 | Tascione et al. |
| 10,222,474 | B1 | 3/2019 | Raring et al. |
| 10,274,599 | B2 | 4/2019 | Schmalenberg |
| 10,281,322 | B2 | 5/2019 | Doylend et al. |
| 10,345,447 | B1 | 7/2019 | Hicks |
| 10,345,497 | B2 | 7/2019 | Wu et al. |
| 10,397,019 | B2 | 8/2019 | Hartung et al. |
| 10,564,268 | B2 | 2/2020 | Turbide et al. |
| 10,605,901 | B2 | 3/2020 | Lee et al. |
| 10,627,496 | B2 | 4/2020 | Schmalenberg et al. |
| 10,649,306 | B2 | 5/2020 | Skirlo et al. |
| 10,739,256 | B1 | 8/2020 | Rickman et al. |
| 10,761,195 | B2 | 9/2020 | Donovan |
| 10,782,782 | B1 | 9/2020 | DeSalvo et al. |
| 10,788,582 | B2 | 9/2020 | Feng et al. |
| 10,816,649 | B1 | 10/2020 | Keyser et al. |
| 10,845,480 | B1 | 11/2020 | Shah et al. |
| 10,901,074 | B1 | 1/2021 | Pan et al. |
| 10,962,713 | B2 | 3/2021 | Lee |
| 11,022,683 | B1 | 6/2021 | Rezk |
| 11,067,668 | B1 | 7/2021 | Bravo |
| 11,114,815 | B1 | 9/2021 | Chen et al. |
| 11,119,219 | B1 | 9/2021 | LaChapelle et al. |
| 11,162,789 | B2 | 11/2021 | Lodin et al. |
| 11,170,476 | B1 | 11/2021 | Toshiwal et al. |
| 11,175,388 | B1 | 11/2021 | Wood et al. |
| 11,221,404 | B1 | 1/2022 | DeSalvo et al. |
| 11,300,683 | B2 | 4/2022 | Bao et al. |
| 11,378,691 | B2 | 7/2022 | Boloorian et al. |
| 11,448,729 | B2 | 9/2022 | Baba et al. |
| 11,454,724 | B2 | 9/2022 | Michaels et al. |
| 11,486,975 | B1 | 11/2022 | Xiao |
| 11,493,753 | B1 | 11/2022 | Wood et al. |
| 11,525,916 | B2 | 12/2022 | Avci et al. |
| 11,536,805 | B2 | 12/2022 | Asghari et al. |
| 11,579,300 | B1 | 2/2023 | Li |
| 11,635,491 | B2 | 4/2023 | Asghari et al. |
| 11,714,167 | B2 | 8/2023 | Feng et al. |
| 11,768,419 | B1 | 9/2023 | Schroder et al. |
| 11,815,720 | B1 | 11/2023 | Tavallaee et al. |
| 11,860,304 | B2 | 1/2024 | Ren et al. |
| 11,908,075 | B2 | 2/2024 | Gorantla |
| 11,953,627 | B2 * | 4/2024 | Xiao ..................... G01S 7/4816 |
| 2002/0031304 | A1 | 3/2002 | Roberts et al. |
| 2002/0105632 | A1 | 8/2002 | Holton |
| 2002/0122398 | A1 | 9/2002 | Jou |
| 2002/0131747 | A1 * | 9/2002 | Roberts ................ G02B 6/1228 385/132 |
| 2002/0159700 | A1 | 10/2002 | Coroy et al. |
| 2003/0030582 | A1 | 2/2003 | Vickers |
| 2003/0031407 | A1 | 2/2003 | Weisberg et al. |
| 2003/0142943 | A1 | 7/2003 | Yegnanarayanan et al. |
| 2003/0183603 | A1 | 10/2003 | Forsman et al. |
| 2003/0212520 | A1 | 11/2003 | Campos et al. |
| 2003/0231686 | A1 | 12/2003 | Liu |
| 2004/0081388 | A1 | 4/2004 | Koyama |
| 2004/0085612 | A1 | 5/2004 | Livingston et al. |
| 2004/0233964 | A1 | 11/2004 | Yamanaka et al. |
| 2004/0249561 | A1 | 12/2004 | Capozzi et al. |
| 2005/0123227 | A1 | 6/2005 | Vonsovici et al. |
| 2005/0135730 | A1 | 6/2005 | Welch et al. |
| 2005/0147353 | A1 * | 7/2005 | Vancoill ............... G02B 6/4204 385/47 |
| 2005/0213103 | A1 | 9/2005 | Everett et al. |
| 2005/0219068 | A1 | 10/2005 | Jones et al. |
| 2005/0237617 | A1 | 10/2005 | Carr et al. |
| 2005/0244103 | A1 | 11/2005 | Kwakernaak |
| 2006/0114447 | A1 | 6/2006 | Harris et al. |
| 2006/0232763 | A1 | 10/2006 | Jokinen |
| 2006/0279723 | A1 * | 12/2006 | Halmos ................... G01S 17/34 356/5.1 |
| 2007/0024849 | A1 | 2/2007 | Carrig et al. |
| 2007/0024956 | A1 | 2/2007 | Coyle |
| 2007/0036486 | A1 | 2/2007 | Miyadera et al. |
| 2007/0103362 | A1 | 5/2007 | Arikan et al. |
| 2007/0171407 | A1 | 7/2007 | Cole et al. |
| 2007/0223856 | A1 | 9/2007 | Nunoya et al. |
| 2008/0088184 | A1 | 4/2008 | Tung et al. |
| 2008/0123170 | A1 | 5/2008 | Reichert et al. |
| 2008/0174461 | A1 | 7/2008 | Hsu |
| 2008/0176681 | A1 | 7/2008 | Donahoe |
| 2008/0181550 | A1 | 7/2008 | Earnshaw |

(56) References Cited

U.S. PATENT DOCUMENTS

2008/0205461 A1 8/2008 Henrichs
2009/0046746 A1 2/2009 Munroe et al.
2009/0128797 A1 5/2009 Walsh
2009/0195769 A1 8/2009 Luo et al.
2009/0279070 A1 11/2009 Ueno
2009/0309782 A1 12/2009 Takabayashi et al.
2010/0027379 A1 2/2010 Saulnier et al.
2010/0085992 A1 4/2010 Rakuljic et al.
2010/0159858 A1 6/2010 Dent et al.
2010/0187442 A1 7/2010 Hochberg et al.
2010/0271614 A1 10/2010 Albuquerque et al.
2010/0277714 A1 11/2010 Pedersen et al.
2010/0280765 A1 11/2010 Marquardt et al.
2010/0296077 A1 11/2010 Scott et al.
2010/0309391 A1 12/2010 Plut
2011/0026643 A1 2/2011 Ruelke et al.
2011/0068425 A1 3/2011 Liao et al.
2011/0068426 A1 3/2011 Zheng et al.
2011/0091155 A1 4/2011 Yilmaz et al.
2011/0095167 A1 4/2011 Feng et al.
2011/0141471 A1 6/2011 Schlotterbeck et al.
2011/0164845 A1 7/2011 Jenkins et al.
2011/0241895 A1 10/2011 Griffin
2011/0285980 A1* 11/2011 Newbury ................ G01S 7/484
356/3
2012/0038506 A1 2/2012 Kanamoto et al.
2012/0062230 A1 3/2012 Vaughan, Jr. et al.
2012/0076465 A1* 3/2012 Chen .................... G02B 6/1228
385/124
2012/0081786 A1 4/2012 Mizuyama et al.
2012/0098935 A1 4/2012 Schmidt et al.
2012/0120382 A1 5/2012 Silny et al.
2012/0182544 A1 7/2012 Asahara et al.
2012/0206712 A1 8/2012 Chang et al.
2013/0020664 A1* 1/2013 Qian .................. G02B 6/12004
257/E31.127
2013/0044309 A1 2/2013 Dakin et al.
2013/0044311 A1 2/2013 Rakuljic
2013/0051655 A1 2/2013 Collard et al.
2013/0056623 A1 3/2013 Lipson et al.
2013/0083389 A1 4/2013 Dakin et al.
2013/0094074 A1 4/2013 Asghari et al.
2013/0162976 A1 6/2013 Dakin et al.
2013/0202246 A1* 8/2013 Meade ............... G02B 6/12004
385/14
2013/0206967 A1 8/2013 Shpunt et al.
2013/0242400 A1 9/2013 Chen
2013/0321791 A1 12/2013 Feldkhun et al.
2014/0035776 A1 2/2014 Sochen et al.
2014/0036252 A1 2/2014 Amzajerdian et al.
2014/0054451 A1 2/2014 Abedin et al.
2014/0112357 A1 4/2014 Abedin et al.
2014/0133864 A1 5/2014 Asghari et al.
2014/0153931 A1 6/2014 Doerr
2014/0169392 A1 6/2014 Kim
2014/0211298 A1 7/2014 Sayyah et al.
2014/0233013 A1* 8/2014 Sakimura .............. G01S 7/4815
356/5.01
2014/0233891 A1* 8/2014 Pottier ............... G02B 6/29328
359/570
2014/0269790 A1 9/2014 Sebastian et al.
2014/0332918 A1 11/2014 Li et al.
2014/0376000 A1 12/2014 Swanson et al.
2014/0376001 A1 12/2014 Swanson
2015/0055115 A1 2/2015 Pedersen et al.
2015/0056740 A1 2/2015 Menezo
2015/0109603 A1 4/2015 Kim et al.
2015/0109605 A1* 4/2015 Major, Jr. ............. G01S 7/4868
356/28
2015/0120241 A1* 4/2015 Kadambi ................ G01S 17/32
356/5.01
2015/0171593 A1 6/2015 Duan et al.
2015/0177367 A1 6/2015 Sebastian et al.
2015/0177383 A1 6/2015 Ruff et al.
2015/0185244 A1 7/2015 Inoue et al.
2015/0192676 A1* 7/2015 Kotelnikov ............. G01S 17/42
356/5.03
2015/0207296 A1 7/2015 Rickman et al.
2015/0333480 A1 11/2015 Santis et al.
2015/0346340 A1 12/2015 Yaacobi et al.
2015/0378012 A1 12/2015 Sayyah et al.
2015/0378187 A1 12/2015 Heck et al.
2015/0378241 A1* 12/2015 Eldada .................... G02F 1/292
359/299
2016/0084945 A1 3/2016 Rodrigo et al.
2016/0161600 A1 6/2016 Eldada et al.
2016/0170141 A1 6/2016 Luo et al.
2016/0209594 A1 7/2016 Bahl
2016/0223663 A1 8/2016 Schmalenberg et al.
2016/0231419 A1* 8/2016 Gusev .................. G01C 15/002
2016/0261091 A1 9/2016 Santis et al.
2016/0274226 A1 9/2016 Lewis
2016/0290891 A1 10/2016 Feng et al.
2016/0291135 A1 10/2016 Ando et al.
2016/0299228 A1 10/2016 Maleki et al.
2016/0306043 A1 10/2016 Moss et al.
2016/0324438 A1 11/2016 Halpern et al.
2016/0341818 A1 11/2016 Gilliland et al.
2016/0373191 A1 12/2016 Fathololoumi et al.
2016/0377721 A1 12/2016 Lardin et al.
2017/0003451 A1 1/2017 Ma et al.
2017/0040775 A1 2/2017 Takabayashi et al.
2017/0059779 A1 3/2017 Okayama
2017/0067985 A1 3/2017 Schwarz et al.
2017/0098917 A1 4/2017 Popovic et al.
2017/0108649 A1 4/2017 Dallessasse et al.
2017/0131387 A1* 5/2017 Campbell ............... G01S 17/89
2017/0139411 A1 5/2017 Hartung et al.
2017/0146639 A1 5/2017 Carothers
2017/0146641 A1 5/2017 Walsh et al.
2017/0153319 A1 6/2017 Villeneuve et al.
2017/0155225 A1 6/2017 Villeneuve et al.
2017/0184450 A1 6/2017 Doylend et al.
2017/0207600 A1 7/2017 Klamkin et al.
2017/0268866 A1 9/2017 Berz
2017/0269198 A1 9/2017 Hall et al.
2017/0269215 A1 9/2017 Hall et al.
2017/0299697 A1 10/2017 Swanson
2017/0307648 A1 10/2017 Kotake et al.
2017/0307736 A1 10/2017 Donovan
2017/0328988 A1 11/2017 Magee et al.
2017/0343652 A1 11/2017 De Mersseman et al.
2017/0343791 A1 11/2017 Swanson
2017/0350965 A1 12/2017 Schmalenberg
2017/0350983 A1 12/2017 Hall et al.
2017/0356983 A1 12/2017 Jeong et al.
2017/0371227 A1 12/2017 Skirlo et al.
2017/0372602 A1 12/2017 Gilliland et al.
2018/0002432 A1 1/2018 Gilliland et al.
2018/0003805 A1 1/2018 Popovich et al.
2018/0024246 A1 1/2018 Jeong et al.
2018/0031680 A1 2/2018 Lee et al.
2018/0039154 A1 2/2018 Hashemi et al.
2018/0050704 A1 2/2018 Tascione et al.
2018/0073932 A1 3/2018 Minet et al.
2018/0088211 A1 3/2018 Gill et al.
2018/0095284 A1 4/2018 Welch et al.
2018/0102442 A1 4/2018 Wang et al.
2018/0103431 A1 4/2018 Suh et al.
2018/0113216 A1 4/2018 Kremer et al.
2018/0120433 A1 5/2018 Eichenholz et al.
2018/0120436 A1 5/2018 Smits
2018/0136321 A1 5/2018 Verghese et al.
2018/0143322 A1 5/2018 Rosenzweig et al.
2018/0143374 A1 5/2018 Coolbaugh et al.
2018/0149752 A1 5/2018 Tadano
2018/0164408 A1 6/2018 Hall et al.
2018/0172918 A1 6/2018 Lane et al.
2018/0188371 A1 7/2018 Bao et al.
2018/0217471 A1 8/2018 Lee et al.
2018/0224547 A1 8/2018 Crouch et al.
2018/0231643 A1 8/2018 Lee et al.
2018/0241477 A1* 8/2018 Turbide .................. G01S 7/497

(56) References Cited

U.S. PATENT DOCUMENTS

2018/0269890 A1 9/2018 Ojeda
2018/0287343 A1 10/2018 Morrison et al.
2018/0306925 A1 10/2018 Hosseini et al.
2018/0329037 A1 11/2018 Bozchalooi et al.
2018/0331493 A1 11/2018 Lin et al.
2018/0348343 A1 12/2018 Achour et al.
2018/0351317 A1 12/2018 Vermeulen
2018/0356344 A1 12/2018 Yi
2018/0356522 A1 12/2018 Kikuchi et al.
2018/0359033 A1 12/2018 Xu et al.
2018/0364334 A1 12/2018 Xiang et al.
2018/0364336 A1 12/2018 Hosseini et al.
2018/0372517 A1 12/2018 Yao et al.
2018/0372530 A1 12/2018 Welle et al.
2018/0372870 A1 12/2018 Puglia
2018/0375284 A1 12/2018 Permogorov
2019/0004151 A1 1/2019 Abediasl et al.
2019/0011558 A1 1/2019 Crouch et al.
2019/0011559 A1 1/2019 Desai et al.
2019/0018110 A1 1/2019 Kremer et al.
2019/0018121 A1 1/2019 Sayyah et al.
2019/0018139 A1 1/2019 Sayyah et al.
2019/0018140 A1 1/2019 Sarkissian et al.
2019/0018144 A1 1/2019 Imaki et al.
2019/0018197 A1 1/2019 Boutami et al.
2019/0025094 A1 1/2019 Lewis et al.
2019/0025426 A1 1/2019 Satyan et al.
2019/0025431 A1 1/2019 Satyan et al.
2019/0027897 A1 1/2019 Wei et al.
2019/0033453 A1 1/2019 Crouch et al.
2019/0049569 A1 2/2019 Kim et al.
2019/0064329 A1 2/2019 Liu et al.
2019/0064332 A1 2/2019 Schmalenberg et al.
2019/0064358 A1 2/2019 Desai et al.
2019/0072651 A1 3/2019 Halmos et al.
2019/0072672 A1 3/2019 Yao
2019/0079225 A1* 3/2019 Wu ...................... G02B 6/4214
2019/0086514 A1 3/2019 Dussan et al.
2019/0086518 A1 3/2019 Halstig et al.
2019/0086550 A1 3/2019 Dussan et al.
2019/0096259 A1 3/2019 McQuillen et al.
2019/0101647 A1 4/2019 Feshali et al.
2019/0107623 A1 4/2019 Campbell et al.
2019/0120939 A1 4/2019 O'Keeffe
2019/0146074 A1 5/2019 Hjelmstad
2019/0146087 A1 5/2019 Mansur et al.
2019/0146164 A1 5/2019 Krichevsky
2019/0154816 A1 5/2019 Hughes et al.
2019/0154832 A1 5/2019 Maleki et al.
2019/0154835 A1 5/2019 Maleki et al.
2019/0179012 A1 6/2019 Heo
2019/0187269 A1 6/2019 Tong et al.
2019/0204419 A1 7/2019 Baba et al.
2019/0204441 A1 7/2019 Feneyrou et al.
2019/0204443 A1 7/2019 Yao et al.
2019/0250253 A1 8/2019 Hung et al.
2019/0250396 A1 8/2019 Blanche et al.
2019/0257924 A1 8/2019 Li et al.
2019/0257927 A1 8/2019 Yao
2019/0265574 A1* 8/2019 Skirlo ................... G02F 1/3136
2019/0266741 A1 8/2019 Uehara
2019/0280453 A1 9/2019 Gopinath et al.
2019/0293794 A1 9/2019 Zhang et al.
2019/0302262 A1 10/2019 Singer
2019/0302268 A1 10/2019 Singer et al.
2019/0310372 A1 10/2019 Crouch et al.
2019/0310377 A1 10/2019 Lodin et al.
2019/0317195 A1 10/2019 Sun et al.
2019/0331797 A1 10/2019 Singer et al.
2019/0339388 A1 11/2019 Crouch et al.
2019/0339389 A1 11/2019 Russo et al.
2019/0341739 A1 11/2019 Loh et al.
2019/0346056 A1 11/2019 Staiger et al.
2019/0346568 A1 11/2019 Feng et al.
2019/0353787 A1 11/2019 Petit
2019/0353789 A1 11/2019 Boloorian et al.
2019/0353977 A1 11/2019 Hung
2019/0361122 A1 11/2019 Crouch et al.
2019/0369244 A1 12/2019 Asghari et al.
2019/0369251 A1 12/2019 Feng et al.
2019/0372307 A1 12/2019 Morton
2019/0377135 A1 12/2019 Rad et al.
2019/0383907 A1 12/2019 Belsley et al.
2019/0391242 A1 12/2019 Asghari et al.
2019/0391243 A1 12/2019 Nicolaescu
2020/0018857 A1 1/2020 Feng et al.
2020/0021082 A1 1/2020 Rakuljic
2020/0025898 A1 1/2020 Ain-Kedem et al.
2020/0025926 A1 1/2020 Asghari et al.
2020/0043176 A1 2/2020 Maila et al.
2020/0049799 A1 2/2020 Ando et al.
2020/0057143 A1 2/2020 Asghari et al.
2020/0064116 A1 2/2020 Salvade et al.
2020/0064477 A1 2/2020 Komatsuzaki
2020/0072978 A1 3/2020 Boloorian et al.
2020/0072979 A1 3/2020 Boloorian et al.
2020/0076152 A1 3/2020 Eichenholz et al.
2020/0088876 A1 3/2020 Tanemura et al.
2020/0103501 A1 4/2020 Kotelnikov et al.
2020/0104647 A1 4/2020 Pirim
2020/0110179 A1 4/2020 Talty et al.
2020/0116837 A1 4/2020 Asghari et al.
2020/0116842 A1 4/2020 Asghari et al.
2020/0116863 A1 4/2020 Jensen et al.
2020/0124711 A1* 4/2020 Rezk ..................... G01S 7/4811
2020/0132843 A1 4/2020 Hart et al.
2020/0142065 A1 5/2020 Boloorian et al.
2020/0142066 A1 5/2020 Sandborn et al.
2020/0142068 A1 5/2020 Crouch et al.
2020/0150241 A1 5/2020 Byrnes et al.
2020/0158830 A1 5/2020 Asghari et al.
2020/0158833 A1 5/2020 Baba et al.
2020/0158839 A1 5/2020 Lin et al.
2020/0166617 A1 5/2020 Crouch et al.
2020/0166647 A1 5/2020 Crouch et al.
2020/0174095 A1 6/2020 Altintas et al.
2020/0174191 A1* 6/2020 Lee .......................... G02B 6/43
2020/0182973 A1 6/2020 Luff et al.
2020/0182978 A1 6/2020 Maleki et al.
2020/0200879 A1 6/2020 Halstig et al.
2020/0209366 A1 7/2020 Maleki
2020/0225332 A1 7/2020 Wagner et al.
2020/0241119 A1 7/2020 Asghari et al.
2020/0249324 A1 8/2020 Steinberg et al.
2020/0249350 A1 8/2020 Schmalenberg
2020/0256956 A1 8/2020 Luff et al.
2020/0278432 A1 9/2020 Thorpe et al.
2020/0284879 A1 9/2020 Asghari et al.
2020/0284883 A1 9/2020 Ferreira et al.
2020/0284913 A1 9/2020 Amelot et al.
2020/0292706 A1 9/2020 Hexsel et al.
2020/0300980 A1 9/2020 Behzadi et al.
2020/0300993 A1 9/2020 Behzadi et al.
2020/0301070 A1 9/2020 Nagarajan
2020/0309949 A1 10/2020 Feng et al.
2020/0309952 A1 10/2020 Imaki et al.
2020/0319409 A1 10/2020 Su et al.
2020/0326476 A1 10/2020 Hiratani
2020/0333441 A1 10/2020 Diaz
2020/0333443 A1 10/2020 Boloorian et al.
2020/0333533 A1 10/2020 Rogers et al.
2020/0363515 A1 11/2020 Luff et al.
2020/0373662 A1 11/2020 Gleason et al.
2020/0379115 A1 12/2020 Yang et al.
2020/0400821 A1 12/2020 Baker et al.
2020/0400822 A1 12/2020 Ando et al.
2020/0408911 A1 12/2020 Boloorian et al.
2020/0408912 A1 12/2020 Boloorian et al.
2021/0010802 A1 1/2021 Onohara et al.
2021/0033732 A1 2/2021 Boloorian et al.
2021/0055388 A1 2/2021 Feng et al.
2021/0063541 A1 3/2021 Zheng et al.
2021/0063542 A1 3/2021 Zheng et al.
2021/0072385 A1 3/2021 Sandborn et al.

(56) References Cited

U.S. PATENT DOCUMENTS

| | | | |
|---|---|---|---|
| 2021/0072389 | A1 | 3/2021 | Boloorian et al. |
| 2021/0072445 | A1 | 3/2021 | Kurokawa et al. |
| 2021/0096228 | A1 | 4/2021 | Behzadi et al. |
| 2021/0109195 | A1 | 4/2021 | Feng et al. |
| 2021/0116778 | A1 | 4/2021 | Zhang et al. |
| 2021/0132232 | A1 | 5/2021 | Asghari et al. |
| 2021/0141058 | A1 | 5/2021 | Piggott et al. |
| 2021/0149056 | A1 | 5/2021 | Luff et al. |
| 2021/0156999 | A1 | 5/2021 | Nishino et al. |
| 2021/0159659 | A1 | 5/2021 | Bandyopadhyay et al. |
| 2021/0159664 | A1 | 5/2021 | Liu et al. |
| 2021/0165102 | A1 | 6/2021 | Crouch et al. |
| 2021/0173058 | A1 | 6/2021 | Viswanatha et al. |
| 2021/0181320 | A1 | 6/2021 | Oza et al. |
| 2021/0190907 | A1 | 6/2021 | Sahara |
| 2021/0190921 | A1 | 6/2021 | Golikov et al. |
| 2021/0190925 | A1 | 6/2021 | Asghari et al. |
| 2021/0199797 | A1 | 7/2021 | Choi et al. |
| 2021/0239798 | A1* | 8/2021 | Bravo ..................... G01S 17/88 |
| 2021/0239811 | A1 | 8/2021 | Asghari et al. |
| 2021/0255324 | A1 | 8/2021 | Dunn et al. |
| 2021/0278540 | A1 | 9/2021 | Maayan et al. |
| 2021/0293923 | A1 | 9/2021 | Arkind et al. |
| 2021/0318436 | A1 | 10/2021 | Boloorian et al. |
| 2021/0325520 | A1 | 10/2021 | Cai et al. |
| 2021/0333386 | A1 | 10/2021 | Park et al. |
| 2021/0349196 | A1 | 11/2021 | Wang et al. |
| 2021/0349216 | A1 | 11/2021 | Behroozpour et al. |
| 2021/0356592 | A1 | 11/2021 | Behroozpour |
| 2021/0364607 | A1 | 11/2021 | Davydenko |
| 2021/0373162 | A1 | 12/2021 | Wu et al. |
| 2021/0389244 | A1 | 12/2021 | Bowman et al. |
| 2021/0389470 | A1* | 12/2021 | Michaels ................ G01S 7/481 |
| 2021/0396879 | A1 | 12/2021 | Sun et al. |
| 2021/0405194 | A1 | 12/2021 | Tsuchida |
| 2022/0003842 | A1 | 1/2022 | Wang et al. |
| 2022/0003846 | A1* | 1/2022 | Massoud ................. G01S 7/484 |
| 2022/0003868 | A1* | 1/2022 | Avci ...................... G01S 7/4911 |
| 2022/0050187 | A1 | 2/2022 | Yao |
| 2022/0065999 | A1 | 3/2022 | Phare et al. |
| 2022/0075121 | A1 | 3/2022 | Lowder et al. |
| 2022/0085567 | A1 | 3/2022 | Lowder et al. |
| 2022/0099837 | A1 | 3/2022 | Crouch et al. |
| 2022/0107391 | A1* | 4/2022 | Ren ........................ G06V 20/58 |
| 2022/0107411 | A1 | 4/2022 | Koonath et al. |
| 2022/0113390 | A1 | 4/2022 | Koonath et al. |
| 2022/0113422 | A1 | 4/2022 | Hillard et al. |
| 2022/0121080 | A1 | 4/2022 | Yao |
| 2022/0179055 | A1 | 6/2022 | Ferrara et al. |
| 2022/0187457 | A1 | 6/2022 | Daami et al. |
| 2022/0187458 | A1 | 6/2022 | Piggott et al. |
| 2022/0187463 | A1 | 6/2022 | Maheshwari et al. |
| 2022/0196814 | A1 | 6/2022 | Lin et al. |
| 2022/0206164 | A1 | 6/2022 | Takada |
| 2022/0244360 | A1 | 8/2022 | Phare et al. |
| 2022/0283389 | A1 | 9/2022 | Yang et al. |
| 2022/0291361 | A1 | 9/2022 | Asghari et al. |
| 2022/0308192 | A1 | 9/2022 | John et al. |
| 2022/0334225 | A1 | 10/2022 | Davydenko et al. |
| 2022/0342048 | A1 | 10/2022 | Asghari et al. |
| 2022/0365214 | A1 | 11/2022 | Sandborn et al. |
| 2022/0373667 | A1 | 11/2022 | Khatana et al. |
| 2022/0373739 | A1 | 11/2022 | Abril et al. |
| 2022/0404470 | A1 | 12/2022 | Asghari et al. |
| 2022/0413100 | A1 | 12/2022 | Jain |
| 2022/0413143 | A1 | 12/2022 | Parsa et al. |
| 2023/0027271 | A1 | 1/2023 | Jin et al. |
| 2023/0069201 | A1 | 3/2023 | Asghari et al. |
| 2023/0104453 | A1 | 4/2023 | Asghari et al. |
| 2023/0146926 | A1* | 5/2023 | Gorantla ............ G01C 21/3804 701/450 |
| 2023/0194952 | A1 | 6/2023 | Muranaka et al. |
| 2023/0228878 | A1 | 7/2023 | Asghari et al. |
| 2023/0258861 | A1 | 8/2023 | Vercruysse et al. |
| 2023/0288566 | A1 | 9/2023 | Nadkarni et al. |
| 2023/0296732 | A1 | 9/2023 | Xiao |
| 2024/0012112 | A1 | 1/2024 | Warke et al. |
| 2024/0012147 | A1 | 1/2024 | Tavallaee et al. |
| 2025/0085401 | A1 | 3/2025 | Zhou et al. |
| 2025/0094380 | A1 | 3/2025 | Mazed |

FOREIGN PATENT DOCUMENTS

| | | | |
|---|---|---|---|
| CN | 103874945 | A | 6/2014 |
| CN | 104459881 | A | 3/2015 |
| CN | 204479750 | U | 7/2015 |
| CN | 105589074 | A | 5/2016 |
| CN | 105680320 | A | 6/2016 |
| CN | 105917257 | A | 8/2016 |
| CN | 106154248 | A | 11/2016 |
| CN | 106410607 | A | 2/2017 |
| CN | 106773028 | A | 5/2017 |
| CN | 106842232 | A | 6/2017 |
| CN | 106959439 | A | 7/2017 |
| CN | 107144847 | A | 9/2017 |
| CN | 107305184 | A | 10/2017 |
| CN | 107367734 | A | 11/2017 |
| CN | 107976666 | A | 5/2018 |
| CN | 108139465 | A | 6/2018 |
| CN | 108291970 | A | 7/2018 |
| CN | 108603758 | A | 9/2018 |
| CN | 109254296 | A | 1/2019 |
| CN | 109471129 | A | 3/2019 |
| CN | 109642952 | A | 4/2019 |
| CN | 110036276 | A | 7/2019 |
| CN | 107192355 | B | 8/2019 |
| CN | 110161516 | A | 8/2019 |
| CN | 110187350 | A | 8/2019 |
| CN | 110412685 | A | 11/2019 |
| CN | 111338025 | A | 6/2020 |
| CN | 112241014 | A | 1/2021 |
| CN | 114419152 | A | 4/2022 |
| CN | 110764074 | B | 6/2022 |
| DE | 10 2015 222061 | A1 | 5/2017 |
| DE | 10 2017 200795 | A1 | 7/2018 |
| DE | 10 2017 106 226 | A1 | 9/2018 |
| DE | 102019124598 | A1 | 3/2020 |
| EP | 0 523 921 | A1 | 1/1993 |
| EP | 2796890 | A1 | 10/2014 |
| EP | 2955542 | B1 | 4/2017 |
| EP | 3276371 | A1 | 1/2018 |
| EP | 3339924 | A1 | 6/2018 |
| EP | 3259615 | B1 | 11/2019 |
| EP | 3719537 | A1 | 10/2020 |
| EP | 3 584 893 | B1 | 6/2021 |
| EP | 3889644 | A1 | 10/2021 |
| GB | 1 585 053 | A | 2/1981 |
| GB | 2173664 | A | 10/1986 |
| GB | 2586499 | A | 2/2021 |
| JP | S53-123004 | A | 10/1978 |
| JP | H05-158096 | A | 6/1993 |
| JP | H09-33872 | A | 2/1997 |
| JP | H1010227 | A | 1/1998 |
| JP | 2003224321 | A | 8/2003 |
| JP | 2004-151022 | A | 5/2004 |
| JP | 2007184511 | A | 7/2007 |
| JP | 2008160130 | A | 7/2008 |
| JP | 2008292370 | A | 12/2008 |
| JP | 2009-115696 | A | 5/2009 |
| JP | 2010151806 | A | 7/2010 |
| JP | 2010271624 | A | 12/2010 |
| JP | 2012146787 | A | 8/2012 |
| JP | 2013165407 | A | 8/2013 |
| JP | 2014202716 | A | 10/2014 |
| JP | 2015-018640 | A | 1/2015 |
| JP | 2015092184 | A | 5/2015 |
| JP | 2015-517094 | A | 6/2015 |
| JP | 2015172540 | A | 10/2015 |
| JP | 2015180735 | A | 10/2015 |
| JP | 2015230259 | A | 12/2015 |
| JP | 2016111087 | A | 6/2016 |
| JP | 2016-525209 | A | 8/2016 |
| JP | 5975203 | B2 | 8/2016 |
| JP | 2017502315 | A | 1/2017 |

(56) References Cited

FOREIGN PATENT DOCUMENTS

| | | | |
|---|---|---|---|
| JP | 2017097340 | A | 6/2017 |
| JP | 2017106897 | A | 6/2017 |
| JP | 2017524918 | A | 8/2017 |
| JP | 2017161484 | A | 9/2017 |
| JP | 2017-198514 | A | 11/2017 |
| JP | 2017-211348 | A | 11/2017 |
| JP | 2018511054 | A | 4/2018 |
| JP | 2018-512600 | A | 5/2018 |
| JP | 2018520346 | A | 7/2018 |
| JP | 2018529955 | A | 10/2018 |
| JP | 2018188284 | A | 11/2018 |
| JP | 2018200273 | A | 12/2018 |
| JP | 2019502925 | A | 1/2019 |
| JP | 2019095218 | A | 6/2019 |
| JP | 2019525195 | A | 9/2019 |
| JP | 2019-203977 | A | 11/2019 |
| JP | 2019-537012 | A | 12/2019 |
| JP | 2020-012641 | A | 1/2020 |
| JP | 2020-16639 | A | 1/2020 |
| JP | 2020-34546 | A | 3/2020 |
| JP | 2002090457 | A | 3/2020 |
| JP | 2020085723 | A | 6/2020 |
| JP | 2021004800 | A | 1/2021 |
| JP | 2021032848 | A | 3/2021 |
| JP | 7397009 | B2 | 12/2023 |
| KR | 20060086182 | A | 7/2006 |
| KR | 10-2015-0045735 | A | 4/2015 |
| KR | 20180013598 | A | 2/2018 |
| KR | 101 931 022 | B1 | 12/2018 |
| WO | 97/11396 | A1 | 3/1997 |
| WO | 2010123182 | A1 | 10/2010 |
| WO | 2010127151 | A1 | 11/2010 |
| WO | 2012123668 | A1 | 9/2012 |
| WO | 2012153309 | A2 | 11/2012 |
| WO | 2013/049579 | A1 | 4/2013 |
| WO | 2014/203654 | A1 | 12/2014 |
| WO | 2014/206630 | A1 | 12/2014 |
| WO | 2015/044370 | A1 | 4/2015 |
| WO | 2015/058209 | A1 | 4/2015 |
| WO | 2015/098027 | A1 | 7/2015 |
| WO | 2015/200800 | A1 | 12/2015 |
| WO | 2016/024332 | A1 | 2/2016 |
| WO | 2016/097409 | A2 | 6/2016 |
| WO | 2017/023107 | A1 | 2/2017 |
| WO | 2017/083597 | A1 | 5/2017 |
| WO | 2017/095817 | A1 | 6/2017 |
| WO | 2017/102156 | A1 | 6/2017 |
| WO | 2017/187510 | A1 | 11/2017 |
| WO | 2017/216581 | A1 | 12/2017 |
| WO | 2018/003852 | A1 | 1/2018 |
| WO | 2018/036946 | A1 | 3/2018 |
| WO | 2018/060318 | A1 | 4/2018 |
| WO | 2018/116412 | A1 | 6/2018 |
| WO | 2018/160240 | A2 | 9/2018 |
| WO | 2018/230474 | A1 | 12/2018 |
| WO | 2019/010320 | A1 | 1/2019 |
| WO | 2019/018894 | A1 | 1/2019 |
| WO | 2019/121069 | A1 | 6/2019 |
| WO | 2019/130472 | A1 | 7/2019 |
| WO | 2019/149815 | A1 | 8/2019 |
| WO | 2019/196135 | A1 | 10/2019 |
| WO | 2019/217761 | A1 | 11/2019 |
| WO | 2019/217857 | A1 | 11/2019 |
| WO | 2019/236430 | A1 | 12/2019 |
| WO | 2019/236464 | A1 | 12/2019 |
| WO | 2020/005537 | A1 | 1/2020 |
| WO | 2020/033161 | A1 | 2/2020 |
| WO | 2020/046513 | A1 | 3/2020 |
| WO | 2020/076566 | A1 | 4/2020 |
| WO | 2020/110779 | A1 | 6/2020 |
| WO | 2020/129284 | A1 | 6/2020 |
| WO | 2020/167515 | A1 | 8/2020 |
| WO | 2020/205450 | A1 | 10/2020 |
| WO | 2020/234797 | A1 | 11/2020 |
| WO | 2020/251633 | A1 | 12/2020 |
| WO | 2021/024038 | A1 | 2/2021 |
| WO | 2021/252894 | A1 | 12/2021 |
| WO | 2022/013422 | A1 | 1/2022 |
| WO | 2022/233503 | A1 | 11/2022 |
| WO | 2023/006470 | A1 | 2/2023 |
| WO | 2023/118295 | A1 | 6/2023 |

OTHER PUBLICATIONS

Amzajerdian et al., “Demonstration of Coherent Doppler Lidar for Navigation in GPS-Denied Environments”, Laser Radar Technology and Applications XXII, SPIE Defense and Security, Apr. 9-13, 2017, vol. 10191, 1019102.

Anderson et al., “ladar: Frequency-Modulated Continuous Wave Laser Detection AND Ranging”, Photogrammetric Engineering & Remote Sensing, vol. 83, No. 11, Nov. 2017.

Baghmisheh, B. B., “Chip-scale Lidar”, Jan. 19, 2017, Electrical Engineering and Computer Sciences University of California, Berkeley.

Behroozpour et al., “Electronic-Photonic Integrated Circulator 3D Microimaging”, IEEE Journal of Solid-State Circuits, Jan. 2017, vol. 52, No. 1, pp. 161-172.

Behroozpour, B. et al., “Lidar System Architectures and Circuits,” IEEE Communications Magazine, Oct. 2017, pp. 135-142.

Carter et al., “Lidar 101: An Introduction to Lidar Technology, Data, and Applications”, Nov. 2012, NOAA Coastal Services Center, 76 pages.

Chan, M.K, “Atmospheric transmission windows for high energy short pulse lasers”, Thesis, Naval Postgraduate School, Dec. 2003.

Chang et al., “A review of UAV autonomous navigation in GPS-denied environments”, Robots and Autonomous Systems, Dec. 2023, 170, 104533, 23 pages.

Conditional Euclidean Clustering, retrieved on Jul. 9, 2022 from https://pcl.readthedocs.io/projects/tutorials/en/latest/cluster_extraction.html#cluster-extraction.

Cooksey, Catherine C. et al., “Reflectance measurements of human skin from the ultraviolet to the shortwave infrared (250 nm to 2500 nm)”, May 23, 2013, SPIE Defense, Security, and Sensing Conference Proceedings Apr. 29-May 3, 2013, Baltimore, Maryland, vol. 8734, Active and Passive Signatures, 9 pages.

Day, I.E., et al. “Solid state absorption attenuator in silicon-on-insulator with MHz bandwidth.”, Integrated Photonics Research 2002, Vancouver, Canada, Jul. 17-19, 2002 (Optica Publishing Group, 2002), paper IFA5, 3 pages.

Doherty, Fiona, International Preliminary Report on Patentability and Written Opinion, The International Bureau of WIPO, Application No. PCT/US2024/018273, Sep. 18, 2025.

Doylend, J. K., “Two-dimensional free-space beam steering with an optical phased array on silicon-on-insulator”, Oct. 1, 2011, Optics Express, 19(22), 21595-2160.

Euclidean Cluster Extraction, retrieved on Jul. 9, 2022 from https://pcl.readthedocs.io/projects/tutorials/en/latest/conditional_euclidean_clustering. html.

Gao, S. and Hui, R., “4. Frequency-modulated continuous-wave lidar using I/Q modulator for simplified heterodyne detection”, Optics Letter, vol. 37, No. 11, Jun. 1, 2012, pp. 2022-2024.

Gemfire Corporation, “8-Channel Cyclic (Colorless) Arrayed Waveguide Grating (AWG)”, (2018). Retrieved from AMS Technologies: http://www.amstechnologies.com/products/optical-technologies/components/fiberoptics/multiplexers/awg-multiplexers/view/8-channel-cyclic-arrayed-waveguide-grating-awg/.

Goodman, J., “Speckle Phenomena in Optics Theory and Applications”, Roberts and Company, Sep. 28, 2007, 130(2), pp. 413-414.

Gulati, et al., “A Low-Power Reconfigurable Analog-to-Digital Converter”, IEEE Journal of Solid-State Circuits, Dec. 2001, vol. 36, No. 12, pp. 1900-1911.

Guo et al., “Beat-frequency adjustable Er3+-doped DBR fiber laser for ultrasound detection”, Optics Express, Jan. 31, 2011, vol. 19, No. 3, pp. 2485-2492.

Haran, T., “Short-wave infrared diffuse reflectance of Textile Materials”, Thesis, Georgia State University, 2008.

(56) References Cited

OTHER PUBLICATIONS

Heck et al., "Hybrid Silicon Photonic Integrated Circuit Technology", IEEE Journal of Selected Topics in Quantum Electronics, IEEE, USA, vol. 19, No. 4, Jul. 1, 2013, p. 6100117, 17 pages.
Hsu et al., "Free-Space Applications of Silicon Photonics: A Review, Micromachines 2022", 13, 990, Jun. 24, 2022 [Retrieved from: <URL: https://mdpi.com/2072-66X/13/7/990>.
Issakov, V. "Radar Systems, Ch. 2. In Microwave Circuits for 24GHz Automotive Radar in Silicon-based Technologies", Jan. 1, 2010, Berlin Heidelberg: Springer-Verlag, pp. 5-18.
Kaasalainen, S., "The multispectral journey of Lidar", Retrieved from GIM International: https://www.gim-international.com/content/article/the-multispectral-journey-of-lidar, Jan. 24, 2019.
Kelly et al., "Discrete mode laser diodes with ultra narrow linewidthe emission" Feb. 2007, Electronics Letters, vol. 43, 2 pgs.
Klumperink, Eric A.M. et al., "N-path filters and Mixer-First Receivers: A review", 2017 IEEE Custom Integrated Circuits Conference (CICC), Austin, TX, USA, Apr. 30, 2017, pp. 1-8.
Komljenovic et al., "Widely-Tunable Ring-Resonator Semiconductor Lasers", Review, Jul. 17, 2017, 21 pages.
Kotthaus, S., et al., "Derivation of an urban materials spectral library through emittance and reflectance spectroscopy", ISPRS Journal of Photogrammetry and Remote Sensing, Aug. 2014, vol. 94, 194-212.
Kumar et al., "Intra-data center interconnects, networking, and architectures", Coherent Detection, Optical Fiber Telecommunications VII, Oct. 25, 2019, Science Direct, pp. 627-672.
Li, L., "Time-of-Flight Camera—An Introduction", 2014, TI Technical White Paper, SLOA190B.
Li et al., "Photon-Counting Chirped Amplitude Modulation Lidar with 1.5-GHz Gated InGaAs/InP APD", IEEE Photonics Technology Letters, Mar. 15, 2015, vol. 27, No. 6, pp. 616-719.
Lu, Z., "Silicon Photonic Switches for Optical Communication Applications", PhD Thesis. University of British Columbia, Sep. 29, 2017, 165 pages.
Nevlacsil et al., "Multi-channel swept source optical coherence tomography concept based on photonic integrated circuits", Optics Express, Oct. 26, 2020, vol. 28, No. 22, pp. 32468-32482.
PDB450C—Switchable Gain Balanced Amp. Photodetector, InGaAs. (n.d.). Retrieved from Thorlabs: https://www.thorlabs.com/thorproduct.cfm?partnumber=PDB450C.
Pfennigbauer, M. et al., "Multi-Wavelength Airborne Laser Scanning", ILMF 2011. New Orleans, Feb. 7-9, 2011.
PI Motion/Positioning, 2018, Retrieved from PI USA: http://www.pi-usa.us/products/PDF_Data/Q-522_Mini_Positioning_Stage_20150203.pdf.
PI USA: Fast Tip/Tilt Platform, 2018, Retrieved from PI USA Active Optics: http://www.pi-usa.us/products/PDF_Data/S335_Fast_Tip-Tilt_Platform.pdf.
Pierrottet et al., "Linear FMCW Laser Radar for Precision Range and Vector Velocity Measurements", MRS Online Proceeding Library Archive, Jan. 2008, pp. 1-9.
Pilot Photonics, Lyra OCS 1000, Optical comb laser module, Retrieved on Nov. 20, 2019 from Pilot Photonics: http://www.pilotphotonics.com/optical-frequency-comb-source/.
Poulton, C. V. MSC Thesis, "Integrated LIDAR with Optical Phased Arrays in Silicon Photonics", Massachusetts Institute of Technology, Sep. 2016, pp. 95-101.
Poulton, Christopher V. et al., "Coherent Solid-State LIDAR with Silicon Photonic Optical Phased Arrays", pp. 4091-4094, Oct. 15, 2017, Optics Letters, vol. 42, No. 20.
Rablau, "LIDAR—A new (self-driving) vehicle for introducing optics to broader engineering and non-engineering audiences", in Fifteenth Conference on Education and Training in Optics and Photonics 2019, May 21-24, 2019, Quebec City, Quebec, Optica Publishing Group 2019, Paper 11143_138 (14 pages).
Royo et al., "An Overview of LIDAR Imaging Systems for Autonomous Vehicles", Appl. Sci., Sep. 30, 2019, 9 (19):4093, 37 pages. https://doi.org/10.3390/app9194093.
Rusu, Radu Bogdan Dissertation, Semantic 3D Object Maps for Everyday Manipulation in Human Living Environments, retrieved on Jul. 9, 2022 from http://mediatum.ub.tum.de/doc/800632/941254.pdf.
Sandborn, Phillip Alan McGinnis, "FMCW Lidar: Scaling to the Chip-Level and Improving Phase-Noise-Limited Performance", Fall 2017, 18 pages.
Satyan, N. et al., "Precise control of broadband frequency chirps using optoelectronic feedback," Optics Express, Aug. 31, 2009, vol. 17, No. 18, pp. 15991-15999.
Schulmeister, Karl, "White Paper The new edition of the international laser product safety standard", IEC 60825-1, 2014.
Self, "Focusing of spherical Gaussian beams", Applied Optics, Mar. 1, 1983, vol. 22, No. 5, pp. 658-661.
Singh, Jaswant, "Spectral Reflectance of Land Covers", Retrieved from Department of Geology, Aligharh Muslim University: http://www.geol-amu.org/notes/m1r-1-8.htm, Aug. 15, 2016, 11 pages.
Thomas, Shane, International Search Report and Written Opinion, PCT/US23/32540, International Searching Authority, United States of Patent and Trademark Office, Feb. 8, 2024.
Smit, Meint K. C. v., "Phasar-Based WDM-Devices: Principles, Design and Applications", IEEE Journal of Selected Topics in Quantum Electronics, Jan. 1, 1996, 2(2), 236-250.
Soref, Richard A. et al. "Electrooptical Effects in Silicon", IEEE Journal of Quantum Electronics, vol. QE-23, No. 1, Jan. 1987, pp. 123-129.
Stephens et al., "Demonstration of an Interferometric Laser Ranging System for a Follow-On Gravity Mission to Grace", IEEE International Symposium on Geoscience and Remote Sensing, Jul. 31, 2006 to Aug. 4, 2006, pp. 1115-1118.
Sun, J., et al., "Large-scale silicon photonic circuits for optical phased arrays," vol. 20, No. 4, Jul./Aug. 2014. IEEE Journal of Selected Topics in Quantum Electronics.
"The Demultiplexer" accessed from www.electronics-tutorials.ws/combination/comb_3.html with WayBack Machine dated Feb. 9, 2008, 2 pages.
Van Acoleyen et al., "Off-chip beam steering with a one-dimensional optical phased array on silicon-on-insulator", Apr. 2009, Opt. Lett., 34(9) 1477-1479.
Van Acoleyen et al., "Two-Dimensional Dispersive Off-Chip Beam Scanner Fabricated on Silicon-On-Insulator", Jun. 16, 2011, IEEE Photon. Technol. Lett., 23(17), 1270-1272.
Vasilyev, A. et al., "The Optoelectronic Swept-Frequency Laser and Its Applications in Ranging, Three-Dimensional Imaging, and Coherent Beam Combining of Chirped-Seed Amplifiers," CaltechThesis, May 20, 2013, 177 pages.
Velodyne, "HDL-64E S2 Datasheet. Retrieved from http://velodynelidar.com/lidar/products/brochure/HDL-64E%20S2%20datasheet_2010_lowres.pdf", 2017.
Wang et al., "Automotive FMCW Radar-enhanced Range Estimation via a Local Resampling Fourier Transform", International Journal of Advanced Robotic Systems, May 15, 2016, pp. 1-8.
Wikipedia, Optical Attenuator, 2022, 3 pages.
Wojtanowski, J. et al., "Comparison of 905 nm and 1550 nm semiconductor laser rangefinders' performance deterioration due to adverse environmental conditions", Opto-Electronics Review, 22(3), 183-190, Jun. 13, 2014.
Wojtkiewicz et al., "Two-dimensional signal processing in FMCW radars", National Conference on Circuit Theory and Electronic Networks, vol. 2, Oct. 1997, pp. 1-6.
Zhu et al., "Dual-Comb Ranging", Engineering, 4, Oct. 16, 2018, pp. 772-778.

* cited by examiner

COMBINING DATA FROM DIFFERENT SAMPLE REGIONS IN AN IMAGING SYSTEM FIELD OF VIEW

FIELD

The invention relates to imaging systems. In particular, the invention relates to LIDAR systems.

BACKGROUND

There is an increasing commercial demand for 3D imaging systems that can be economically deployed in applications such as ADAS (Advanced Driver Assistance Systems) and AR (Augmented Reality). Imaging systems such as LIDAR (Light Detection and Ranging) are used to construct a 3D image of a target scene by illuminating the scene with laser light and measuring the returned signal.

Many LIDAR approaches transmit a system output signal. The system output signal is reflected by an object and a portion of the reflected light signal returns to the LIDAR chip as a LIDAR input signal. The LIDAR input signal is processed by electronics so as to determine the distance and radial velocity between the LIDAR system and the object. Because the LIDAR input signal is generally an analog signal but the processing is performed on digital signals, the LIDAR system often includes one or more an Analog-to-Digital Converters (ADC) for converting a light signal that includes light from the LIDAR input signal to a digital signal. The Analog-to-Digital Converters (ADC) become a significant expense in the commercialization of LIDAR systems.

For the above, reasons there is a need for a LIDAR system having reduced costs and complexity.

SUMMARY

An imaging system includes one or more cores that each outputs a system output signal that illuminates multiple sample regions in a field of view. A reference one of the cores includes a light combiner configured to generate a composite signal beating at a beat frequency. The system also includes electronics configured to use a value of the beat frequency of the composite signal to calculate a magnitude of a radial velocity indicator for a reference one of the sample regions illuminated by the system output signal output from the reference core. The radial velocity indicator indicates a radial velocity between the LIDAR system and an object in the reference sample region. The electronics are configured to identify a direction of the radial velocity indicator by comparing the magnitude of the radial velocity indicator to data calculated for a subject one of the sample regions. The reference sample region is different from the subject sample region.

Another embodiment of an imaging system includes one or more cores. Each of the cores outputs a system output signal that illuminates multiple sample regions in a field of view. A subject one of the cores includes a light combiner that generates a composite signal beating at a beat frequency. Electronics use a value of the beat frequency to calculate multiple different possible LIDAR data solutions for a subject one of the sample regions illuminated by the system output signal output from the subject core. Each of the possible LIDAR data solutions includes a comparative component that indicates a value of a radial velocity between the LIDAR system and an object in the subject sample region. The electronics identify a correct one of the LIDAR data solutions by comparing the LIDAR data solutions to data calculated for one or more reference sample regions selected from among the sample regions. The one or more reference sample regions are different from the subject sample region.

A method of operating an imaging system includes illuminating multiple sample regions in a field of view with system output signals output from different cores. The method also includes combining light signals so as to generate a composite signal beating at a beat frequency. The method also includes using the value of the beat frequency of the composite signal to calculate a magnitude of a radial velocity indicator for a reference one of the sample regions illuminated by the system output signal output from the reference core. The radial velocity indicator indicates a radial velocity between the LIDAR system and an object in the reference sample region. The method also includes identifying a direction of the radial velocity indicator by comparing the magnitude of the radial velocity indicator to data calculated for a subject one of the sample regions. The reference sample region is different from the subject sample region.

Another method of operating an imaging system includes illuminating multiple sample regions in a field of view with system output signals output from different cores. The method also includes combining light signals so as to generate a composite signal beating at a beat frequency. The method also include using the value of the beat frequency to calculate multiple different possible LIDAR data solutions for a subject one of the sample regions. Each of the possible LIDAR data solutions includes a comparative component that indicates a value of a radial velocity between the LIDAR system and an object in the subject sample region. The method further includes identifying a correct one of the LIDAR data solutions by comparing the LIDAR data solutions to data calculated for one or more reference sample regions selected from among the sample regions. The one or more reference sample regions are different from the subject sample region.

DESCRIPTION

LIDAR systems typically illuminate multiple different sample regions in a field of view. The systems generate LIDAR data for each of the sample regions. The LIDAR data can indicate the radial velocity and/or distance between the LIDAR system and any object(s) located in each of the fields of view. These systems frequently apply a mathematical transform such as a Fourier transform to a beating signal so as to identify the beat frequency of the beating signal. When a real transform is used, the transform can output multiple different frequencies. In many circumstances, it is not clear which of these frequencies is the correct frequency. As a result, multiple solutions for a sample region's LIDAR data are often possible. In order to identify which of the solutions is correct for a sample region, the LIDAR system compares the possible LIDAR data solution for the sample region with data from other sample regions. As a result, the LIDAR system can use real Fourier transforms rather than complex Fourier transforms. Real Fourier transforms typically require fewer Analog-to-Digital Converters (ADC) than are required by complex Fourier transforms. As a result, the ability to use real Fourier transforms reduces the costs and complexity of the LIDAR system.

Figure 1A:
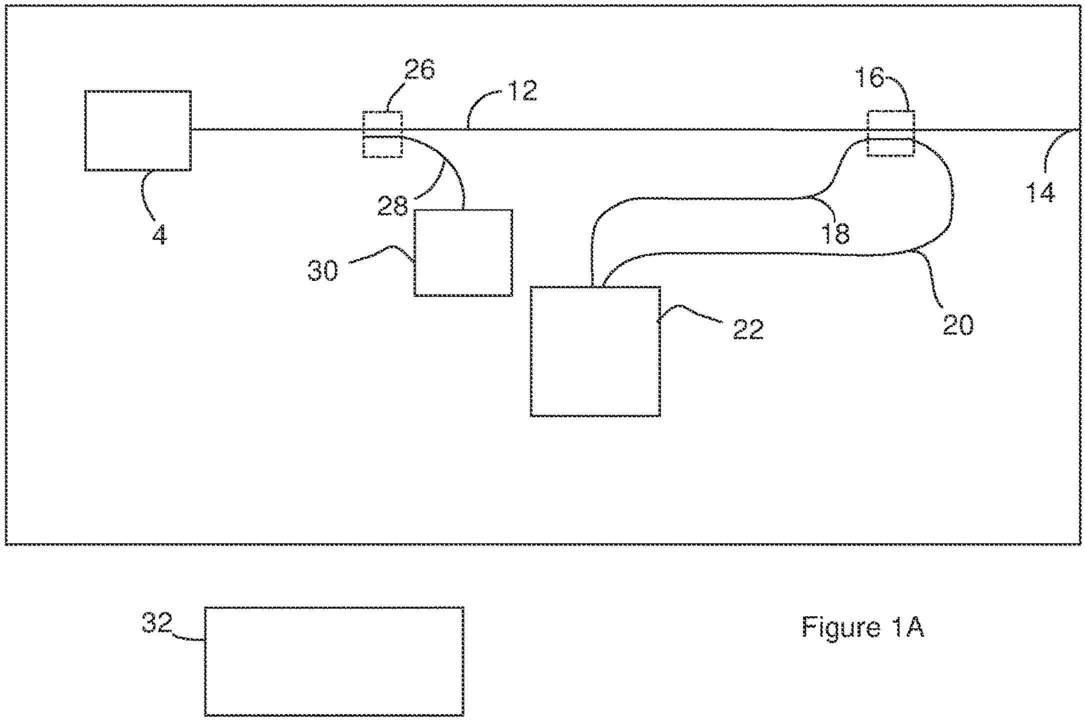
FIG. 1A is a topview of a schematic of a LIDAR system that includes or consists of a LIDAR chip that outputs a LIDAR output signal and receives a LIDAR input signal on a common waveguide.

FIG. 1A is a topview of a schematic of a LIDAR chip that can serve as a LIDAR core or can be included in an imaging system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the environment and/or atmosphere in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR core, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a signal processor 22 for further processing. Although FIG. 1A illustrates a directional coupler operating as the splitter 16, other signal tapping components can be used as the splitter 16. Suitable splitters 16 include, but are not limited to, directional couplers, optical couplers, y-junctions, tapered couplers, and Multi-Mode Interference (MIMI) devices.

The utility waveguide 12 also carrier the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the signal processor 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMI) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MIMI) and the outgoing percentage and the incoming percentage are 50% or substantially 50%. As will be described in more detail below, the signal processor 22 combines the comparative signal with the reference signal to form a composite signal that carries LIDAR data for a sample region on the field of view. Accordingly, the composite signal can be processed so as to extract LIDAR data (radial velocity and/or distance between a LIDAR core and an object external to the LIDAR core) for the sample region.

The LIDAR chip can include a control branch for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, y-junctions, tapered couplers, and Multi-Mode Interference (MIMI) devices.

The control waveguide 28 carries the tapped signal to control components 30. The control components can be in electrical communication with local electronics 32. All or a portion of the control components can be included in the local electronics 32. During operation, the electronics can employ output from the control components 30 in a control loop configured to control a process variable of one, two, or three loop controlled light signals selected from the group consisting of the tapped signal, the system output signal, and the outgoing LIDAR signal. Examples of the suitable process variables include the frequency of the loop controlled light signal and/or the phase of the loop controlled light signal.

Figure 1B:
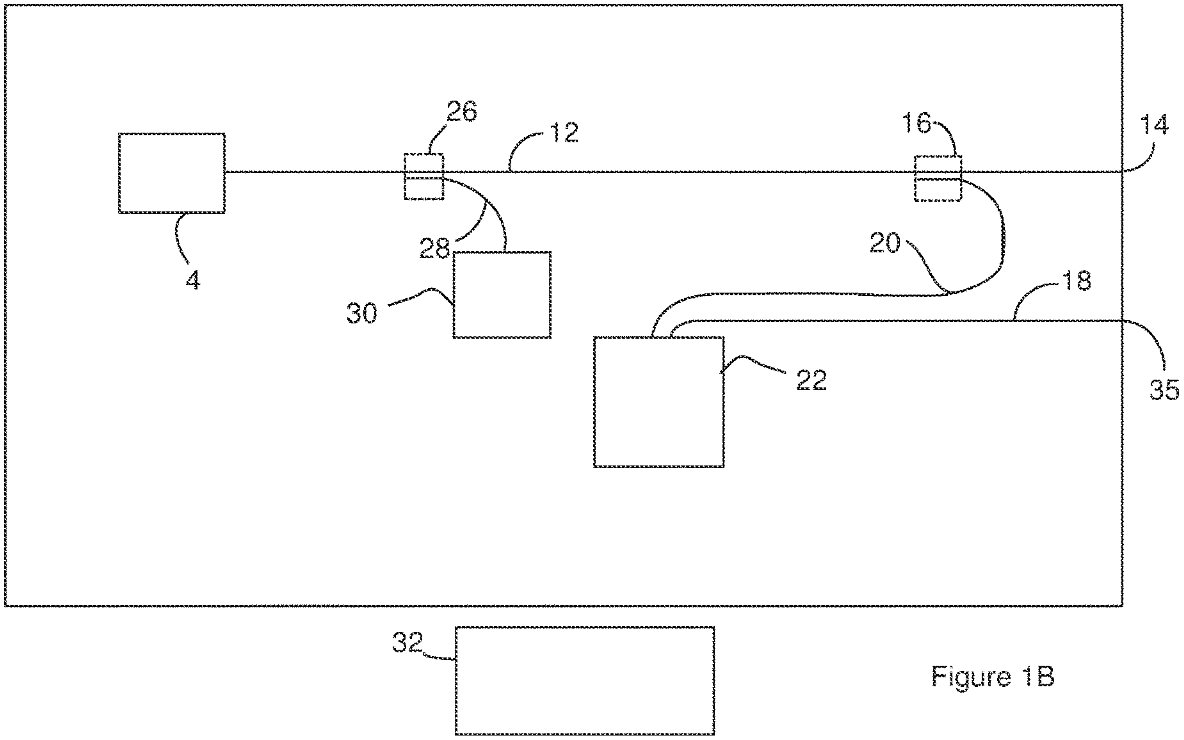
FIG. 1B is a topview of a schematic of a LIDAR system that includes or consists of a LIDAR chip that outputs a LIDAR output signal and receives a LIDAR input signal on different waveguides.

The LIDAR core can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR core, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a signal processor 22 for further processing. As described in the context of FIG. 1A, the reference waveguide 20 carries the reference signal to the signal processor 22 for further processing. As will be described in more detail below, the signal processor 22 combines the comparative signal with the reference signal to form a composite signal that carries LIDAR data for a sample region on the field of view.

Figure 1C:
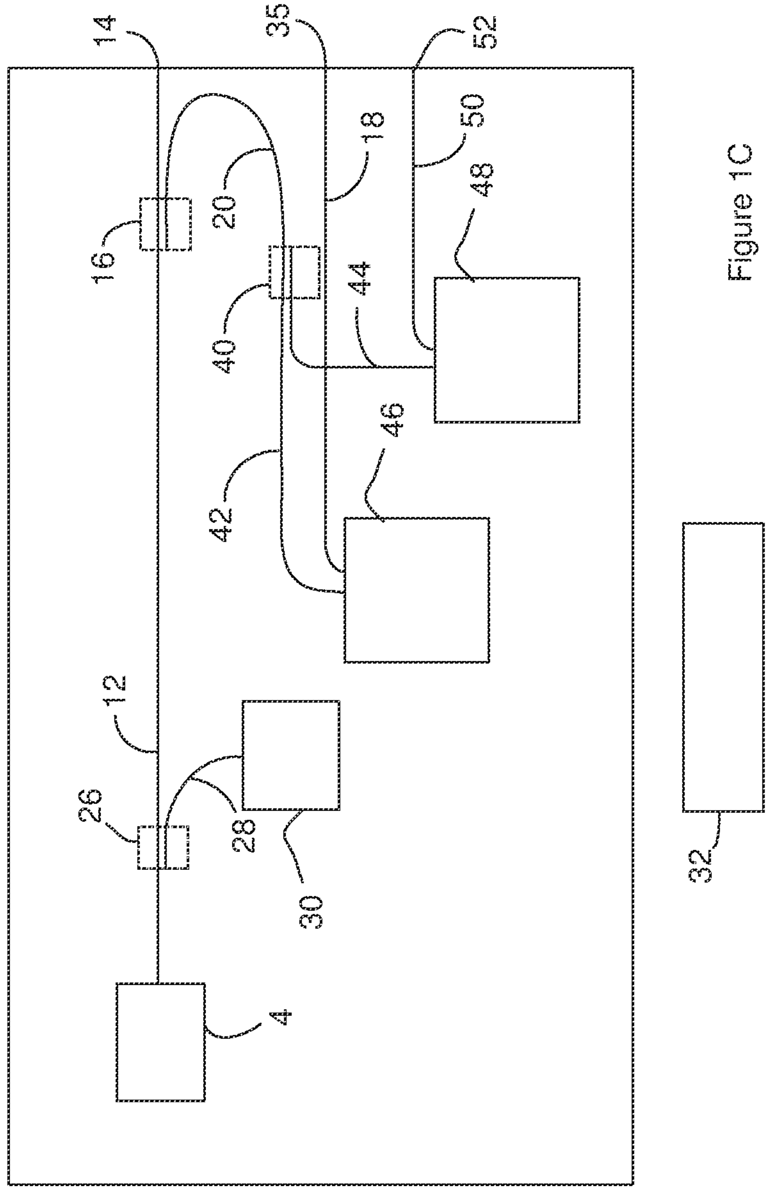
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first signal processor 46 and the second reference waveguide 44 carries the second reference signal to a second signal processor 48. Examples of suitable splitters 40 include, but are not limited to, y-junctions, optical couplers, and multi-mode interference couplers (MMIs).

The outgoing LIDAR signal exits the LIDAR chip through the facet 14 and serves as the LIDAR output signal. When light from the LIDAR output signal is reflected by one or more object located external to the LIDAR core, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first signal processor 46 for further processing.

Additionally, when light from the LIDAR output signal is reflected by one or more object located external to the LIDAR core, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second signal processor 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
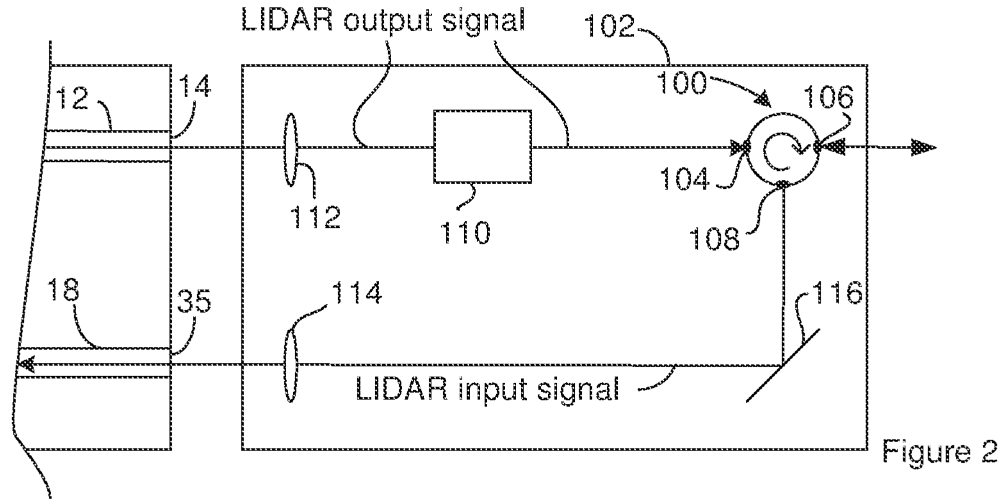
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR core. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR core, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the local electronics 32 allowing the local electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the environment and/or atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR core can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90°, the LIDAR data can be lost in the resulting composite signal. However, the LIDAR core can be modified to compensate for changes in polarization state of the LIDAR output signal.

Figure 3:
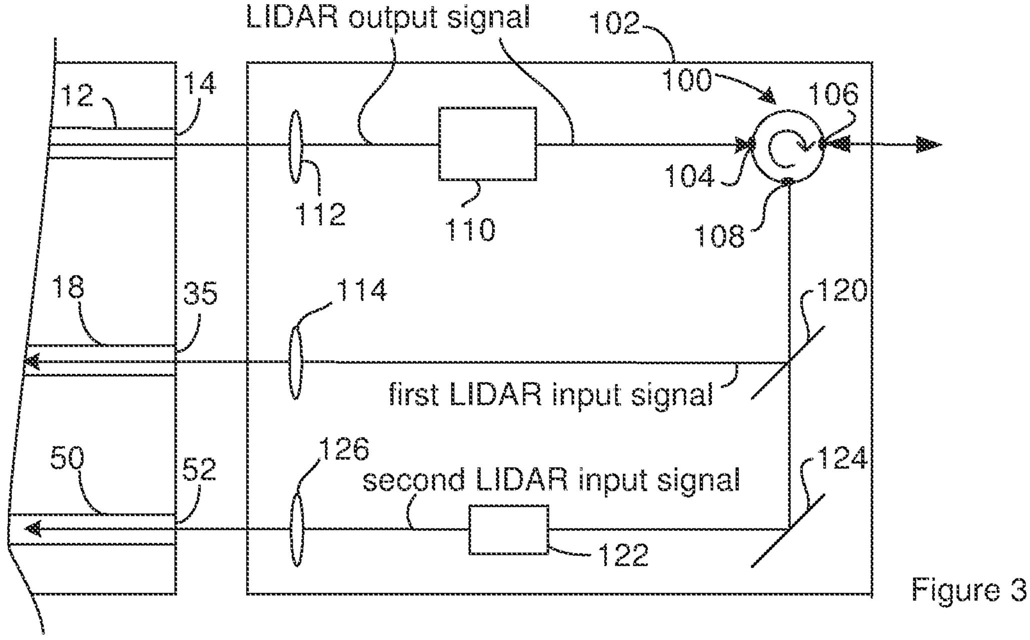
FIG. 3 is a topview of an example of a LIDAR adapter that is suitable for use with the LIDAR chip of FIG. 1C.

FIG. 3 illustrates the LIDAR core of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly be polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first signal processor 46 and second composite signals generated by the second signal processor 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR core and the reflecting object determined from the composite signal with the distance determined from the second composite signal and/or the electronics can average the radial velocity between the LIDAR core and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR core. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR core compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
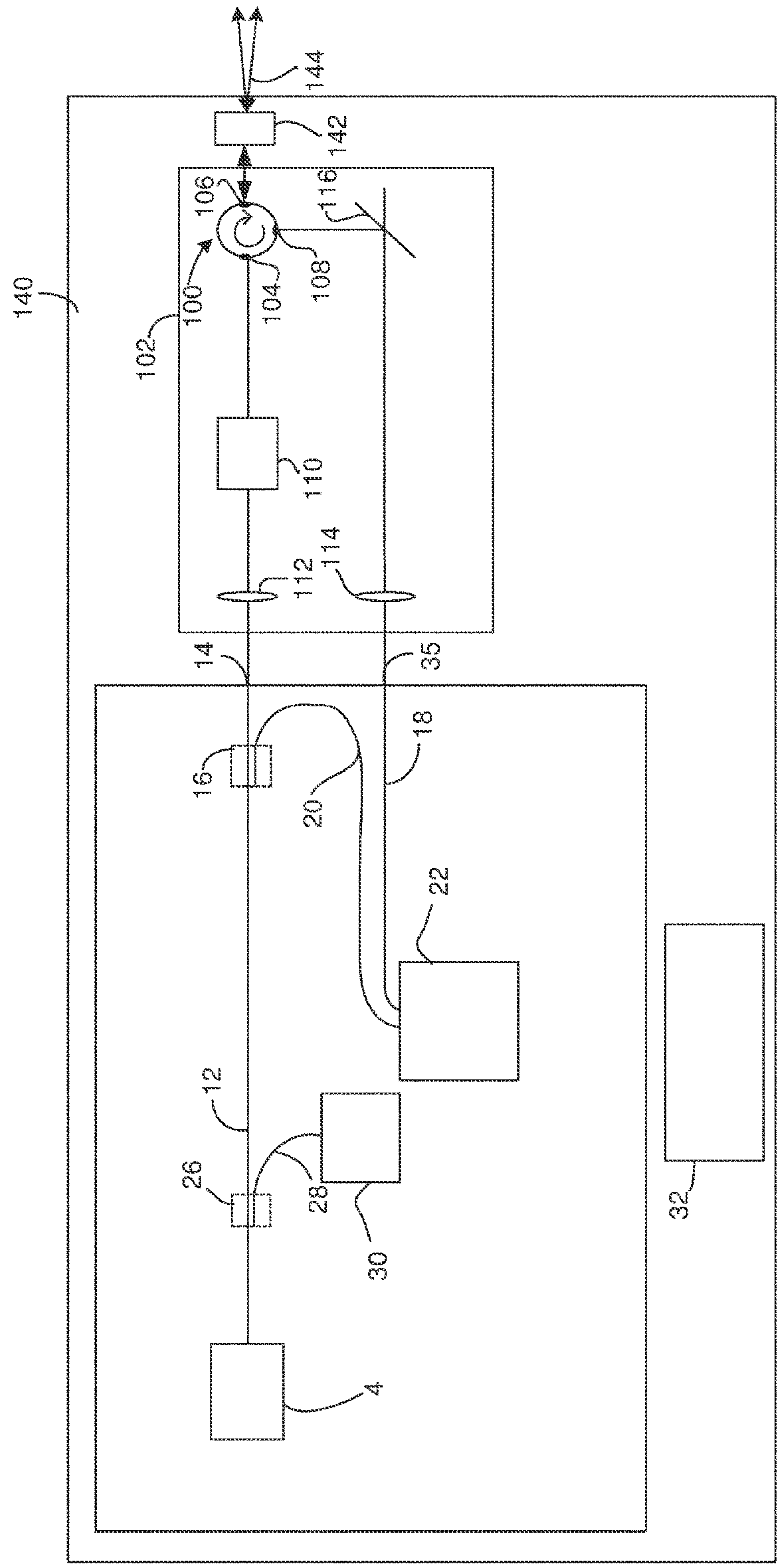
FIG. 4 is a topview of an example of a LIDAR system that includes the LIDAR chip of FIG. 1A and the LIDAR adapter of FIG. 2 on a common support.

When the LIDAR core includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR core that includes the LIDAR chip and local electronics 32 of FIG. 1A and the LIDAR adapter of FIG. 2 on a common support 140. Although the local electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

Figure 5A:
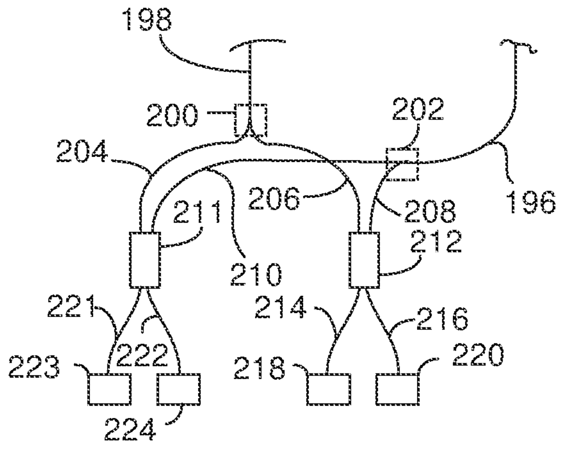
FIG. 5A illustrates an example of a signal processor suitable for use with the LIDAR systems.
Figure 5B:
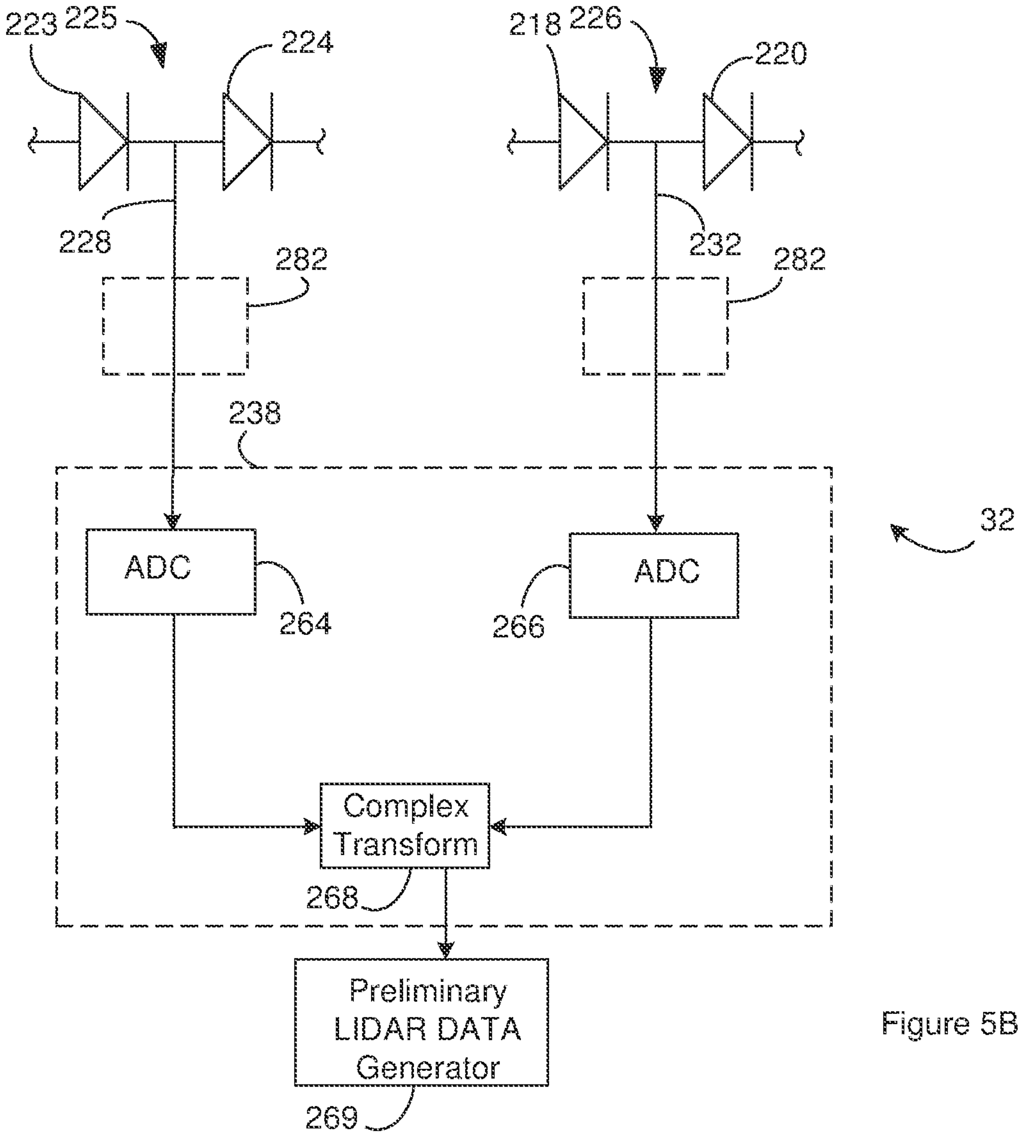
FIG. 5B provides a schematic of electronics that are suitable for use with a signal processor constructed according to FIG. 5A.
Figure 5C:
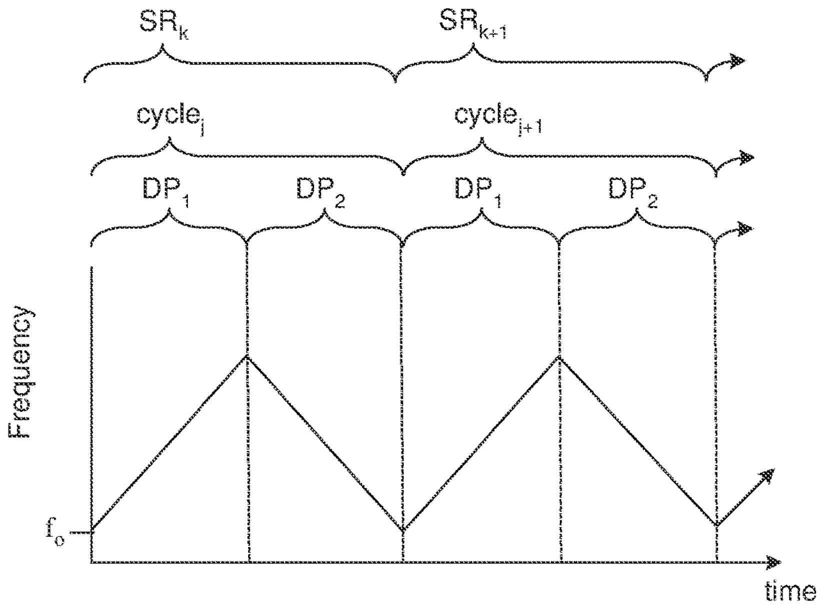
FIG. 5C is a graph of frequency versus time for a system output signal.

FIG. 5A through FIG. 5C illustrate an example of a suitable signal processor for use as all or a fraction of the signal processors selected from the group consisting of the signal processor 22, the first signal processor 46 and the second signal processor 48. The signal processor receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The signal processor includes a second splitter 200 that divides the comparative signal carried on the comparative waveguide 196 onto a first comparative waveguide 204 and a second comparative waveguide 206. The first comparative waveguide 204 carries a first portion of the comparative signal to the signal combiner 211. The second comparative waveguide 208 carries a second portion of the comparative signal to the second signal combiner 212.

The signal processor includes a first splitter 202 that divides the reference signal carried on the reference waveguide 198 onto a first reference waveguide 204 and a second reference waveguide 206. The first reference waveguide 204 carries a first portion of the reference signal to the signal combiner 211. The second reference waveguide 208 carries a second portion of the reference signal to the second signal combiner 212.

The second signal combiner 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second signal combiner 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second signal combiner 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second signal combiner 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first signal combiner 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first signal combiner 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the signal combiner 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the signal combiner 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second signal combiner 212 splits the second composite signal such that the portion of the comparative signal in the first portion of the second composite signal is phase shifted by 180° relative to the portion of the comparative signal in the second portion of the second composite signal, the signal combiner 211 also splits the composite signal such that the portion of the comparative signal in the first portion of the composite signal is phase shifted by 180° relative to the portion of the comparative signal in the second portion of the composite signal. When the second signal combiner 212 splits the second composite signal such that the portion of the reference signal in the first portion of the second composite signal is phase shifted by 180° relative to the portion of the reference signal in the second portion of the second composite signal, the signal combiner 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 5B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The local electronics 32 include a beat frequency finder 238 configured to find the beat frequency of the composite signal. The beat frequency finder 238 can perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The beat frequency finder 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The beat frequency finder 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The beat frequency finder 238 includes a transformer 268 that receives the complex data signal. For instance, the transformer 268 receives the first digital data signal from the first Analog-to-Digital Converter (ADC) 264 as an input and also receives the second digital data signal from the second Analog-to-Digital Converter (ADC) 266 as an input. The transformer 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. The electronics use the one or more frequency peaks output from the transformer 268 for further processing to generate the LIDAR data (distance and/or radial velocity between the reflecting object and the LIDAR chip or LIDAR core). The local electronics 32 can include a peak finder (not shown) to identify the beat frequencies of the one or more frequency peaks.

The local electronics 32 can include a preliminary LIDAR data generator 269 configured receive the beat frequencies from the transformer 268. The preliminary LIDAR data generator 269 is configured to generate preliminary LIDAR data for a sample region. LIDAR data for a sample region includes values for the radial velocity and/or separation distance between the LIDAR system and an object in the sample region. In some instances, the LIDAR data includes an indicator that the LIDAR data for that sample region is "not available." In some instances, the preliminary LIDAR data generator 269 calculates LIDAR data that serves as the preliminary LIDAR data. For instance, in some instances, the preliminary LIDAR data generator 269 calculates the radial velocity and/or separation distance between the LIDAR system and an object in the sample region as the preliminary LIDAR data. As will be discussed below, other examples of preliminary LIDAR data that can be calculated by the preliminary data generator include, but are not limited to, possible solutions for the LIDAR data for the sample region and a potential radial velocity magnitude indicator and/or a velocity magnitude indicator for the sample region. The transformer 268 and/or the preliminary LIDAR data generator 269 can execute the attributed functions using firmware, hardware or software or a combination thereof.

Although FIG. 5A illustrates signal combiners that combine a portion of the reference signal with a portion of the comparative signal, the signal processor can include a single signal combiner that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

The electronics tune the frequency of the system output signal over time. The system output signal has a frequency versus time pattern with a repeated cycle. FIG. 5C shows an example of a suitable frequency versus time pattern for the system output signal. The base frequency of the system output signal ($f_o$) can be the frequency of the system output signal at the start of a cycle.

FIG. 5C shows frequency versus time for a sequence of two cycles labeled $cycle_j$ and $cycle_{j+1}$. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan.

Each cycle includes M data periods that are each associated with a period index m and are labeled $DP_m$. In the example of FIG. 5C, each cycle includes three data periods labeled $DP_m$ with m=1 and 2. In some instances, the frequency versus time pattern is the same for the data periods that correspond to each other in different cycles as is shown in FIG. 5C. Corresponding data periods are data periods with the same period index. As a result, each data period $DP_1$ can be considered corresponding data periods and the associated frequency versus time patterns are the same in FIG. 5C. At the end of a cycle, the electronics return the frequency to the same frequency level at which it started the previous cycle.

During the data period $DP_m$, the electronics operate the light source such that the frequency of the system output signal changes at a linear rate $\alpha_m$ (the chirp rate). In FIG. 5C, $\alpha_2=-\alpha_1$.

FIG. 5C labels sample regions that are each associated with a sample region index k and are labeled $SR_k$. FIG. 5C labels sample regions $SR_{k-1}$ through $SR_{k+1}$. Each sample region is illuminated with the system output signal during the data periods that FIG. 5C shows as associated with the sample region. For instance, sample region $SR_{k+1}$ is illuminated with the system output signal during the data period labeled $DP_2$ within cycle j+1 and the data period labeled $DP_1$ within cycle j+1. Accordingly, the sample region labeled $SR_{k+1}$ is associated with the data periods labeled $DP_1$ and $DP_2$ within cycle j+1. The sample region indices k can be assigned relative to time. For instance, the samples regions can be illuminated by the system output signal in the sequence indicated by the index k. As a result, the sample region $SR_{10}$ can be illuminated after sample region $SR_9$ and before $SR_{11}$.

The frequency output from the Complex Fourier transform represents the beat frequency of the composite signals that each includes a comparative signal beating against a reference signal. The beat frequencies from two or more different data periods that are associated with the same sample region can be combined to generate the LIDAR data. For instance, the beat frequency determined from $DP_1$ during the illumination of sample region $SR_k$ can be combined with the beat frequency determined from $DP_2$ during the illumination of sample region $SR_k$ to determine the LIDAR data for sample region $SR_k$. As an example, the following equation applies during a data period where electronics increase the frequency of the outgoing LIDAR signal during the data period such as occurs in data period $DP_1$ of FIG. 5C: $f_{ub}=-f_d+\alpha_u\tau$ where $f_{ub}$ is the frequency provided by the transformer 268, $f_d$ represents the Doppler shift ($f_d=2V_kf_c/c$) where $f_c$ represents the optical frequency ($f_o$), c represents the speed of light, $V_k$ is the radial velocity between the reflecting object and the LIDAR core where the direction from the reflecting object toward the chip is assumed to be the positive direction, c is the speed of light, and $\alpha_u$ represents a chirp rate ($\alpha_m$) for the data period where the frequency of the system output signal increases with time ($\alpha_1$ in this case). The radial velocity can be a relative radial velocity since the LIDAR core and the object can both be in motion or the LIDAR core and/or the object can be stationary.

The following equation applies during a data period where the frequency of the outgoing LIDAR signal decreases such as occurs in data period $DP_2$ of FIG. 5C: $f_{db}=-f_d-\alpha_d\tau$ where $f_{db}$, is a frequency provided by the transformer 268, and $\alpha_d$ represents the chirp rate ($\alpha_m$) for the data period where the frequency of the system output signal increases with time ($\alpha_2$ in this case). In these two equations, $f_d$ and $\tau$ are unknowns. These equations can be solved for the two unknowns. The electronics, such as a preliminary LIDAR data generator 269, can calculate the radial velocity for sample region k ($V_k$) from the Doppler shift ($V_k=c*f_d/(2f_c)$) and/or the separation distance for sample region k ($R_k$) from $c*\tau/2$.

When a LIDAR core includes a signal processor constructed as disclosed in the context of FIG. 5A through FIG. 5C and the electronics are configured to calculate the radial velocity and distance between the LIDAR core and the objects for each of the sample regions, the LIDAR core is suitable for use as a range and velocity core. However, a LIDAR core can include a signal processor constructed as disclosed in the context of FIG. 5A through FIG. 5B and the electronics can be configured to calculate the radial velocity without calculating the distance. In these instances, the LIDAR core is suitable for use as a velocity core.

In an example of a velocity core, the electronics can operate the light source 4 such that the system output signal having a frequency that is a function of time disclosed in the context of FIG. 5C is replaced by a system output signal where the frequency of the system output signal is not a function of time. For instance, the frequency of the system output signal can be constant during each of the data periods shown in FIG. 5C. As an example, the system output signal can be a continuous wave (CW). For instance, the outgoing LIDAR signal, and accordingly the system output signal, can be an unchirped continuous wave (CW). As an example, the outgoing LIDAR signal, and accordingly the LIDAR output signal, can be represented by Equation 2: G*cos(H*t) where G and H are constants and t represents time. In some instances, G represents the square root of the power of the outgoing LIDAR signal.

Since the frequency of system output signal is constant, changing the distance between reflecting object and LIDAR chip does not cause a change to the frequency of the LIDAR input signal. As a result, the separation distance does not contribute to the shift in the frequency of the LIDAR input signal relative to the frequency of the LIDAR output signal. Accordingly, the effect of the separation distance has been removed or substantially from the shift in the frequency of the LIDAR input signal relative to the frequency of the system output signal.

A velocity core can have a signal processor constructed as disclosed in the context of FIG. 5A and FIG. 5B. As discussed above in the context of FIG. 5B, the first Analog-to-Digital Converter (ADC) 264 receives the first data signal 228 and outputs a first digital data signal. The second Analog-to-Digital Converter (ADC) 266 receives the second data signal and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transformer 268 receives the complex data signal. The transformer 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip. Since the frequency shift provided by the transformer 268 does not have input from a frequency shift due to the separation distance between the reflecting object and the LIDAR chip, and because of the complex nature of the velocity data signal, the output of the transformer 268 can be used to calculate the radial velocity between the reflecting object and the LIDAR chip. For instance, the electronics, such as a preliminary LIDAR data generator, can approximate the radial velocity between the reflecting object and the LIDAR chip (v) using Equation 4: $v=c*f_d/(2*f_c)$ where $f_d$ is approximated as the peak frequency output from the transformer 268, c is the speed of light, and $f_c$ represents the frequency of the LIDAR output signal. As a result, multiple data periods and/or chirping are not needed for a velocity core to calculate the radial velocity.

The first Analog-to-Digital Converter (ADC) 264 converts the first data signal to the first digital data signal by sampling the first data signal at a sampling rate. Similarly, the second Analog-to-Digital Converter (ADC) 266 converts the second data signal to the second digital data signal by sampling the second data signal at a sampling rate. When a velocity core uses a continuous wave as a first data signal and a second data signal, the effects of distance between the reflecting object and LIDAR chip are effectively removed from the beating of the composite signal and the resulting electrical signals. Accordingly, the beat frequency of the composite signal is reduced and the required sampling rate is reduced. For instance, the sampling rate of the Analog-to-Digital Converters in a range and velocity core can be on the order of 4 GSPS. In contrast, the sampling rate of the Analog-to-Digital Converters in a velocity core can be on the order of 400 MSPS.

Although the signal processor of FIG. 5A and FIG. 5B are disclosed in the context of a complex data signal, a real data signal can be used. As a result, the signal processor of FIG. 5A and FIG. 5B can be modified so as to exclude the components associated with the second data signal together and the transformer 268 can be configured to real Fourier Transform (FFT). Accordingly, the signal processor can include a single signal combiner 211 and a single Analog-to-Digital Converters (ADC).

Figure 6A:
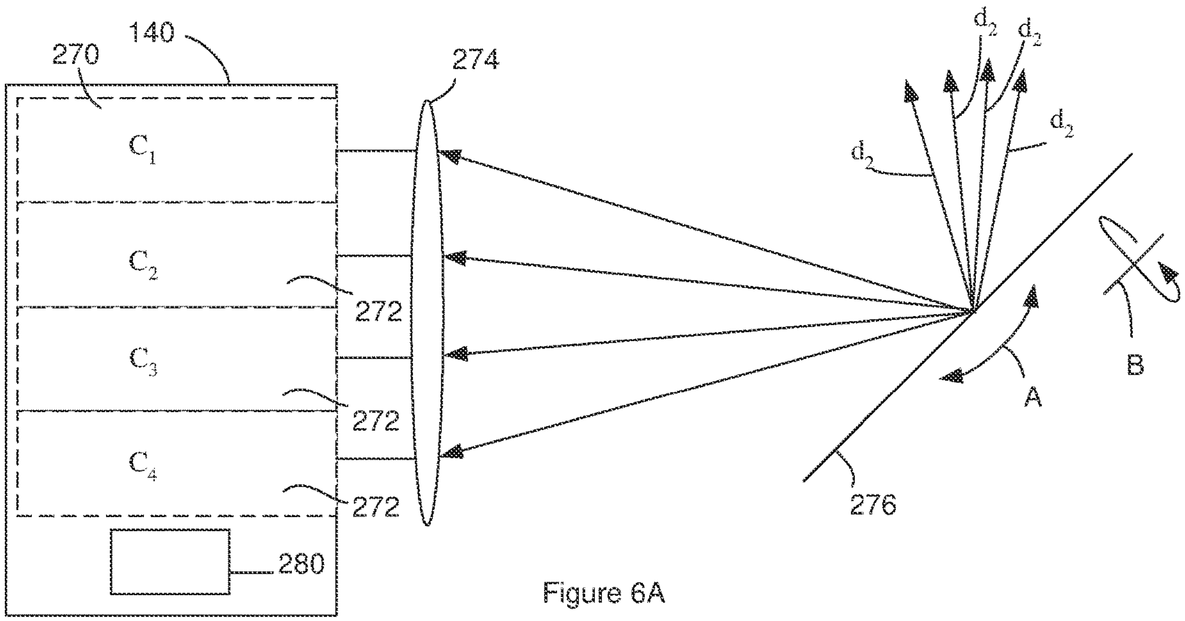
FIG. 6A illustrates a LIDAR system that includes multiple different cores on a common support.

A LIDAR system can include one or more range and velocity cores and one or more velocity cores. As an example, FIG. 6A illustrates a LIDAR system that includes multiple different cores on a common support 140. Each of the LIDAR cores can be constructed as disclosed in the context of FIG. 1A through FIG. 5 or can have an alternate construction. One or more of the LIDAR cores can be a velocity core and one or more of the LIDAR cores can be a range and velocity core. For the purpose of illustration, the LIDAR cores in the LIDAR system of FIG. 6A include one range and velocity core 270 and three velocity cores 272.

Each of the LIDAR cores outputs a different system output signal. The system output signal are each received by a redirection component 274 that re-directs the system output signals. Suitable redirection component 274 include, but are not limited to, convex lenses and concave mirrors. The system output signal output from the collimator 274 are received by one or more beam steering components 276 that output the system output signals. The direction that the system output signal travels away from the LIDAR system is labeled $d_2$ in FIG. 6A. The electronics can operate the one or more beam steering components 276 so as to steer the each of the system output signal to different sample regions in a field of view. As is evident from the arrows labeled A and B in FIG. 6A, the one or more beam steering components 276 can be configured such that the electronics can steer the system output signals in two dimensions or in three dimensions. As a result, the one or more beam steering components 276 can function as a beam-steering mechanism that is operated by the electronics so as to steer the system output signals within the field of view of the LIDAR system. Suitable beam steering components 276 include, but are not limited to, movable mirrors, MEMS mirrors, optical phased arrays (OPAs), optical gratings, and actuated optical gratings. In some instances, the redirection component 274 and/or the one or more beam steering components 276 are configured to operate on the system output signals such that the system output signals are collimated or substantially collimated as they travel away from the LIDAR system. Additionally or alternately, the LIDAR system can include one or more collimating optical components (not illustrated) that operate on the system output signals such that the system output signals are collimated or substantially collimated as they travel away from the LIDAR system.

As noted above, the sampling rates for the ADCs on the velocity cores can be lower than the sampling rates for the ADCs on the range and velocity cores. In some instances, the LIDAR assembly includes velocity cores having ADCs with sampling rates greater than 100, 200, or 300 and less than 500, 800, or 1000 MSPS (mega-samples per second) and/or the range and velocity cores having ADCs with sampling rates greater than 1, 2, or 3 and less than 5, 8, or 10 GSPS (giga-samples per second). In some instances, a ratio of the sampling rates for the ADCs on the one or more velocity cores to the sampling rates on the one or more range and velocity cores is greater than 2:1, 5:1, or 10:1 and less than 15:1, 50:1, or 100:1. Additionally or alternately, the velocity cores can be lower bandwidth cores than the range and velocity cores. As an example, the light detectors in the velocity cores can be used with Transimpedance Amplifiers (TIAs) that convert the current of the resulting data signal output from the light detectors to a voltage. For instance, FIG. 5B illustrates Transimpedance Amplifiers 282 that are optionally positioned along the first data line 228 and the second data line 232 so as to convert the current of the first data signal to a voltage and so as to convert the current of the second data signal to a voltage. The Transimpedance Amplifiers (TIAs) and the associated circuitry in the one or more velocity cores can be configured to operate at lower bandwidth than the Transimpedance Amplifiers (TIAs) and the associated circuitry in the one or more range and velocity cores. In some instances, the LIDAR assembly includes one or more velocity cores that operate at a bandwidth range of more than 0.1 Gz, 0.2 Gz, or 0.3 Gz and less than 0.5 Gz, 1 Gz, or 2 Gz and one or more range and velocity cores that operate at a bandwidth range of more than 0.5 Gz, 1 Gz, or 1.5 Gz and less than 2 Gz, 3 Gz, or 5 Gz. In some instances, a ratio of the bandwidth for the one or more range and velocity cores: the bandwidth for the one or more velocity cores is greater than 2:1, 4:1, or 8:1 and less than 10:1, 15:1, or 20:1. The reduced bandwidth requirements of the velocity cores relative to the range and velocity cores allows the velocity cores to operate at lower frequencies and accordingly reduces the costs associated with the components on the velocity cores. In some instances, the LIDAR assembly includes one or more velocity cores that have TIAs that operate at a bandwidth range of more than 0.1 Gz, 0.2 Gz, or 0.3 Gz and less than 0.5 Gz, 1 Gz, or 2 Gz and one or more range and velocity cores that have TIAs that operate at a bandwidth range of more than 0.5 Gz, 1 Gz, or 1.5 Gz and less than 2 Gz, 3 Gz, or 5 Gz. In some instances, a ratio of the bandwidth for the TIAs in the one or more range and velocity cores: the bandwidth for the TIAs in the one or more velocity cores is greater than 2:1, 4:1, or 8:1 and less than 10:1, 15:1, or 20:1.

Figure 6B:
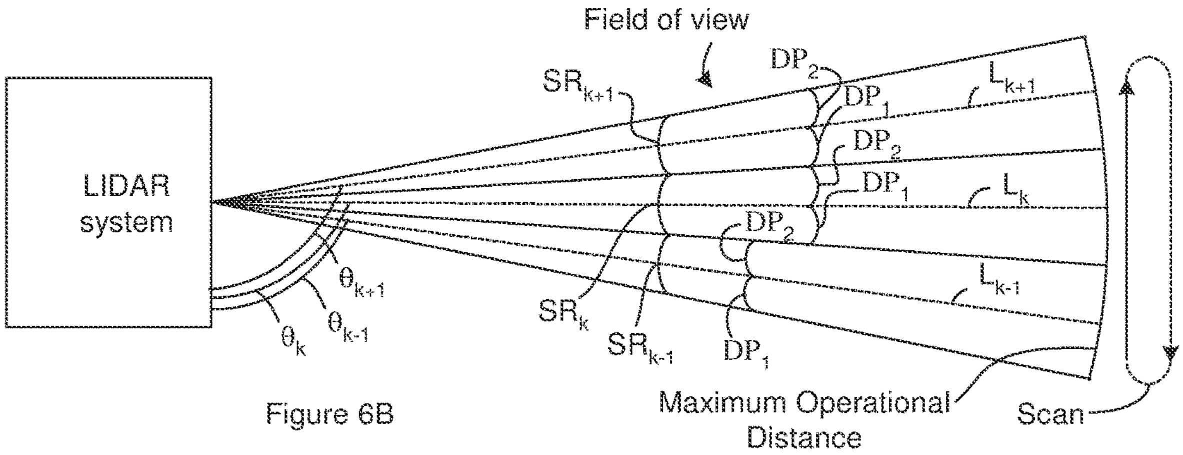
FIG. 6B illustrates a relationship between data periods disclosed in FIG. 5C and the field of view for the LIDAR system.

FIG. 6B illustrates a relationship between the data periods disclosed in FIG. 5C and the field of view for the LIDAR system. For the purposes of illustration, only the system output signal for range and velocity core $C_1$ is illustrated. The field of view is defined by a collection of sample regions labeled $SR_{k-1}$ through $SR_{k+1}$. The illustrated system output signal is scanned in the direction of the solid line labeled "scan." The system output signal is scanned through a series of the sample regions ($SR_{k-1}$ through $SR_{k+1}$). The collection of sample regions that are scanned by the system output signal make up the field of view for the LIDAR system. Object(s) in the field of view can change with time. As a result, the locations of the sample regions are determined relative to the LIDAR system rather than relative to the environment in which the LIDAR system is positioned. For instance, the sample regions can be defined as being located within a range of angles relative to the LIDAR system. The dashed line labeled scan in FIG. 6B illustrates that the scan of the sample regions can be repeated in multiple scan cycles. Accordingly, each scan cycle can scan the system output signal through the same sample regions when the objects in the field of view have moved and/or changed. The sample regions in the field of view can be scanned in the same sequence during different scan cycles or can be scanned in different sequences in different scan cycles.

The portion of each sample region that corresponds to one of the data periods are each labeled $DP_1$ or $DP_2$ in FIG. 6B. As is evident from FIG. 5C, the chirp rate of the system output signal from core $C_1$ during data period $DP_1$ is $\alpha_1$ and the chirp rate during the data period $DP_2$ is $\alpha_2$. As noted above, the system output signals from the velocity cores $C_2$-$C_4$ may not be frequency chirped and may have a constant frequency.

Each of the sample regions includes a dashed line labeled $L_k$. The dashed line labeled $L_k$ can serve as a location reference line for sample region k. FIG. 6B includes location reference lines labeled $L_{k-1}$ through $L_{k+1}$. In FIG. 6B, each of the location reference lines ($L_k$) is drawn along the longitudinal axis of sample region with sample region index k.

FIG. 6B illustrate multiple orientation angles labeled $\theta_k$ where k represents the sample region index k. The orientation angle $\theta_k$ can measure the angular orientation of sample region $SR_k$ relative to the LIDAR system. In some instances, the orientation angles $\theta_k$ are measured relative to the location reference lines $L_k$ as shown in FIG. 6B. As a result, the orientation angles $\theta_k$ can measure the angular orientation of the location reference lines $L_k$. Because FIG. 6B illustrates the LIDAR system having a two-dimensional field of view, a single angle ($\theta_k$) can define the angular orientation of sample region $SR_k$ relative to the LIDAR system; however, the field of view is generally three dimensional. As a result, the LIDAR system can use two or more angles and/or other variables to define the orientation of a sample region relative to the LIDAR system.

Figure 6C:
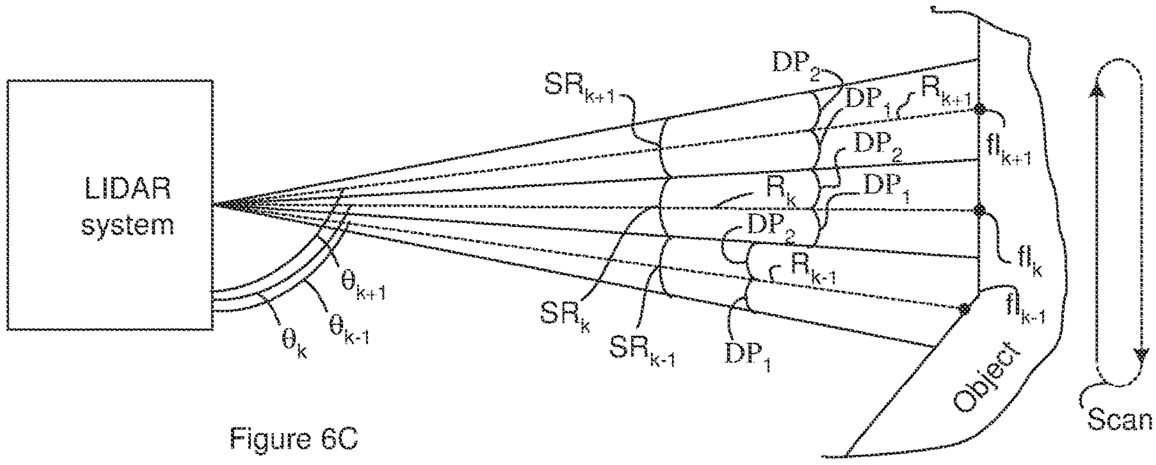
FIG. 6C illustrates objects in the field of view disclosed in the context of FIG. 6B.

FIG. 6C illustrates objects in the field of view disclosed in the context of FIG. 6B. For instance, two different objects located are located in the field of view of the LIDAR system. Each of the location reference lines ($L_k$) extends a distance $R_k$ from the LIDAR system to a field location labeled $fl_k$. The distance $R_k$ represents the value that the electronics in the range and velocity core determine for the distance between the LIDAR system and an object as a result of the system output signal transmitted during illumination of sample region $SR_k$. As a result, the field location labeled $fl_k$ can represent the location along the location reference line ($L_k$) where the electronics determine that a surface of an object that reflects the system output signal is located. The collection of field locations in the field of view can serve as a point cloud.

The field locations ($fl_k$) that are associated with a distance, $R_k$, can also be associated with a radial velocity $V_k$ where k represents the sample region index. The radial velocity $V_k$ can be the radial velocity that the electronics generate for sample region with sample region index k.

Figure 6D:
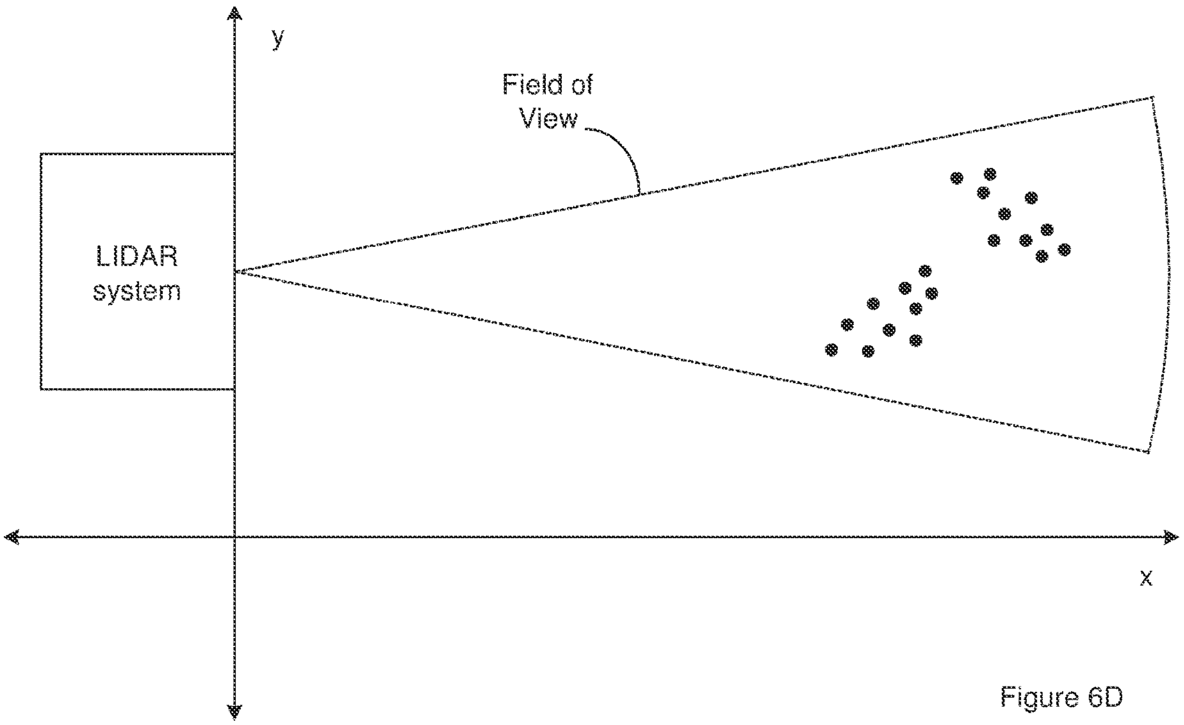
FIG. 6D illustrates multiple different field locations in the sample regions of illuminated by a range and velocity core.

The one or more orientation angle(s) ($\theta_k$) and the distances $R_k$ associated with each field location ($fl_k$) can effectively serve as polar coordinates or as spherical coordinates. As a result, the electronics can optionally convert the coordinates of the field locations $fl_k$ to other coordinates systems including, but not limited to, Cartesian coordinates. As an example, FIG. 6D illustrates an example where multiple different field locations in the sample regions of the range and velocity core $C_1$. Additionally, the axes of a Cartesian coordinate system are transposed on the field of view. As a result, the positions of the field locations $fl_k$ are also shown relative to the Cartesian coordinate system. The electronics can optionally use the orientation angle ($\theta_k$) and the distance $R_k$ associated with each field location ($fl_k$) to convert the field location ($fl_k$) to the other coordinate systems.

In some instances, a field location ($fl_k$) is not present in all or a portion of the sample regions. For instance, when an object is not present in a sample region ($SR_k$), a beating signal is generally not produced and LIDAR data is not generated for that sample region. As a result, a portion of the sample region indices may not be associated with a field location ($fl_k$).

When a core is a range and velocity core, all or a portion of the sample regions illuminated by that core (range and velocity sample regions, RV sample regions) can each be associated with a field location, coordinates, distances $R_k$, and a radial velocity $V_k$. In contrast, when a core is a velocity core, all or a portion of the sample regions illuminated by that core (velocity sample regions, V sample regions) can each be associated with a field location, coordinates, and a radial velocity $V_k$. FIG. 6B illustrates the coordinates as two-dimensional Cartesian coordinates (x,y) although three-dimensional coordinates and/or other coordinates systems are possible. In some instances, the coordinates are the polar coordinates or spherical coordinates of the field locations ($fl_k$).

Figure 7:
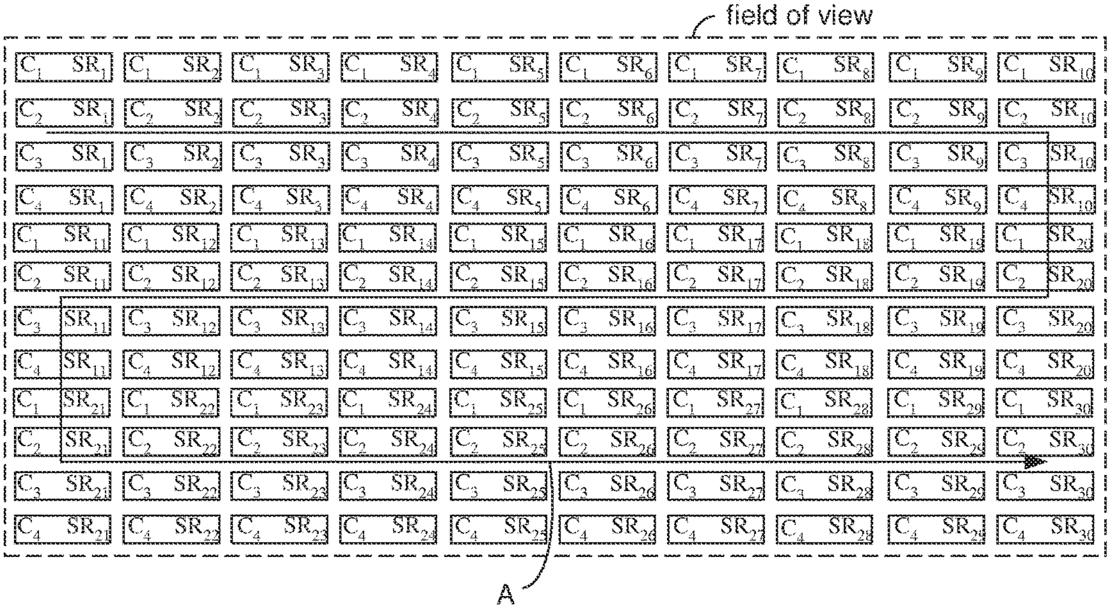
FIG. 7 is a two-dimensional illustration of a field of view for a LIDAR system.

FIG. 7 is a two-dimensional illustration of the field of view for the LIDAR system. For instance, FIG. 7 can represent a projection of a three-dimensional field of view onto a two-dimensional plane. The field of view includes multiple rectangles that can each represent the projection of one of the sample regions in the field of view onto the plane. The sample regions are shown as rectangular for the purposes of illustration and can have other geometries. The sample regions are each labeled $SR_k$ where k is from 1 to 30.

The sample regions are each labeled $C_i$ where i is a core index that identifies the core that illuminated the sample region. The core index is an integer can extend from i=1 to i=M where M is the number of system output signals output by the LIDAR system. The labels $C_i$ indicate which of the system output signals illuminated the sample region. For instance, the sample regions labeled $C_1$ were illuminated by the range and velocity labeled $C_1$ in FIG. 6A. Accordingly, the sample regions labeled $C_1$ are RV sample regions. In contrast, the sample regions labeled $C_2$ were illuminated by the velocity core labeled $C_2$; the sample regions labeled $C_3$ were illuminated by the velocity core labeled $C_3$; and the sample regions labeled $C_4$ were illuminated by the velocity core labeled $C_4$. As a result, the sample regions labeled $C_2$-$C_4$ are V sample regions.

FIG. 7 includes an arrow labeled A. The arrow indicates the sequence that the system output signals are scanned through the field of view. Additionally, the sample region indices (k) are assigned to the sample regions chronologically. Accordingly, the sample region labeled with $C_2$ and $SR_{11}$ was scanned by the velocity core $C_1$ before the sample region labeled with $C_2$ and $SR_{12}$ was scanned by the velocity core $C_2$.

The LIDAR system includes electronics configured to operate the LIDAR system. The electronics can include local electronics 32 from one or more cores and common electronics 280. The common electronics 280 can be positioned on the common support 140 as shown in FIG. 6A or can be located off of the common support 140. The common electronics 280 can be in the same physical location and/or housing as the local electronics associated with different cores or can be in different locations and/or housings from the local electronics 32 associated with different cores.

Figure 8:
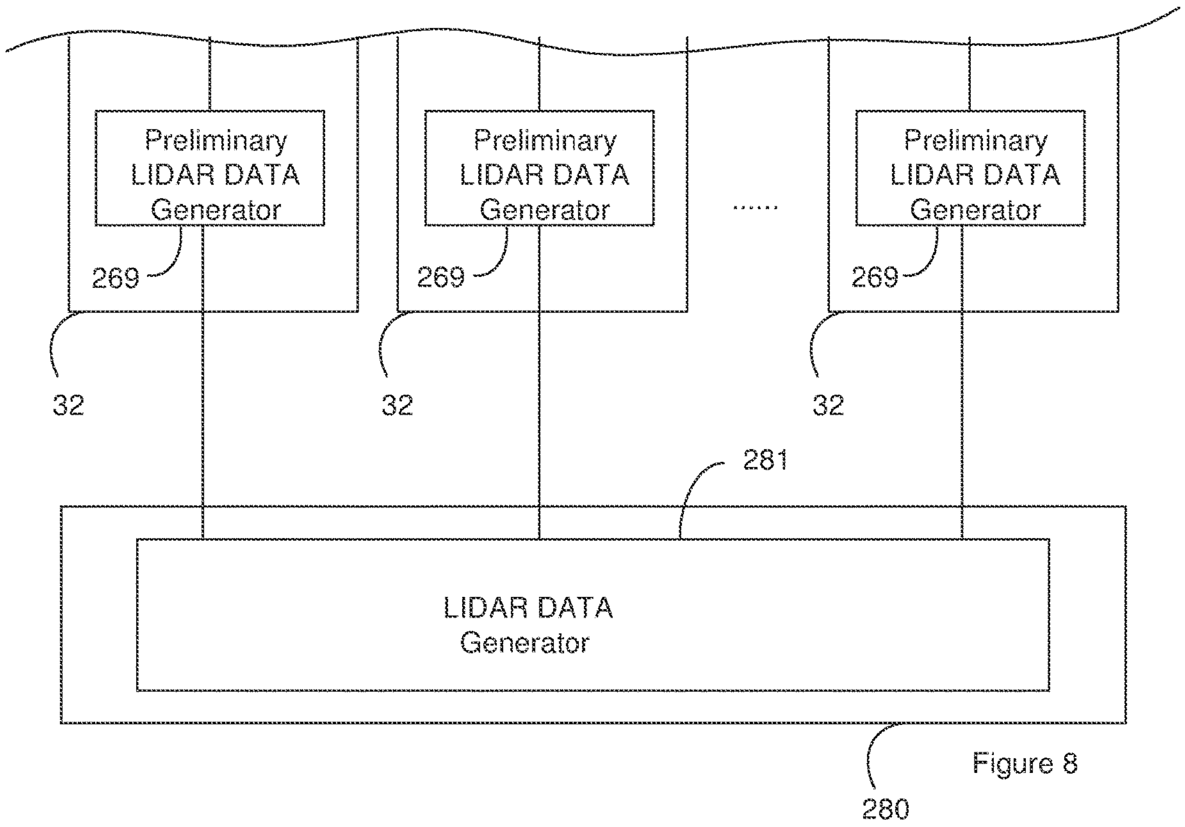
FIG. 8 illustrates common electronics configured to receive preliminary LIDAR data generated by different cores.

The common electronics 280 can be in electrical communication with the local electronics 32 associated with different cores. For instance, the common electronics 280 can include a LIDAR data generator 291 in electrical communication with the local electronics 32 from different cores. FIG. 8 illustrates the common electronics 280 having a LIDAR data generator 291 configured to receive the preliminary LIDAR data generated by the preliminary LIDAR data generators 269 in different cores.

The electrical communication between the common electronics 280 and the local electronics 32 associated with different cores allows the common electronics 280 to access preliminary LIDAR data generated from different cores. For instance, the common electronics 280 can access the range and or velocity that the local electronics 32 associated with a range and velocity core calculates for a sample region and/or can access the velocity that the local electronics 32 associated with a velocity core calculates for a sample region. The LIDAR data generator 291 can combine preliminary LIDAR data generated by different cores to calculate LIDAR data for one of the sample regions. Additionally or alternately, The LIDAR data generator 291 can combine preliminary LIDAR data generated for different sample regions by the same core to calculate LIDAR data for one of the sample regions.

The preliminary LIDAR data that the electronics generate for a sample region can include isolated LIDAR data and shared LIDAR data. Isolated LIDAR data can be LIDAR data that the local electronics calculate for a sample region where the one or more beat frequencies used to calculate the isolated LIDAR data result from the illumination of that sample region by the system output signal. As a result, the illumination of another sample region by a system output signal is not needed to calculate the isolated LIDAR data for a sample region. As a result, the radial velocity ($V_k$) for a V sample region with sample region index k can be calculated without illuminating another one of the sample regions with a system output signal. However, the LIDAR data generator 291 can combine the isolated LIDAR data and/or shared LIDAR data from different cores and/or that result from illuminating different sample regions so as to approximate the shared LIDAR data. As a result, shared LIDAR data for a sample region can be calculated by combining the beat frequencies that result from illuminating different sample regions. As an example, the range ($R_k$) for a V sample region can be calculated by combining the beat frequencies from multiple different sample regions. Accordingly, the range ($R_k$) calculated for a V sample region can be shared LIDAR data while the radial velocity ($V_k$) for the same V sample region can be isolated LIDAR data. In contrast, the range ($R_k$) and radial velocity ($V_k$) for the same V sample region can both be isolated LIDAR data.

An example of calculating shared LIDAR data is calculating the range ($R_k$) for a subject V sample region by interpolating or extrapolating the coordinates of the field location for the V sample region from the coordinates of the field locations associated with RV sample regions. When the coordinates are polar coordinates or spherical coordinates, the range (distance) for subject V sample region k ($R_k$) can be extracted directly from the coordinates. Alternately, a range (distance) for V sample region k ($R_k$) can be calculated from the coordinates. For instance, when the coordinates are Cartesian coordinates, the coordinates can be converted to polar coordinates or spherical coordinates and the desired range extracted. In some applications of the LIDAR system, the desired data for the V sample region is the coordinates of the field location for that sample region rather than the range. As a result, in some applications, the range is not calculated for all or a portion of the V sample regions for which coordinates are calculated. The range and/or coordinates estimated for a V sample region can serve as location data for the V sample region. Accordingly, interpolation and extrapolation provide an estimate of the location data of an object in a subject sample region. The interpolation or extrapolation is made relative to coordinates and/or ranges from multiple RV sample regions. The field locations in the RV sample regions from which the location data for a V region is calculated serve as the known points in an interpolation or extrapolation algorithm.

Figure 9:
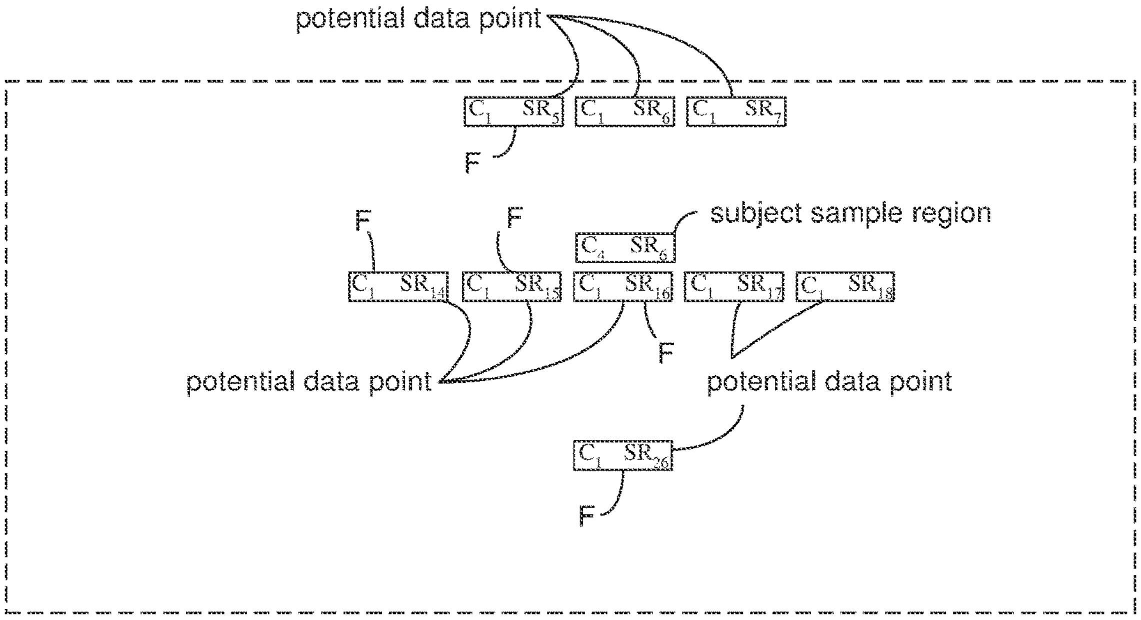
FIG. 9 shows a subject sample region and potential sample regions in the field of view from FIG. 7.

The LIDAR data generator 291 can identify a subject sample region for which the coordinates and/or a range is to be interpolated or extrapolated and can identify potential sample regions that include potential data points from which the coordinates and/or range is to be interpolated or extrapolated. As an example, FIG. 9 shows the field of view from FIG. 7 where the sample region labeled $SR_6$ for core $C_4$ is identified as the subject sample region. The potential data points include the field locations in RV sample regions that are physically located near the subject sample region. Since the core labeled $C_1$ is the only range and velocity core in the LIDAR system of FIG. 6A, each of the potential data points is labeled $C_1$.

The LIDAR data generator 291 can apply an identification algorithm to identify the potential data points. The identification algorithm can associate a particular group of RV sample regions with each of the different possible subject sample regions. The association can be specific to each of the possible subject sample regions or can be general to multiple different possible subject sample regions. As an example of a specific association, the identification algorithm can associate the group of potential data points shown in FIG. 9 with the specific subject sample region shown in FIG. 9. As an example of a general association, the identification algorithm can associate the pattern of potential data points shown in FIG. 9 with multiple different subject sample regions that are each positioned in the same row of sample regions as the subject sample region of FIG. 9.

In another example of suitable identification algorithms, the potential data points can be identified by application of an identification criteria to the subject sample region and the adjacent RV sample regions. For instance, each of the RV sample regions that has a field locations are $R_{fl}$ of the field location in the subject sample region can each be identified as a potential data point where $R_{fl}$ is a constant.

The LIDAR data generator 291 can compare the LIDAR data at the potential data points to one or more criteria to determine which of the potential data points is suitable for use as a known data point. In some instances, the one or more criteria include or consist of velocity criteria that are a function of the radial velocities associated with the potential data points. For instance, the LIDAR data generator 291 can compare the LIDAR data associated with the subject sample region and the data associated with each of the potential data points to one or more velocity criteria to determine whether the potential data point is suitable for use as a known data point.

The velocity criteria can be selected such that the criteria are satisfied when the same object is likely positioned in the subject sample region and in the sample region associated with a potential data point. When an object is positioned in a subject sample region and the sample region associated with a potential data point, the radial velocity calculated for these sample regions is likely the same or similar. For instance, an example application of velocity criteria can include comparing a variable that is a function of the radial velocity calculated for the subject sample region and the velocity associated with the potential data point to a threshold. The threshold can be a constant or can be function of the radial velocity calculated for the subject sample region and/or the radial velocity calculated for the potential data point. As an example, the difference between the radial velocity associated with the subject sample region and the radial velocity associated with the potential data point can be compared to a velocity threshold. When the difference is less than the velocity threshold, the velocity criteria is satisfied but when the difference is greater than or equal to the velocity threshold the velocity criteria is not satisfied. Another example of applying velocity criteria compares the percentage change from the radial velocity associated the subject sample region to the radial velocity associated with the potential data point to a velocity threshold. When the difference is less than the velocity threshold, the velocity criteria is satisfied but when the difference is greater than or equal to the velocity threshold the velocity criteria is not satisfied.

The potential data points that satisfy the one or more criteria are flagged as known data points while the potential data points that do not satisfy the one or more criteria are not flagged as known data points. As an example, the field locations in the RV sample regions labeled F in FIG. 9 can be flagged as known data points while the field locations in the RV sample regions that are not labeled F are not flagged as known data points. The LIDAR data generator 291 uses the coordinates associated with the known data points in an interpolation algorithm or extrapolation algorithm to estimate the coordinates of a field location in the subject sample region. In contrast, the potential data points that are not flagged as known data points are not used in the interpolation algorithm or extrapolation algorithm. As a result, in some instances, the number of known data points used in an interpolation algorithm or an extrapolation algorithm changes in response to the radial velocities calculated for the potential data points.

Suitable interpolation algorithms include, but are not limited to, piecewise constant interpolation, linear interpolation, polynomial interpolation, spline interpolation, interpolation by function approximation, and Gaussian interpolation. Suitable extrapolation algorithms include, but are not limited to, linear extrapolation, polynomial extrapolation, conic extrapolation, and French curve extrapolation.

Figure 10:
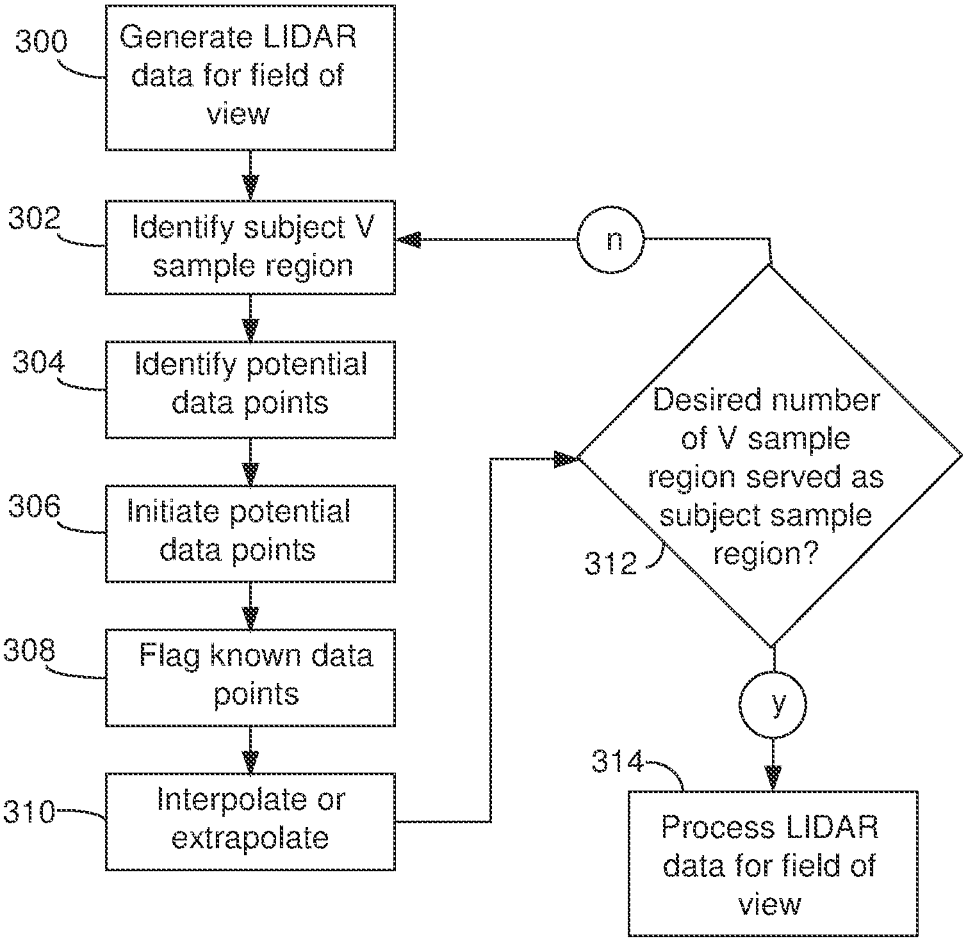
FIG. 10 is a process flow for generating range data for sample regions illuminated by a velocity core in a LIDAR system that includes range and velocity cores.

FIG. 10 is a process flow for generating range data for sample regions illuminated by a velocity core in a LIDAR system that includes range and velocity cores.

At process block 300, the local electronics for each of the cores generate the isolated LIDAR data for the sample regions scanned by that core. For instance, the preliminary LIDAR data generators 269 in the velocity cores calculate the radial velocity for each of the V sample regions scanned by the core. Additionally, the preliminary LIDAR data generators 269 in the range and velocity cores calculate the range and radial velocity for each of the RV sample regions scanned by the RV core. As noted above, the one or more orientation angle(s) ($\theta_k$) associated with a sample region and the range or distance $R_k$ calculated for the sample region can effectively serve as polar or spherical coordinates for a field location in that sample region. Alternately, the local electronics can optionally convert the polar or spherical coordinates to another coordinate system. Accordingly, the preliminary LIDAR data generators 269 associated with each of the range and velocity cores can calculate the radial velocity and coordinates of the field locations associated with the RV sample regions scanned by those cores.

At process block 302, the LIDAR data generator 281 can identify one of the V sample regions to serve as a subject sample region for which coordinates and/or a range are to be estimated. The field location in the subject sample region can serve as a subject field location.

The LIDAR data generator 281 can proceed from process block 302 to process block 304. At process block 304, the LIDAR data generator 281 can perform the identification algorithm so as to identify RV sample regions that contain field locations that may be suitable for serving as known data points. The identified RV sample regions and/or field locations can serve as potential data points.

The LIDAR data generator 281 can proceed from process block 304 to process block 306. At process block 306, the LIDAR data generator 281 can initialize the identified potential data points and/or the RV sample regions that include the identified potential data points. For instance, the LIDAR data generator 281 can flag each of the identified potential data points and/or the sample regions containing the identified potential data points as not being a known data point.

The LIDAR data generator 281 can proceed from process block 306 to process block 308. At process block 308, the LIDAR data generator 281 can compare the radial velocity associated with the subject field location (or the subject V sample region) and the radial velocity associated with a subject one of the potential data points (or the potential RV sample region) to the one or more velocity criteria so as to determine whether it is likely that the same object is positioned in the sample region associated with the subject field location and also in the sample region associated with the potential field location. This comparison can be repeated until each of the potential data points has served as the subject potential data point, until a pre-determined number of potential data points has served as the subject potential data point, or until a pre-determined number of potential data points has satisfied the one or more velocity criteria. The LIDAR data generator 281 can flag each of the potential data points that satisfies the one or more velocity criteria as a known data point.

The LIDAR data generator 281 can proceed from process block 308 to process block 310. At process block 310, the LIDAR data generator 281 can interpolate or extrapolate coordinates for the subject field location from the coordinates of the known data point. The potential data points that are not flagged as a known data point are not used in the interpolation or extrapolation.

In some instances, the interpolation or extrapolation of the coordinates includes an interpolation or extrapolation of the range associated with the subject field location. For instance, when the interpolation or extrapolation of the coordinates is done in polar coordinates or spherical coordinates, the range is one of the coordinate variables. Alternately, the range can be calculated from the coordinates for the subject field location. When the range is determined for a subject field location $fl_k$, the range can serve as the distance $R_k$ for the V sample region $SR_k$. As a result, the V sample region $SR_k$ can be associated with a radial velocity $V_k$. Accordingly, a V sample region that has served as the subject sample region can be associated with a field location, an estimated distance $R_k$, and a radial velocity $V_k$.

The LIDAR data generator 281 can proceed from process block 310 to determination block 312 where a determination is made whether the desired number of V sample regions has served as the subject sample region. It can be desirable for all or a portion of the sample regions in the field of view for the LIDAR system to serve as the subject sample region. In some instances, each of the V sample regions in the field of view for the LIDAR system is to serve as the subject sample region. As a result, in some instances, the common electronics can determine whether each of the each of the V sample regions in the field of view for the LIDAR system has served as the subject sample region. When the determination is negative, the common electronics can return to process block 302.

When the determination at determination block 310 is positive, the LIDAR data generator 281 has estimated distance ($R_k$) values for all or a portion of the V sample regions. The estimated distance ($R_k$) values are estimated from the beat frequencies of the composite signals that result from illuminating multiple different sample regions with a system output signal. As a result, the estimated distance ($R_k$) values can be considered shared LIDAR data. The estimated distance ($R_k$) values for the V sample regions can be added to the isolated LIDAR data for the RV regions and the isolated LIDAR data for the V regions to provide LIDAR data for the LIDAR system's field of view. As a result, all or a portion of the V sample regions in the field of view of the LIDAR system are associated with a field location, an estimated distance $R_k$, and a radial velocity $V_k$. Similarly, all or a portion of the RV sample regions in the field of view of the LIDAR system are associated with a field location, an estimated distance $R_k$, and a radial velocity $V_k$.

When the determination at determination block 310 is positive, the common electronics 280 proceed from determination block 312 to process block 314. At process block 314, the common electronics can perform further processing of the LIDAR data for the LIDAR system's field of view. The further processing is a function of the application of the LIDAR system. Examples of further processing applications include, but are not limited to, image generation, control of self-driving vehicles, point cloud generation, object recognition, and statistical analysis. The further processing can make use of all or a portion of the ranges, radial velocities, and field locations associated with the V sample regions and associated with the RV sample regions in the field of view for the LIDAR system.

Figure 11A:
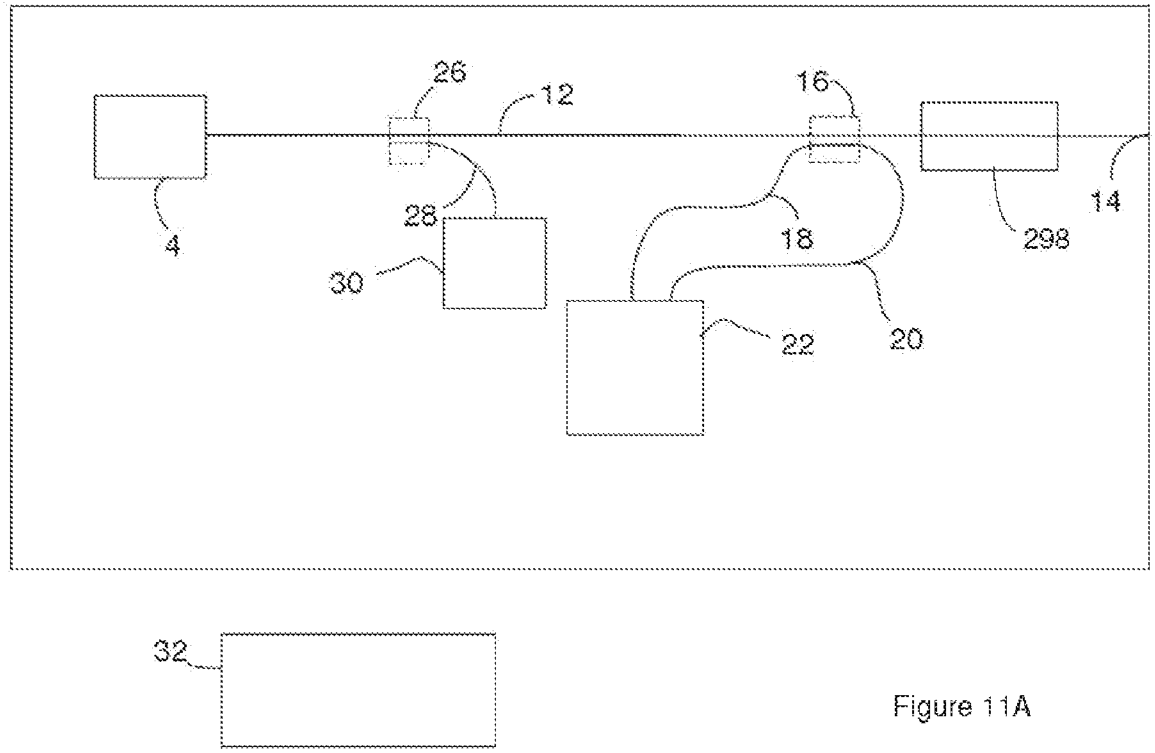
FIG. 11A is a topview of a schematic of a LIDAR core suitable for use as a velocity core.
Figure 11B:
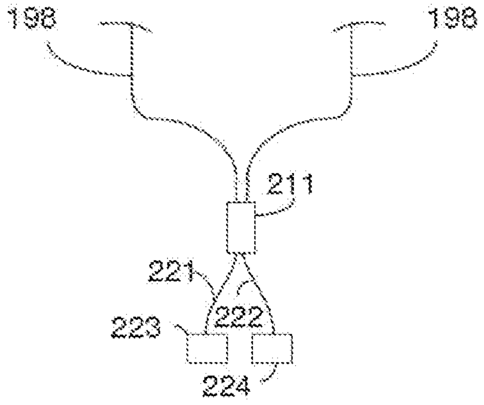
FIG. 11B is an example of a signal processor suitable for use with the LIDAR core of FIG. 11A.
Figure 11C:
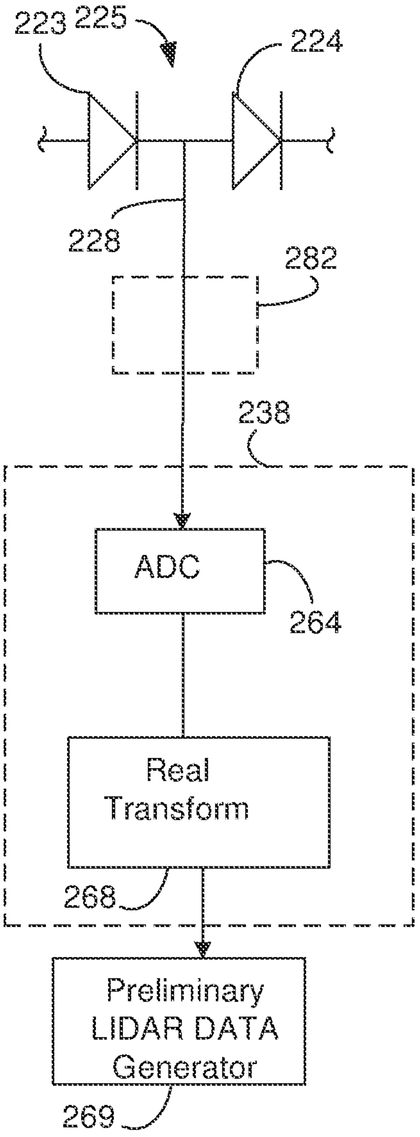
FIG. 11C provides a schematic of electronics that are suitable for use with a signal processor constructed according to FIG. 11B.

The LIDAR core constructions disclosed above are examples and other LIDAR core constructions can be used. As an example, FIG. 11A through FIG. 11C illustrate an example of a LIDAR core suitable for use as a velocity core. FIG. 11A is a topview of the LIDAR core of FIG. 1A modified to include a frequency shifter 298 positioned along the utility waveguide 12. The electronics can operate the frequency shifter 298 so as to create a frequency offset between the LIDAR output signal and the reference signal. Since the system output signal includes or consists of light from the LIDAR output signal, there is also a frequency offset between the system output signal and the reference signal. Suitable frequency shifters include, but are not limited to, an acousto-optic frequency shifter. The frequency shifter can be integrated into the LIDAR chip or into the LIDAR core or can be a separate electro-optical component mounted on the LIDAR chip or the LIDAR core using technologies such as flip-chip mounting technologies.

The LIDAR core of FIG. 11A can provide an unambiguous solution for the beat frequency without the second data signal and accordingly without the imaginary component of complex signal. As a result, the signal processor used in conjunction with the LIDAR core of FIG. 11A need not generate the second composite signal. Accordingly, the signal processor used in conjunction with the LIDAR core of FIG. 11A can be used with the signal processor of FIG. 5A modified to exclude the components needed to generate and process the second composite signal as shown in FIG. 11B. Similarly, the relationship between the electronics, the first light sensor 223 and the second light sensor 224 can be constructed as disclosed in the context of FIG. 5B but with the exclusion of the first auxiliary light sensor 218 and the second auxiliary light sensor 220 as illustrated in FIG. 11C. As is evident from FIG. 1C, the transformer 268 receives the first data signal but not the second data signal. As a result, the first data signal serves as a real data signal that is received by the transformer 268. A LIDAR core having a transformer 268 that receives a real data signal can be considered a real data signal LIDAR core.

The beat frequency finder 238 includes a transformer 268 that receives the first digital data signal from the first Analog-to-Digital Converter (ADC) 264 as an input. The transformer 268 can be configured to perform a mathematical transform on the first digital data signal so as to convert from the time domain to the frequency domain. The mathematical transform can be a real transform such as a Fourier Transform. The local electronics use the one or more frequency peaks output from the transformer 268 for further processing to generate the LIDAR data (distance and/or radial velocity between the reflecting object and the LIDAR chip or LIDAR core). The local electronics 32 can include a peak finder (not shown) to identify the beat frequencies of the one or more frequency peaks. The transformer 268 and/or the preliminary LIDAR data generator 269 can execute the attributed functions using firmware, hardware or software or a combination thereof.

The local electronics 32 can include a preliminary LIDAR data generator 269 configured receive the beat frequencies from the transformer 268. The preliminary LIDAR data generator 269 is configured to generate preliminary LIDAR data for a sample region. LIDAR data for a sample region includes values for the radial velocity and/or separation distance between the LIDAR system and an object in the sample region. In some instances, the LIDAR data includes an indicator that the LIDAR data for that sample region is "not available." In some instances, the preliminary LIDAR data generator 269 calculates LIDAR data that serves as the preliminary LIDAR data. For instance, in some instances, the preliminary LIDAR data generator 269 calculates the radial velocity and/or separation distance between the LIDAR system and an object in the sample region as the preliminary LIDAR data. As will be discussed below, other examples of preliminary LIDAR data that can be calculated by the preliminary data generator include, but are not limited to, possible solutions for the LIDAR data for the sample region and a potential radial velocity magnitude indicator for the sample region.

Different cores having local electronics 32 configured as disclosed in the context of FIG. 11C can be in electrical communication with common electronics 280 as disclosed in the context of FIG. 8. Alternately, one or more cores having local electronics 32 configured as disclosed in the context of FIG. 11C and one or more cores having local electronics configured as disclosed in the context of FIG. 5B can be in electrical communication with common electronics 280 as disclosed in the context of FIG. 8.

The system output signal from the LIDAR core of FIG. 11A can be a continuous wave (CW). For instance, the outgoing LIDAR signal, and accordingly the system output signal, can be an unchirped continuous wave (CW). As an example, the outgoing LIDAR signal, and accordingly the system output signal, can be represented by Equation 2: G*cos(H*t) where G and H are constants and t represents time. In some instances, G represents the square root of the power of the outgoing LIDAR signal. Local electronics, such as the preliminary LIDAR data generator 269, can approximate the radial velocity between the reflecting object and the LIDAR chip (v) using Equation 5: $v=c*f_{ft}/(2*(f_c+f_{os}))$ where $f_{ft}$ represents the peak frequency output from the transformer 268, c is the speed of light, $f_c$ represents the frequency of the LIDAR output signal and accordingly the system output signal, and $f_{os}$ represents the offset between the frequency of the system output signal and the reference signal. In many instances, $f_c \gg f_{os}$ and the equation for radial velocity can be approximated as $v=c*f_{ft}/(2*f_c)$. As a result, multiple data periods and/or chirping are not needed to generate the radial velocity.

The LIDAR cores illustrated in any of FIG. 1A through FIG. 1C can also be operated as a range and velocity core when used in conjunction with the signal processor of FIG. 11B in combination with the local electronics of FIG. 11C to provide a real data signal core. For instance, the frequency versus time pattern of FIG. 5C can represent the frequency versus time pattern suitable for use with a real data signal core constructed according to FIG. 1A operated as a range and velocity core. In this instance, the frequency peak output from the Fourier transform represents the beat frequency of the composite signals that each includes a comparative signal beating against a reference signal. However, a real Fourier transform outputs a positive beat frequency and a negative beat frequency with the same magnitude. It can be ambiguous as to which beat frequency represents the correct value for the beat frequency of the composite signals. As a result, there are multiple possible solutions for the LIDAR data for an RV sample region illuminated by a system output signal from a LIDAR core constructed according to FIG. 1A through FIG. 11C and operated as a range and velocity core.

The beat frequencies from two or more different data periods that are associated with the same sample region can be combined to generate possible LIDAR data solutions for an RV sample region illuminated by a system output signal from a LIDAR core constructed according to any of FIG. 1A through FIG. 1C and operated as a range and velocity core. For instance, the beat frequency determined from $DP_1$ during the illumination of sample region $SR_k$ can be combined with the beat frequency determined from $DP_2$ during the illumination of sample region $SR_k$ to determine possible LIDAR data solutions for RV sample region $SR_k$.

As noted above, beat frequency of the composite signal during a data period where the frequency of the outgoing LIDAR signal increases can be represented by $f_{ub}$ and the beat frequency of the composite signal during a data period where the frequency of the outgoing LIDAR signal decreases can be represented by $f_{db}$. The contribution of the range between the LIDAR system and the object to these beat frequencies can be represented by $f_r$ where $f_r=2*\alpha_u R_k/c$ where $\alpha_u$ represents a chirp rate ($\alpha_m$) for the data period where the frequency of the system output signal increases with time ($\alpha_1$ in this case), $R_k$ represents the distance between the LIDAR system and an object in sample region $SR_k$, and c represents the speed of light. The contribution of the Doppler effect to these beat frequencies can be represented by $f_d=2V_k f_c/c$ where $f_c$ represents the base frequency ($f_o$), $V_k$ is the radial velocity between the reflecting object in sample region k and the LIDAR system with radial velocity assumed to be positive when the object is moving toward the LIDAR system.

There are three possible LIDAR data solutions for the combination of $f_r$ and $f_d$ values for an RV sample region. For instance, $f_r=(f_{ub}+f_{db})/2$ and $f_d=(f_{db}-f_{ub})/2$ can serve as a first solution. A second solution can be $f_r=(f_{db}-f_{ub})/2$ and $f_d=(f_{db}+f_{ub})/2$. A third solution can be $f_r=(f_{ub}-f_{db})/2$ and $f_d=-(f_{db}+f_{ub})/2$. As noted above, a real Fourier transform outputs a positive beat frequency and a negative beat frequency with the same magnitude. As a result, in these LIDAR data solutions, $f_{ub}$ represents the magnitude of the peak frequency output from the transformer 268 and $f_{db}$ represents the magnitude of the peak frequency output from the transformer 268. As noted above, the values of $f_d$ and $f_r$ are directly related to the radial velocity ($V_K$) and the range ($R_k$) for the RV sample region by $f_d=2V_k f_c/c$ and $f_r=2*\alpha_u*R_k/c$ respectively. As a result, each of the possible LIDAR data solution for the RV sample region $SR_k$ can have all or a portion of the components selected from the group consisting of an $f_r$ value, an $f_d$ value, a radial velocity ($V_K$) value and a range ($R_k$) value. In some instances, each of the possible LIDAR data solutions includes at least a possible $f_r$ value, a possible $f_d$ value. In some instances, each of the possible LIDAR data solutions includes at least a possible radial velocity ($V_K$) value and a possible range ($R_k$) value for the RV sample region $SR_k$.

Figure 12A:
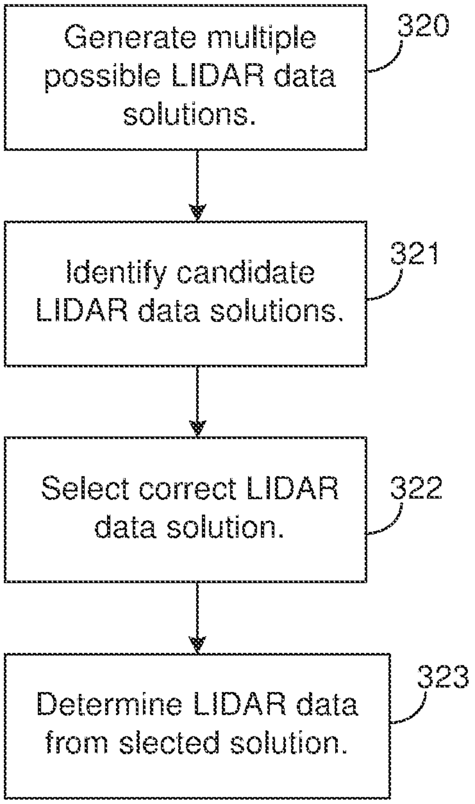
FIG. 12A illustrates an example of process flow that the electronics can use to identify a correct LIDAR data solution from among multiple possible.

FIG. 12A illustrates an example of process flow that the common electronics can use to identify the correct LIDAR data solution for a subject RV sample region. At process block 320, multiple possible LIDAR data solutions are calculated. For instance, a preliminary LIDAR data generator 269 can calculate a possible value of $f_r$ and/or possible value of the range ($R_k$) for the first solution, the second solution, and the third solution. At process block 321, the preliminary LIDAR data generator 269 can identify candidate LIDAR data solutions from among the possible LIDAR data solutions. For instance, the electronics can identify candidate $f_r$ values from among the possible $f_r$ values and/or candidate $R_k$ values from among the possible $R_k$ values. The value of $R_k$ is positive by definition. As a result, the value of $f_r$ is also positive. However, the value of $f_r$ from the second solution is the negative of the $f_r$ value from the third solution. As a result, the possible $f_r$ and/or $R_k$ values will include one or more negative values. The possible $f_r$ values and/or the $R_k$ values with negative values can be removed from the pool of candidates. As a result, each of the possible $f_r$ values with a positive value can serve as a candidate $f_r$ value. Additionally or alternately, each of the possible $R_k$ values with a positive value can serve as a candidate $R_k$ value.

At process block 322, the LIDAR data generator 281 identify the correct solution. For instance, when each of the possible LIDAR data solutions does not already include a radial velocity ($V_k$), a radial velocity ($V_k$) can be calculated for each solution using the $f_d$ value associated with the solution and $f_d=2V_kf_c/c$. The $V_k$ results from the different solutions can be compared to the radial velocity result from one or more V sample regions to identify the correct $V_k$ result. The LIDAR data solution that includes the identified $V_k$ result can be selected as the correct LIDAR data solution. Accordingly, the $V_k$ value of the selected LIDAR data solution can be selected as the correct $V_k$ value and $R_k$ value.

At process block 323, the LIDAR data generator 281 can determine the LIDAR data for the RV sample region associated with sample region index k. For instance, when the selected possible LIDAR data solution does not already include a range ($R_K$), the range ($R_K$) can be calculated for the selected LIDAR data solution using the $f_r$ value associated with the selected LIDAR data solution and $f_r=2*\alpha_u*R_k/c$. The values of $V_k$ and $R_k$ associated with the selected LIDAR data solution can serve as shared LIDAR data for the RV sample region $SR_k$. Accordingly, the LIDAR data for the RV sample region associated with sample region index k can include or consist of the values of $V_k$ and $R_k$ selected in process block 322.

Figure 12B:
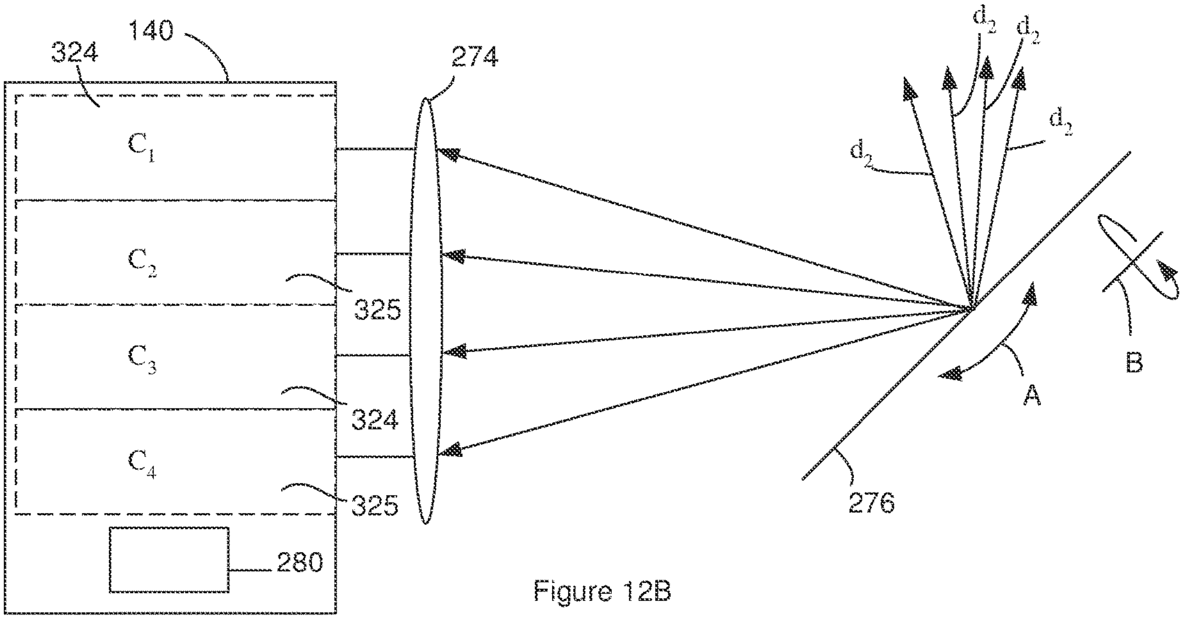
FIG. 12B illustrates a LIDAR system that includes multiple different real data signal cores on a common support.

A LIDAR system can include one or more range and velocity cores that are real data signal cores and one or more velocity cores that are real data signal cores. As an example, FIG. 12B illustrates a LIDAR system that includes multiple different real data signal cores on a common support 140. One or more of the LIDAR cores can be a velocity core constructed as disclosed in the context of FIG. 11A through FIG. 11C and one or more of the LIDAR cores can be a range and velocity core constructed as disclosed in the context of FIG. 1A through FIG. 1C with a signal processor of FIG. 11B in combination with the electronics of FIG. 11C. For the purpose of illustration, the LIDAR cores in the LIDAR system of FIG. 12B include two velocity cores 325 constructed as disclosed in the context of FIG. 11A through FIG. 11C and also includes two range and velocity cores 324 constructed as disclosed in the context of any of FIG. 1A through FIG. 1C with a signal processor of FIG. 11B in combination with the electronics of FIG. 11C. The range and velocity cores 324 alternate with the velocity cores 325.

Figure 12C:
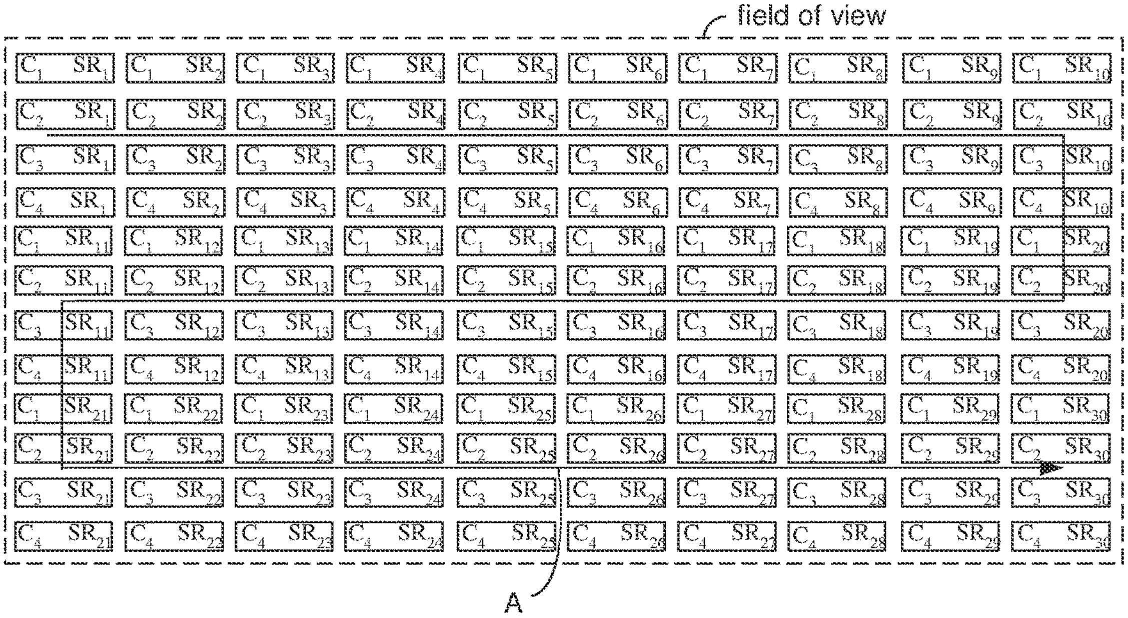
FIG. 12C is a two-dimensional illustration of the field of view for the LIDAR system of FIG. 12B.

FIG. 12C is a two-dimensional illustration of the field of view for the LIDAR system of FIG. 12B. For instance, FIG. 12C can represent a projection of a three-dimensional field of view onto a two-dimensional plane. The field of view includes multiple rectangles that can each represent the projection of one of the sample regions in the field of view onto the plane. The sample regions are shown as rectangular for the purposes of illustration and can have other geometries. The sample regions are each labeled $SR_k$ where k is from 1 to 30.

The sample regions are each labeled $C_i$ where i is a core index that identifies the core that illuminated the sample region. The core index is an integer can extend from i=1 to i=M where M is the number of system output signals output by the LIDAR system. The labels $C_i$ indicate which of the system output signals illuminated the sample region. For instance, the sample regions labeled $C_1$ were illuminated by the range and velocity core labeled $C_1$ in FIG. 12B and the sample regions labeled $C_3$ were illuminated by the range and velocity core labeled $C_3$ in FIG. 12B. Accordingly, the sample regions labeled $C_1$ and $C_3$ are RV sample regions. In contrast, the sample regions labeled $C_2$ were illuminated by the velocity core labeled $C_2$ and the sample regions labeled $C_4$ were illuminated by the velocity core labeled $C_4$. As a result, the sample regions labeled $C_2$ and $C_4$ are V sample regions.

FIG. 12C includes an arrow labeled A. The arrow indicates the sequence that the system output signals are scanned through the field of view. Additionally, the sample region indices (k) are assigned to the sample regions chronologically. Accordingly, the sample region labeled with $C_2$ and $SR_{11}$ was scanned by the velocity core $C_1$ before the sample region labeled with $C_2$ and $SR_{12}$ was scanned by the velocity core $C_2$.

The local electronics 32 can be local electronics in that they are specific to each of the cores on the LIDAR system. The LIDAR system can include common electronics 280 in addition to the local electronics 32. The common electronics 280 can be positioned on the common support 140 as shown in FIG. 12C or can be located off of the common support 140. The common electronics 280 can be in the same physical location and/or housing as the local electronics associated with different cores or can be in different locations and/or housings from the local electronics 32 associated with different cores.

The LIDAR data generator 281 can combine possible LIDAR data solutions with isolated LIDAR data from one or more V sample regions so as to select the correct LIDAR data solution as disclosed in the context of FIG. 12A. In some instances, the RV sample region associated with the possible LIDAR data solutions and the one or more V sample regions can be illuminated by a system output signal that includes light from the same core or from different cores.

Figure 12D:
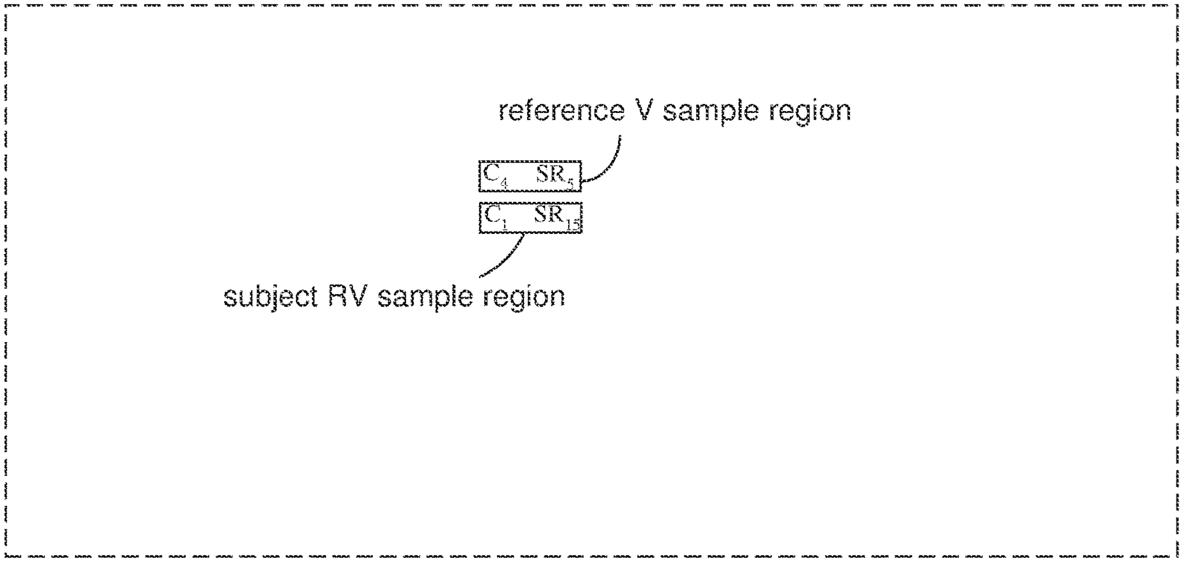
FIG. 12D illustrates a subject RV sample region and a reference V sample region on the field of view from FIG. 12C.

To identify the correct possible LIDAR data solution, the possible LIDAR data solutions for a subject RV sample region can be compared to the radial velocity calculated for one or more V sample regions that each serves as a reference V sample region. All or a portion of the reference V sample regions and the subject sample region can be illuminated by the same cores or by different cores. For instance, the electronics can identify a subject RV sample region for which a correct LIDAR data solution is to be identified. FIG. 12D shows the field of view from FIG. 12C where the RV sample region that is labeled $SR_{15}$ and is illuminated by a system output signal that includes light from velocity core $C_4$ is identified as the subject RV sample region.

One or more V sample regions can each be identified as a reference V sample region. The possible LIDAR data solutions for the subject RV sample region can be compared to the radial velocity ($V_k$) calculated for each of the one or more reference V sample regions so as to identify the correct LIDAR data solution for the subject RV sample region from among the possible LIDAR data solutions for the subject RV sample region. In some instances, the V sample region that is physically closest to the subject RV sample region is identified as the only reference V sample region. As an example, in FIG. 12D, the V sample region that is labeled $SR_5$ and is illuminated by a system output signal that includes light from velocity core $C_1$ is identified as the only reference V sample region.

The LIDAR data generator 281 can employ one or more solution identification criteria to identify the correct LIDAR data solution for the subject RV sample region from among the possible LIDAR data solutions for the subject RV sample region. An example solution identification criterion includes a proximate velocity criterion where the possible LIDAR data solution having the radial velocity that is closest to the radial velocity of one or more of the reference V sample regions is identified as the correct LIDAR data solution. For instance, the V sample region that is physically closest to the subject RV sample region can be identified as the only reference V sample region and the possible LIDAR data solution having the radial velocity $V_k$ that is closest to the radial velocity of one or more of the reference V sample regions can be selected as the correct LIDAR data solution for the subject RV sample region. Accordingly, the radial velocity $V_k$ and distance $R_k$ associated with the LIDAR data solution can serve as the LIDAR data for the subject RV sample region.

The LIDAR data generator 281 can apply other identification criteria in addition or as an alternative to the proximate velocity criteria. Another example of an identification criterion can be a range criterion where the radial velocity $V_k$ for each of the identified reference V sample region is within a range of radial velocity values. Examples of suitable ranges for radial velocity values include, but are not limited to, the radial velocity of the subject RV sample region +/−10%, 20%, or 30% of the radial velocity of the subject RV sample region. In the event that the radial velocity ($V_k$) for one of the identified reference V sample regions falls outside of the range for radial velocity values, the reference V sample region can be removed from the identified reference V sample regions. In the event that none of the identified reference V sample regions has a radial velocity that falls within the range for radial velocity values, the LIDAR data for the subject RV sample region can be classified as unavailable. In some instances, the LIDAR data generator 281 applies both a range criterion and a proximate velocity criteria to a subject RV sample region.

Figure 12E:
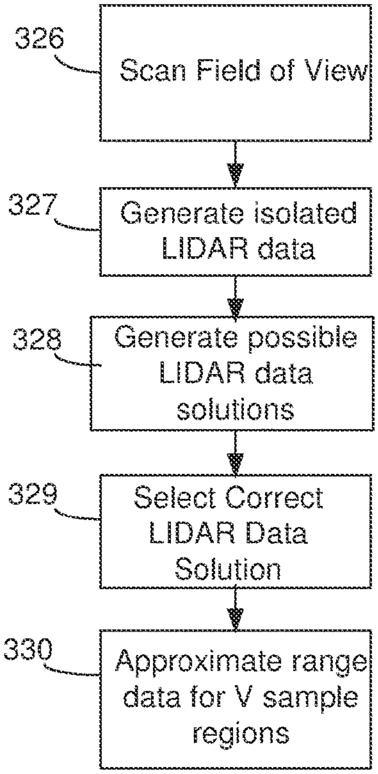
FIG. 12E illustrates a process flow for generating LIDAR data for sample regions illuminated by a LIDAR system having real data signal cores.

FIG. 12E illustrates a process flow for an example process for generating LIDAR data for the sample regions illuminated by a LIDAR system having real data signal cores such as the LIDAR system illustrated in FIG. 12B. At process block 326, the field of view for the LIDAR system is scanned.

At process block 327, the isolated LIDAR data for each of the V sample regions can be calculated. As noted above, the isolated LIDAR data for a sample region is the LIDAR data that can be calculated without use of a composite signal that results from illuminating a different sample region with a system output signal. For instance, to generate the isolated LIDAR data, the preliminary LIDAR data generator 269 for each of the velocity cores can calculate the radial velocity for each of the V sample regions illuminated by the velocity core.

At process block 328, the preliminary LIDAR data generator 269 for each of the range and velocity cores can calculate the possible LIDAR data can for each of the RV sample regions illuminated by one of the range and velocity cores. For instance, the preliminary LIDAR data generator 269 for each of the range and velocity cores can calculate the possible LIDAR data solutions for each of the RV sample regions illuminated by one of the range and velocity cores as disclosed in the context of FIG. 12A.

At process block 329, the correct LIDAR data solution can be selected for each of the RV sample regions illuminated by each of the range and velocity core. For instance, the LIDAR data generator 281 can select the correct LIDAR data solution for an RV sample region from among the possible LIDAR data solutions as disclosed on the context of FIG. 12A. The radial velocity ($V_k$) and the distance ($R_k$) associated with the selected LIDAR data solution can be considered shared LIDAR data that serves as all or a portion of the LIDAR data for the subject RV sample region $SR_k$.

The LIDAR data for the RV sample regions can serve as the range and radial velocity for each of the RV sample regions scanned by the RV cores in process block 300 of FIG. 10. Accordingly, the preliminary LIDAR data generators 269 or the LIDAR data generators 281 can calculate the radial velocity and coordinates of the field locations associated with the RV sample regions scanned by those cores as disclosed in the context of process block 300. Additionally, the isolated LIDAR data for the V sample regions can serve as the radial velocity for each of the V sample regions scanned by the V cores in process block 300. As a result, in some instances, the remainder of the process illustrated in FIG. 10 is executed so as to interpolate and/or extrapolate the range ($R_k$) for each of the V sample regions illuminated by the velocity core. As an example, at process block 310, the LIDAR data generator 281 can combine the range data ($R_k$) in the selected LIDAR data solutions from different RV sample regions so as to approximate the range data ($R_k$) for each of the V sample regions illuminated by one of the velocity cores. For instance, the LIDAR data generator 281 can interpolate and/or extrapolate the range data ($R_k$) for each of the V sample regions from the coordinates and/or range data ($R_k$) from different RV sample regions as disclosed above. The LIDAR data for the sample regions of the field of view can include or consist of the LIDAR data for the RV sample regions, the isolated LIDAR data for each of the V sample regions ($V_k$) and the approximated range data ($R_k$) for each of the V sample regions.

The fields of view illustrated in FIG. 7 and FIG. 12B illustrate the sample regions as spaced apart from one another, however, the sample regions can partially or fully overlap. For instance, all or a portion of the V sample regions can partially or fully overlap an RV sample region or be partially or fully overlapped by an RV sample region. As a result, all or a portion of the sample regions can be concurrently illuminated by a system output signal that includes light from an RV core and illuminated by a system output signal that includes light from a V core.

Although the LIDAR system of FIG. 12B is disclosed as having real data signal cores where the velocity cores constructed as disclosed in the context of FIG. 11A through FIG. 11C, a portion of the cores can be complex data signal cores. For instance, the velocity cores can be constructed as disclosed in any of FIG. 1A through FIG. 5C. The range and velocity cores 324 alternate with the velocity cores 325.

The real data signal cores that are disclosed in the context of FIG. 11A through FIG. 11C and that serve as V cores include a frequency shifter. However, the frequency shifter can be removed. For instance, the velocity cores in FIG. 12B can be constructed as disclosed in any of FIG. 1A through FIG. 1C with a signal processor of FIG. 11B in combination with the electronics of FIG. 11C to provide a real data signal core that can be operated as a V core. For instance, the system output signal can be a continuous wave (CW). As an example, the outgoing LIDAR signal, and accordingly the system output signal, can be an unchirped continuous wave (CW). In some instances, the outgoing LIDAR signal, and accordingly the system output signal, can be represented by Equation 2: G*cos(H*t) where G and H are constants and t represents time. In some instances, G represents the square root of the power of the outgoing LIDAR signal. In these instances, the real Fourier transform outputs frequency peaks at a positive beat frequency and a negative beat frequency with the same magnitude. For instance, the real Fourier transform can outputs frequency peaks at a beat frequency value of $f_d$ and $-f_d$ where $f_d$ represents the Doppler frequency shift and can be expressed as $f_d=2V_kf_c/c$ with $f^c$ representing the frequency of the continuous wave, c representing the speed of light, $V_k$ being the radial velocity between the LIDAR system and a reflecting object in sample region $SR_k$ where the direction from the reflecting object toward the LIDAR system is assumed to be the positive direction. Since, it can be ambiguous as to which beat frequency represents the correct value for the beat frequency of the composite signals there are two possible radial velocity solutions, one at $V_k$ and one at $-V_k$. As a result, there are multiple potential solutions for the radial velocity for a V sample region illuminated by a system output signal from a real data signal core constructed as disclosed in any of FIG. 1A through FIG. 1C.

Figure 13A:
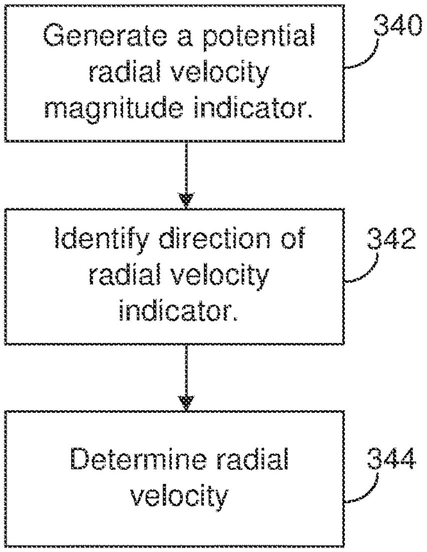
FIG. 13A illustrates an example of process flow that the electronics can use to identify a radial velocity for sample regions $SR_k$ . . .

FIG. 13A illustrates an example of process flow that the electronics can use to identify the correct radial velocity solution for a V sample region $SR_k$ when LIDAR data solutions are available from RV sample regions. At process block 340, a preliminary LIDAR data generator 269 calculates a velocity magnitude indicator from a radial velocity indicator for sample region $SR_k$. The magnitude of a potential radial velocity indicator indicates the magnitude of the radial velocity between the LIDAR system and an object in V sample region $SR_k$. For instance, the magnitude of a potential radial velocity indicator sets the magnitude of the radial velocity. As a result, the radial velocity indicator can be a calculation of the radial velocity ($V_k$) value provided by $f_d=2V_kf_c/c$ where $f_d$ can represent either of the peak frequencies output from the Fourier transform. Since either of the Doppler frequency shifts $f_d$ is directly related to the magnitude of the radial velocity by $|f_d|=|2V_kf_c/c|$, either of the beat frequencies ($f_d$), or Doppler frequency shifts ($f_d$), can also serve as a radial velocity indicator. The a preliminary LIDAR data generator 269 can identify the magnitude of the radial velocity indicator as the velocity magnitude indicator.

At process block 342, the LIDAR data generator 281 can identify the direction of the radial velocity indicator for V sample region $SR_k$. For instance, the velocity magnitude indicator for V sample region $SR_k$ can be compared to a comparative component of LIDAR data solutions from one or more RV sample regions to identify the direction of the radial velocity indicator. As an example, when the velocity magnitude indicator for V sample region $SR_k$ matches the magnitude of a possible radial velocity solution from a neighboring RV sample region, it is likely the system output signals that illuminated the different sample regions were incident on the same object. As a result, the direction of the possible radial velocity solution that matched the velocity magnitude indicator is assigned to the velocity magnitude indicator to provide a directional radial velocity indicator. Accordingly, the directional radial velocity indicator has the magnitude of the velocity magnitude indicator and the direction of the comparative component from the matched LIDAR data solution. As an example where the radial velocity indicator for V sample region $SR_k$ is a radial velocity ($V_k$) calculation that provides a velocity magnitude indicator of 20 mph and matches with a possible radial velocity solution of −20 mph, the negative value of the possible radial velocity solution is assigned to the velocity magnitude indicator to provide a directional radial velocity indicator value of −20 mph.

At process block 344, the LIDAR data generator 281 can determine the radial velocity for V sample regions $SR_k$. When the velocity magnitude indicator is the magnitude of a radial velocity calculation, the directional radial velocity indicator can serve as the radial velocity for sample regions $SR_k$. When the velocity magnitude indicator is the magnitude of something other than a radial velocity calculation, the radial velocity can be calculated from the directional radial velocity indicator. For instance, when the velocity magnitude indicator is the magnitude of either of the beat frequencies ($f_d$), the radial velocity ($V_k$) can be calculated from $Cf_d=2V_kf_c/c$ where $Cf_d$ represents the directional radial velocity indicator.

Figure 13B:
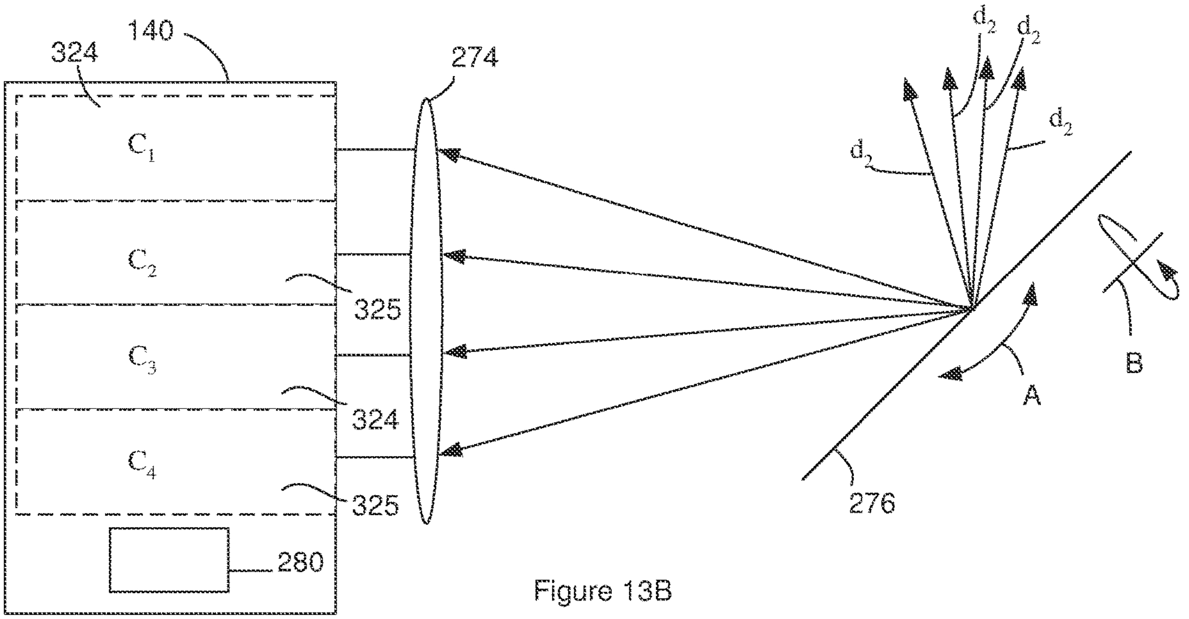
FIG. 13B illustrates a LIDAR system that includes multiple different real data signal cores on a common support.

One or more of the LIDAR cores in the LIDAR system of FIG. 12B can be constructed as disclosed in the context of FIG. 1A through FIG. 1C with a signal processor of FIG. 11B in combination with the electronics of FIG. 11C and operated as a range and velocity core while one or more of the LIDAR cores in the LIDAR system is constructed as disclosed in any of FIG. 1A through FIG. 1C with a signal processor of FIG. 11B in combination with the electronics of FIG. 11C and operated as a V core. As an example, FIG. 13B illustrates a LIDAR system that includes multiple different real data signal cores on a common support 140. One or more of the LIDAR cores can be a velocity core constructed as disclosed in any of FIG. 1A through FIG. 1C with a signal processor of FIG. 11B in combination with the electronics of FIG. 11C and one or more of the LIDAR cores can be a range and velocity core constructed as disclosed in the context of FIG. 1A through FIG. 1C with a signal processor of FIG. 11B in combination with the electronics of FIG. 11C. For the purpose of illustration, the LIDAR cores in the LIDAR system of FIG. 13B include two velocity cores 325 and two range and velocity cores 324. The range and velocity cores 324 alternate with the velocity cores 325.

Figure 13C:
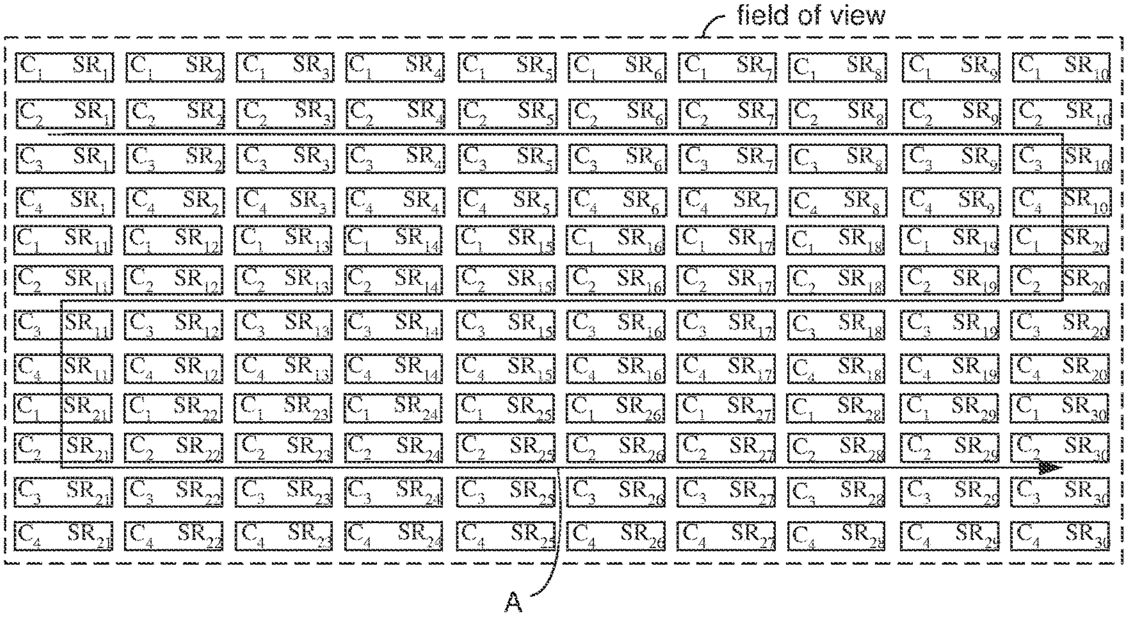
FIG. 13C is a two-dimensional illustration of the field of view for the LIDAR system of FIG. 13B.

FIG. 13C is a two-dimensional illustration of the field of view for the LIDAR system of FIG. 13B. For instance, FIG. 13C can represent a projection of a three-dimensional field of view onto a two-dimensional plane. The field of view includes multiple rectangles that can each represent the projection of one of the sample regions in the field of view onto the plane. The sample regions are shown as rectangular for the purposes of illustration and can have other geometries. The sample regions are each labeled $SR_k$ where k is from 1 to 30.

The sample regions are each labeled $C_i$ where i is a core index that identifies the core that illuminated the sample region. The core index is an integer can extend from i=1 to i=M where M is the number of system output signals output by the LIDAR system. The labels $C_i$ indicate which of the system output signals illuminated the sample region. For instance, the sample regions labeled $C_1$ were illuminated by the range and velocity core labeled $C_1$ in FIG. 13B and the sample regions labeled $C_3$ were illuminated by the range and velocity core labeled $C_3$ in FIG. 13B. Accordingly, the sample regions labeled $C_1$ and $C_3$ are RV sample regions. In contrast, the sample regions labeled $C_2$ were illuminated by the velocity core labeled $C_2$ and the sample regions labeled $C_4$ were illuminated by the velocity core labeled $C_4$. As a result, the sample regions labeled $C_2$ and $C_4$ are V sample regions.

FIG. 13C includes an arrow labeled A. The arrow indicates the sequence that the system output signals are scanned through the field of view. Additionally, the sample region indices (k) are assigned to the sample regions chronologically. Accordingly, the sample region labeled with $C_2$ and $SR_{11}$ was scanned by the velocity core $C_1$ before the sample region labeled with $C_2$ and Situ was scanned by the velocity core $C_2$.

The local electronics 32 can be local electronics in that they are specific to each of the cores on the LIDAR system. The LIDAR system can include common electronics 280 in addition to the local electronics 32. The common electronics 280 can be positioned on the common support 140 as shown in FIG. 13C or can be located off of the common support 140. The common electronics 280 can be in the same physical location and/or housing as the local electronics associated with different cores or can be in different locations and/or housings from the local electronics 32 associated with different cores.

The common electronics can be in electrical communication with the local electronics 32 associated with different cores as disclosed in the context of FIG. 8. As a result, the common electronics 280 can access LIDAR data generated from different cores. For instance, the common electronics 280 can access the preliminary LIDAR data that the local electronics 32 calculate for the sample regions.

The electronics can combine possible LIDAR data solutions with a radial velocity indicator and/or velocity magnitude indicator from one or more V sample regions so as to identify the correct LIDAR data for the RV sample regions and the V sample regions in the field of view.

To identify the correct possible LIDAR data solution for an RV sample region and the correct direction for a radial velocity indicator, the electronics can compare possible LIDAR data solutions for a subject RV sample region and the radial velocity magnitude indicator for one or more V sample regions that each serves as a reference V sample region.

Figure 13D:
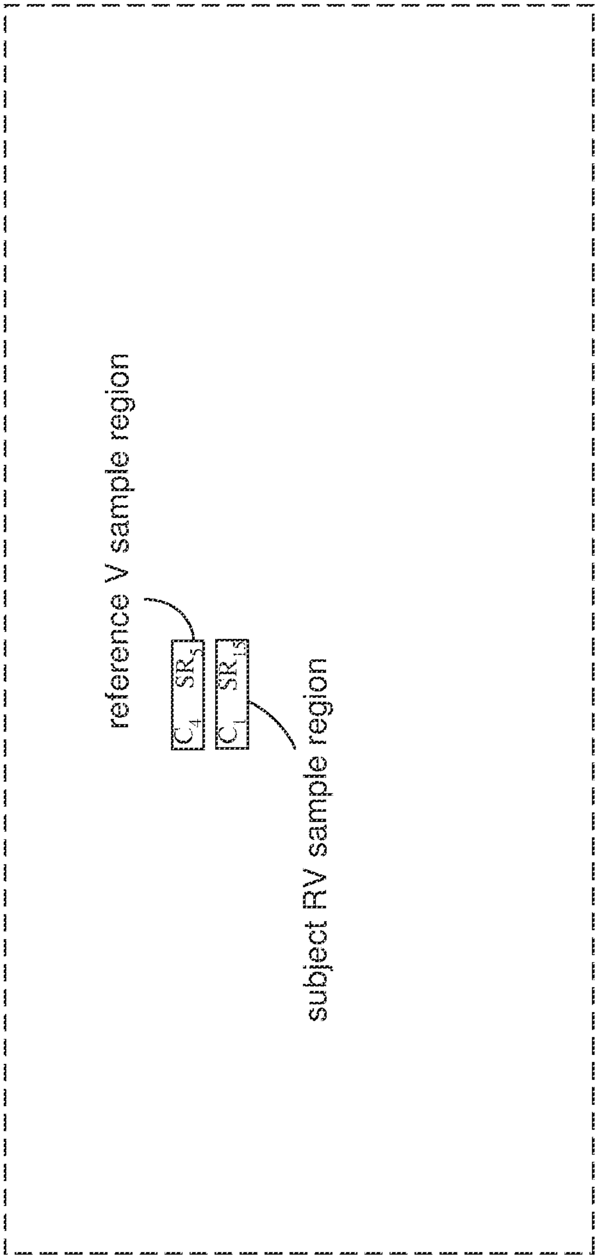
FIG. 13D illustrates a subject RV sample region and a reference V sample region on the field of view from FIG. 13C.

All or a portion of the reference V sample regions and a subject RV sample region can be illuminated by the same cores or by different cores. For instance, the electronics, such as the LIDAR data generator 281, can identify a subject RV sample region for which a correct one of the LIDAR data solutions is to be identified. FIG. 13D shows the field of view from FIG. 13C where the RV sample region that is labeled $SR_{15}$ and is illuminated by a system output signal that includes light from velocity core $C_4$ is identified as the subject RV sample region.

The LIDAR data generator 281 can identify one or more V sample regions as a reference V sample region. The LIDAR data generator 281 can compare possible LIDAR data solutions for the subject RV sample region to the velocity magnitude indicator calculated for each of the one or more reference V sample regions so as to identify the correct LIDAR data solution for the subject RV sample region from among the possible LIDAR data solutions for the subject RV sample region. In some instances, the V sample region that is physically closest to the subject RV sample region is identified as the only reference V sample region. As an example, in FIG. 13D, the V sample region that is labeled $SR_5$ and is illuminated by a system output signal that includes light from velocity core $C_1$ is identified as the only reference V sample region.

The LIDAR data generator 281 can employ one or more solution identification criteria to identify the correct LIDAR data solution for the subject RV sample region from among the possible LIDAR data solutions for the subject RV sample region and/or to identify the correct direction for a direction of the radial velocity indicator for a reference V sample region. An example identification criterion includes a proximate magnitude velocity criterion that provides a match between the velocity magnitude indicator for a reference V sample region $SR_k$ and a comparative component of a LIDAR data solution for a subject RV sample region. For instance, the possible LIDAR data solutions for the reference V sample regions have a component that serves as a comparative component that is an equivalent of the radial velocity indicator and can be compared to the velocity magnitude indicator. For instance, when the velocity magnitude indicator is the magnitude of a radial velocity calculation, each of the possible LIDAR data solutions for the reference V sample includes a radial velocity ($V_K$) value that can serve as the comparative component. As another example, when the velocity magnitude indicator is the magnitude of a Doppler frequency shift, each of the possible LIDAR data solutions for the reference V sample includes an $f_d$ value that can serve as the comparative component. The LIDAR data solution that is for the subject RV sample region and that has the comparative component with the magnitude that is closest to the velocity magnitude indicator of the reference V sample regions can be selected as the correct LIDAR data solution for the subject RV sample region. Accordingly, the radial velocity $V_k$ and distance $R_k$ associated with the selected LIDAR data solution can serve as the LIDAR data for the subject RV sample region. Additionally, the direction of the comparative component in the selected LIDAR data solution can serve as the direction of the radial velocity indicator for the reference V sample region associated with the radial velocity indicator. As a result, the direction of the comparative component in the selected LIDAR data solution is assigned to the radial velocity indicator to provide a directional radial velocity indicator. Accordingly, the directional radial velocity indicator has the magnitude of the velocity magnitude indicator and the direction (positive or negative) of the comparative component in the selected LIDAR data solution. As an example where the radial velocity indicator is a radial velocity ($V_k$) calculation that provides a velocity magnitude indicator of 20 mph and the comparative component in the selected LIDAR data solution has a value of −20 mph, the negative value of the comparative component is assigned to the velocity magnitude indicator to provide a directional radial velocity indicator value of −20 mph.

The LIDAR data generator 281 can apply other solution identification criteria in addition or as an alternative to the proximate velocity magnitude criteria. Another example of an identification criterion can be a range criterion where the comparative component in each of the LIDAR data solutions for the subject sample region has a value within a range of comparative component values. In some instances, ranges for the magnitude of the comparative component values include, but are not limited to, the value of the velocity magnitude indicator of the reference V sample region +/−10%, 20%, or 30% of the velocity magnitude indicator of the reference V sample. In some instances, ranges for the magnitude of the comparative component values include, but are not limited to, the value of the velocity magnitude indicator of the reference V sample region +/− a constant value. In the event that the magnitude of the comparative component value for a subject RV sample region falls outside of the range, the LIDAR data solution that includes the comparative component value can be removed from the list of possible LIDAR data solutions. In the event that none of the possible LIDAR data solutions for a subject RV sample falls within the range, the LIDAR data for the subject RV sample region can be classified as unavailable. In some instances, the LIDAR data generator 281 applies both a range criterion and a proximate velocity magnitude criterion to a subject RV sample region.

Figure 13E:
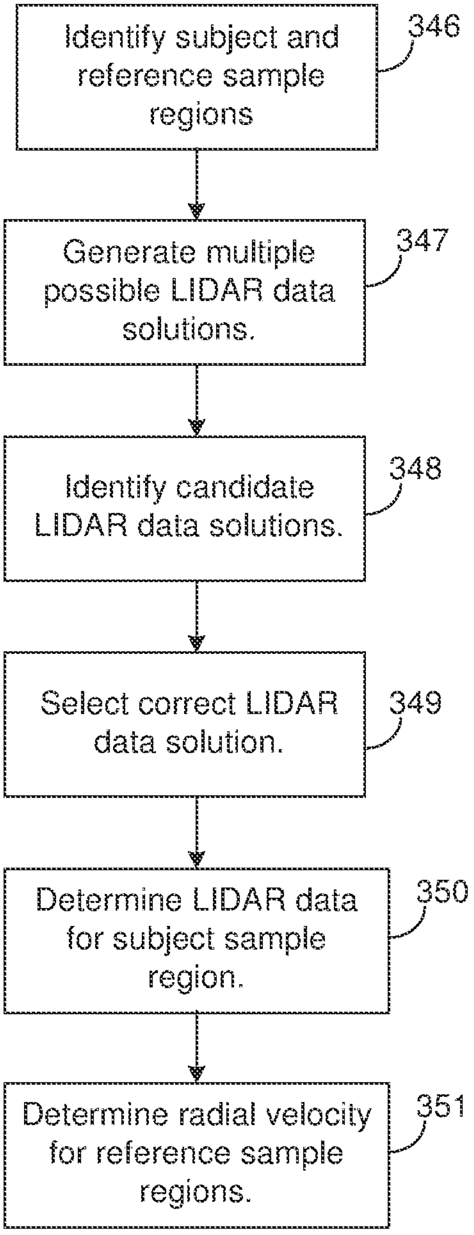
FIG. 13E illustrates an example of process flow that the electronics can use to identify a correct LIDAR data solution for a subject RV sample region and to determine the correct radial velocity for a reference V sample region.

FIG. 13E illustrates an example of process flow that the LIDAR data generator 281 can use to identify a correct LIDAR data solution for a subject RV sample region and to determine the correct radial velocity for a reference V sample region. At process block 346 the LIDAR data generator 281 identifies a subject RV sample region. The LIDAR data generator 281 also identifies one or more reference V sample regions. In some instances, the V sample region that is physically closest to the subject RV sample region is identified as the only reference V sample region.

At process block 347, the LIDAR data generator 281 can access the possible LIDAR data solutions that a preliminary LIDAR data generator calculated for a subject RV sample region as disclosed in the context of FIG. 12A. For instance, the LIDAR data generator 281 electronics can access a possible value for $f_r$ and/or possible value of the range ($R_k$) for the first solution, the second solution, and the third solution. At process block 348, the LIDAR data generator 281 can identify candidate LIDAR data solutions from among the possible LIDAR data solutions. For instance, the LIDAR data generator 281 can identify candidate $f_r$ values from among the possible $f_r$ values and/or candidate $R_k$ values from among the possible $R_k$ values. The value of $R_k$ is positive by definition. As a result, the value of $f_r$ is also positive. However, the value of $f_r$ from the second solution is the negative of the $f_r$ value from the third solution. As a result, the possible $f_r$ and/or $R_k$ values will include one or more negative values. The possible $f_r$ values and/or the $R_k$ values with negative values can be removed from the pool of candidates. As a result, each of the possible $f_r$ values with a positive value can serve as a candidate $f_r$ value. Additionally or alternately, each of the possible $R_k$ values with a positive value can serve as a candidate $R_k$ value.

At process block 349, the LIDAR data generator 281 can identify the correct solution. The radial velocity ($V_k$) component and/or the $f_d$ component of each LIDAR data solution can serve as the comparative component for the LIDAR data solution. The component that serves as the comparative component can be determined by the velocity magnitude indicator. For instance, as noted above, when the velocity magnitude indicator is the magnitude of a radial velocity calculation, each of the possible LIDAR data solutions for the reference V sample includes a radial velocity ($V_K$) value that can serve as the comparative component but when the velocity magnitude indicator is the magnitude of a Doppler frequency shift each of the possible LIDAR data solutions for the reference V sample includes an $f_d$ value that can serve as the comparative component. When the radial velocity ($V_K$) value serve as the comparative component and a possible LIDAR data solution does not already have a radial velocity ($V_K$) component, a radial velocity ($V_k$) can be calculated for each of the possible LIDAR data solutions using the $f_d$ value associated with the LIDAR data solution and $f_d=2V_kf_c/c$.

The LIDAR data generator 281 can use the one or more solution identification criteria to compare the comparative component from the different LIDAR data solutions to the velocity magnitude indicator from one or more V sample regions so as to identify the correct LIDAR data solution. The LIDAR data generator 281 can select the LIDAR data solution that includes the identified comparative component as the correct LIDAR data solution.

At process block 350, the LIDAR data generator 281 identifies the LIDAR data for the subject RV sample region associated with sample region index k. For instance, when the components of the selected possible LIDAR data solution do not already include a range ($R_K$), the range ($R_K$) can be calculated for the selected LIDAR data solution using the $f_r$ value associated with the selected LIDAR data solution and $f_r=2*\alpha_u*R_k/c$. Additionally, when the components of the selected possible LIDAR data solution do not already include a radial velocity ($V_K$), the radial velocity ($V_K$) can be calculated for the selected LIDAR data solution using the $f_d$ value associated with the selected LIDAR data solution and $f_d=2V_kf_c/c$. The values of $V_k$ and $R_k$ associated with the selected LIDAR data solution can serve as shared LIDAR data for the subject RV sample region $SR_k$. Accordingly, the LIDAR data for the RV sample region associated with sample region index k can include or consist of the values of $V_k$ and $R_k$ selected in process block 322.

At process block 351, the LIDAR data generator 281 can determine the radial velocity for the reference V sample regions. The direction of the radial velocity indicator can be identified. For instance, the direction of the comparative component in the selected LIDAR data solution can serve as the direction of the radial velocity indicator for the reference V sample region associated with the radial velocity indicator. As a result, the direction of the comparative component in the selected LIDAR data solution is assigned to the radial velocity indicator to provide a directional radial velocity indicator. Accordingly, the directional radial velocity indicator has the magnitude of the velocity magnitude indicator and the direction (positive or negative) of the comparative component in the selected LIDAR data solution. When the velocity magnitude indicator is the magnitude of a radial velocity calculation, the directional radial velocity indicator can serve as the radial velocity ($V_k$) for sample regions $SR_k$. When the velocity magnitude indicator is the magnitude of something other than a radial velocity calculation, the radial velocity can be calculated from the directional radial velocity indicator. For instance, when the velocity magnitude indicator is the magnitude of either of the beat frequencies ($f_d$), the radial velocity ($V_k$) can be calculated from $Cf_d=2V_kf_c/c$ where $Cf_d$ represents the directional radial velocity indicator.

Figure 13F:
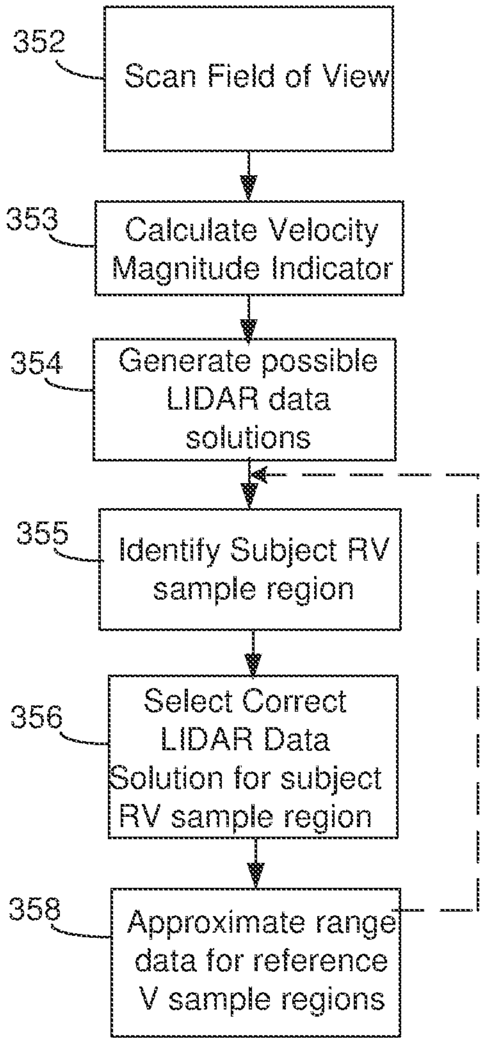
FIG. 13F illustrates a process flow for generating LIDAR data for sample regions illuminated by a LIDAR system having real data signal cores.

FIG. 13F illustrates a process flow for generating LIDAR data for the sample regions illuminated by a LIDAR system having real data signal cores constructed as disclosed in the context of FIG. 13B. At process block 352, the electronics cause the field of view for the LIDAR system to be scanned by the system output signals of the different cores.

At process block 353, the preliminary LIDAR data generators in the one or more velocity cores calculate the velocity magnitude indicator for each of the V sample regions. At process block 354, the preliminary LIDAR data generators in the one or more range and velocity cores calculate the possible LIDAR data solutions for each of the RV sample regions illuminated by one of the range and velocity cores. For instance, the preliminary LIDAR data generators 269 can calculate the possible LIDAR data solutions for each of the RV sample regions illuminated by one of the range and velocity cores.

At process block 355, the LIDAR data generator 281 identifies a subject RV sample region. The LIDAR data generator 281 also identifies one or more reference V sample region. In some instances, the V sample region that is physically closest to the subject RV sample region is identified as the only reference V sample region.

At process block 356, the LIDAR data generator 281 identifies the correct LIDAR data solution for the subject RV sample region. For instance, the LIDAR data generator 281 can select the correct LIDAR data solution for an RV sample region from among the possible LIDAR data solutions as disclosed on the context of FIG. 13E. The radial velocity ($V_k$) and the distance ($R_k$) associated with the selected LIDAR data solution can be considered shared LIDAR data that serves as all or a portion of the LIDAR data for the subject RV sample region $SR_k$.

At process block 358, the LIDAR data generator 281 can determine the radial velocity ($V_k$) for each of the V reference sample regions. For instance, the common electronics 280 can determine the radial velocity ($V_k$) for each of the V reference sample regions as disclosed on the context of FIG. 13E.

Process block 355 through process block 358 can be repeated until each of the RV sample regions has served as a subject RV sample region or until the desired portion of the RV sample regions has served as a subject RV sample region and until each of the V sample regions has served as a reference V sample region or until the desired portion of the V sample regions has served as a reference V sample region. FIG. 13C illustrates a 1:1 ratio of V sample regions to RV sample regions. In this instance, each subject RV sample region can be associated with a different V sample region that serves as the reference V sample region for the subject RV sample region. As a result, the flow illustrated in FIG. 13D can be completed for a field of view with each of the RV sample regions serving as a subject sample region and each of the V sample regions serving as a reference sample region for an associated one of the RV sample regions. In some instances, multiple V sample regions can serve as a reference sample region for an associated one of the RV sample regions. In these instances, the V sample regions that serve as a reference sample region for an associated one of the RV sample regions can include the V sample region that is located closest to or least distant from the associated subject RV sample region.

Figure 13G:
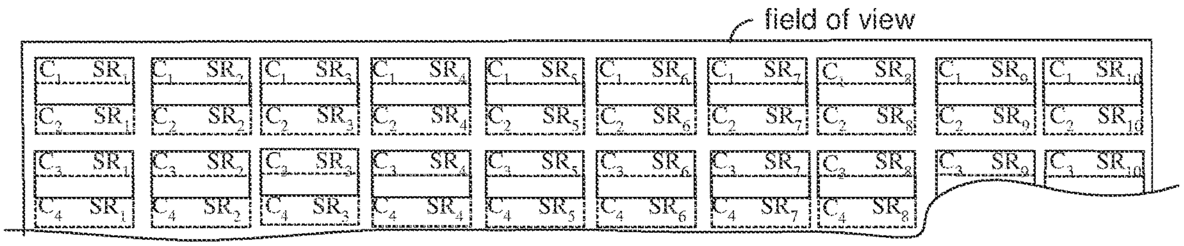
FIG. 13G illustrates a portion of the field of view from FIG. 12C or FIG. 13C where the sample regions illuminated by different cores partially overlap

FIG. 12C and FIG. 13C each illustrate the sample regions illuminated by different cores as being spatially separated, however, adjacent sample regions can fully or partially overlap. As an example, FIG. 13G illustrates a portion of the field of view from FIG. 12C or FIG. 13C where the sample regions illuminated by different cores partially overlap such that each of the V sample regions is overlapped by a different one of the RV sample regions. In some instances, the V sample region that is located closest to the subject RV sample region is the V sample region that most overlaps the subject RV sample region. Accordingly, the V sample regions that serve as a reference sample region for an associated subject RV sample region can include the V sample region that is most overlapped by the associated subject RV sample region.

The LIDAR data for the RV sample regions can serve as the range and radial velocity for each of the RV sample regions scanned by the RV cores in process block 300 of FIG. 10. Accordingly, the preliminary LIDAR data generators 269 or the LIDAR data generators 281 can calculate the radial velocity and coordinates of the field locations associated with the RV sample regions scanned by those cores as disclosed in the context of process block 300. Additionally, the radial velocities determined for the V sample regions can serve as the radial velocity for each of the V sample regions scanned by the V cores in process block 300. As a result, in some instances, the remainder of the process illustrated in FIG. 10 is executed so as to interpolate and/or extrapolate the range ($R_k$) for each of the V sample regions illuminated by the velocity core. As an example, at process block 330, the common electronics 280 can combine the range data ($R_k$) in the selected LIDAR data solutions from different RV sample regions so as to approximate the range data ($R_k$) for each of the V sample regions illuminated by one of the velocity cores. For instance, the common electronics 280 can interpolate and/or extrapolate the range data ($R_k$) for each of the V sample regions from the coordinates and/or range data ($R_k$) from different RV sample regions as disclosed above. The LIDAR data for the sample regions of the field of view can include or consist of the LIDAR data for the RV sample regions, the isolated LIDAR data for each of the V sample regions ($V_k$) and the approximated range data ($R_k$) for each of the V sample regions.

EXAMPLE 1

A LIDAR system has a two-dimensional field of view. The field location $fl_1$ is located in RV sample region $SR_1$ and is identified as a known data point with coordinates $R_1=10$ m and an angular orientation of $\theta_1=10°$. The field location $fl_{10}$ is located in RV sample region $SR_{10}$ and is identified as a known data point with coordinates $R_{10}=16$ m and an angular orientation of $\theta_{10}=12°$. The field location $fl_{15}$ is selected as a subject field location and is located in V sample region $SR_{15}$ with an angular orientation of $\theta_{15}=11°$. The range $R_{15}$ for field location $fl_{15}$ is interpolated from the known data points $fl_1$ and $fl_{10}$ to be $R_{15}=13$ m using a linear interpolation where $R_{15}=R_1+(R_{10}-R_1)(\theta_{15}-\theta_1)(\theta_{10}-\theta_1)$.

Figure 14:
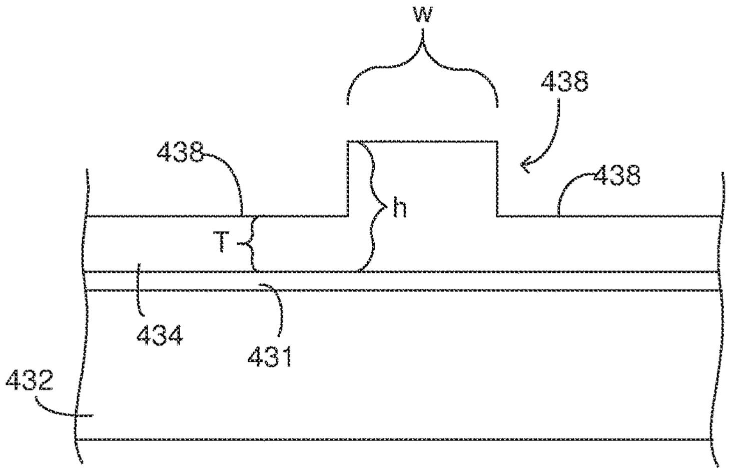
FIG. 14 is a cross section of a portion of a silicon-on-insulator wafer that includes a waveguide.

Suitable platforms for the LIDAR chips include, but are not limited to, silica, indium phosphide, and silicon-on-insulator wafers. FIG. 14 is a cross-section of portion of a chip constructed from a silicon-on-insulator wafer. A silicon-on-insulator (SOI) wafer includes a buried layer 431 between a substrate 432 and a light-transmitting medium 434. In a silicon-on-insulator wafer, the buried layer 431 is silica while the substrate 432 and the light-transmitting medium 434 are silicon. The substrate 432 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 432.

The dimensions of the ridge waveguide are labeled in FIG. 14. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 14 is suitable for all or a portion of the waveguides on LIDAR chips constructed according to FIG. 1A through FIG. 1C.

As noted above, the electronics that operate the system include local electronics 32 and common electronics 280. The distinction between local electronics and common electronics is used to illustrate the portion of the electronics that are each associated with one of the cores (the local electronics) and the portion of the electronics associated with multiple cores (the common electronics). While the local electronics 32 and common electronics 104 are shown as being in different locations, the local electronics 32 and common electronics 104 can be in a common location and/or common packaging. Further, the local electronics 32 and common electronics 104 can be integrated and need not refer to discrete or distinct electronic components. As a result, functionality described as being performed by local electronics can be performed by common electronic and/or functionality described as being performed by common electronics can be performed by local electronic. Certain components of the electronics are disclosed above such as the preliminary LIDAR data generators and the LIDAR data generator; however, the electronics include additional components that are not illustrated. For instance, a portion of the local electronics and/or the common electronics can be configured to control the frequency of the systems output signal, steering of the system output signals, and operation of a frequency shifter 298

Suitable local electronics 32 and/or common electronics 104 can include, but are not limited to, a controller that includes or consists of analog electrical circuits, Application Specific Integrated Circuits (ASICSs), digital electrical circuits, processors, microprocessors, digital signal processors (DSPs), Field Programmable Gate Arrays (FPGAs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first auxiliary light sensor 218, the second auxiliary light sensor 220, the first light sensor 223, and the second light sensor 224.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108,472, issued on Aug. 22, 2000 each of which is incorporated herein in its entirety. The use of light sensors that are integrated with the chip are suitable for all or a portion of the light sensors selected from the group consisting of the auxiliary light sensor 218, the second auxiliary light sensor 220, the first light sensor 223, and the second light sensor 224.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 includes a gain element or laser chip, the local electronics 32 can tune the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demulitplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demulitplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:

one or more cores that each outputs a system output signal that illuminates multiple sample regions in a field of view, a reference one of the cores including a light combiner configured to generate a composite signal beating at a beat frequency, and electronics configured to use a real Fourier transform to determine a beat frequency of the composite signal, the electronics configured to use the beat frequency of the composite signal to calculate the magnitude of a radial velocity indicator for a reference one of the sample regions illuminated by the system output signal output from the reference core, the radial velocity indicator indicating a radial velocity between the LIDAR system and an object in the reference sample region, the electronics configured to identify a direction of the radial velocity indicator, the identification of the direction including a comparison of the magnitude of the radial velocity indicator to data calculated for a subject sample region selected from among the sample regions, the reference sample region being different from the subject sample region.

2. The system of claim 1, wherein the radial velocity indicator is a calculation of the radial velocity for the reference sample region.

3. The system of claim 1, wherein the radial velocity indicator is the beat frequency of the composite signal that results from illumination of the reference sample region by one of the system output signals.

4. The system of claim 1, wherein the data from the subject sample regions includes multiple possible LIDAR data solutions for the subject sample region.

5. The system of claim 4, wherein each of the possible LIDAR data solutions for the subject sample region includes all or a portion of the components selected from the group consisting of an $f_r$ value, an $f_d$ value, a radial velocity value and a range value, the $f_d$ value being a Doppler frequency shift, the $f_r$ value being a frequency shift that results from a distance between the system and an object in the subject sample region, the radial velocity value indicating a radial velocity between the system and the object in the subject sample region, and the range value indicating a range between the system and the object in the subject sample region.

6. The system of claim 4, wherein each of the possible LIDAR data solutions includes a comparative component selected from an $f_d$ value and a radial velocity value, the $f_d$ value being a Doppler frequency shift and the radial velocity value indicating a radial velocity between the system and an object in the subject sample region; and the comparison of the magnitude of the radial velocity indicator to data calculated for one or more reference sample regions includes comparing the magnitude of the radial velocity indicator to the comparative component.

7. The system of claim 6, wherein the electronics identify the possible LIDAR solution with the comparative component that has a magnitude closest to the magnitude of the radial velocity indicator.

8. The system of claim 7, wherein the electronics set the direction of the radial velocity indicator equal to a direction of the identified comparative component.

9. The system of claim 1, wherein the reference sample region and the subject sample region at least partially overlap.

10. The system of claim 1, wherein the reference sample region is the sample region that is closest to the subject sample region.

11. The system of claim 10, wherein the one or more cores is multiple cores and the system output signal that illuminated the subject sample region is different from the system output signal that illuminated the sample region that is closest to the subject sample region.

12. The system of claim 1, wherein the electronics estimate a range for the subject sample region by interpolating between ranges calculated for multiple different sample regions selected from among the sample regions illuminated by system output signals from the one or more cores.

13. The system of claim 1, wherein the electronics use a real Fourier transform to calculate a value of the beat frequency.

14. A method of operating a LIDAR system, comprising:

illuminating multiple sample regions in a field of view with system output signals output from different cores;

combining light signals so as to generate a composite signal beating at a beat frequency;

using a real Fourier transform to determine a beat frequency of the composite signal;

using the value of the beat frequency of the composite signal to calculate a magnitude of a radial velocity indicator for a reference one of the sample regions illuminated by the system output signal output from the reference core, the radial velocity indicator indicating a radial velocity between the LIDAR system and an object in the reference sample region; and identifying a direction of the radial velocity indicator by comparing the magnitude of the radial velocity indicator to data calculated for a subject one of the sample regions, the reference sample region being different from the subject sample region.

15. The method of claim 14, wherein the radial velocity indicator is a calculation of the radial velocity for the reference sample region.

16. The method of claim 14, wherein the radial velocity indicator is the beat frequency of the composite signal that results from illumination of the reference sample region by one of the system output signals.

17. The method of claim 14, wherein the data from the subject sample regions includes multiple possible LIDAR data solutions for the subject sample region.

18. The method of claim 17, wherein each of the possible LIDAR data solutions for the subject sample region includes all or a portion of the components selected from the group consisting of an $f_r$ value, an $f_d$ value, a radial velocity value and a range value, the $f_d$ value being a Doppler frequency shift, the $f_r$ value being a frequency shift that results from a distance between the system and an object in the subject sample region, the radial velocity value indicating a radial velocity between the system and the object in the subject sample region, and the range value indicating a range between the system and the object in the subject sample region.

19. The method of claim 17, wherein each of the possible LIDAR data solutions includes a comparative component selected from an $f_d$ value and a radial velocity value, the $f_d$ value being a Doppler frequency shift and the radial velocity value indicating a radial velocity between the system and an object in the subject sample region; and the comparison of the magnitude of the radial velocity indicator to data calculated for one or more reference sample regions includes comparing the magnitude of the radial velocity indicator to the comparative component.

20. The method of claim 19, wherein the electronics identify the possible LIDAR solution with the comparative component that has a magnitude closest to the magnitude of the radial velocity indicator.

21. The method of claim 20, wherein the electronics set the direction of the radial velocity indicator equal to a direction of the identified comparative component.

22. The method of claim 14, wherein the reference sample region and the subject sample region at least partially overlap.

23. The method of claim 14, wherein the reference sample region is the sample region that is closest to the subject sample region.

24. The method of claim 23, wherein the one or more cores is multiple cores and the system output signal that illuminated the subject sample region is different from the system output signal that illuminated the sample region that is closest to the subject sample region.

25. The method of claim 14, wherein the electronics estimate a range for the subject sample region by interpolating between ranges calculated for multiple different sample regions selected from among the sample regions illuminated by system output signals from the one or more cores.

26. The method of claim 14, wherein the electronics use a real Fourier transform to calculate a value of the beat frequency.

* * * * *